US008858695B2

(12) United States Patent
Gu et al.

(10) Patent No.: US 8,858,695 B2
(45) Date of Patent: *Oct. 14, 2014

(54) MODIFIED COLORANTS AND INKJET INK COMPOSITIONS COMPRISING MODIFIED COLORANTS

(75) Inventors: Feng Gu, Westford, MA (US); James A. Belmont, Acton, MA (US); Elizabeth G. Burns, Windham, NH (US); Paul S. Palumbo, West Newton, MA (US); Barry B. Corden, Gloucester, MA (US); Yuan Yu, Westford, MA (US); Ervina Halim, Needham, MA (US)

(73) Assignee: Cabot Corporation, Boston, MA (US)

( * ) Notice: Subject to any disclaimer, the term of this patent is extended or adjusted under 35 U.S.C. 154(b) by 1228 days.

This patent is subject to a terminal disclaimer.

(21) Appl. No.: 11/590,560

(22) Filed: Oct. 31, 2006

(65) Prior Publication Data
US 2007/0100024 A1 May 3, 2007

Related U.S. Application Data

(60) Provisional application No. 60/731,721, filed on Oct. 31, 2005, provisional application No. 60/815,305, filed on Jun. 21, 2006, provisional application No. 60/815,327, filed on Jun. 21, 2006, provisional application No. 60/815,326, filed on Jun. 21, 2006.

(51) Int. Cl.
*C09D 11/02* (2014.01)
*C09C 1/56* (2006.01)
*C09B 67/04* (2006.01)
*C09B 67/08* (2006.01)
*C08K 5/00* (2006.01)
*B82Y 30/00* (2011.01)
*C09B 67/00* (2006.01)
*C09D 7/00* (2006.01)
*C09D 7/12* (2006.01)
*C09B 67/22* (2006.01)
*C09C 3/10* (2006.01)
*C09D 11/36* (2014.01)
*C09D 11/32* (2014.01)
*C09B 67/46* (2006.01)
*C09D 11/322* (2014.01)
*C09D 11/324* (2014.01)
*C08K 3/04* (2006.01)
*C08K 3/08* (2006.01)
*C08K 3/00* (2006.01)
*C08K 9/08* (2006.01)
*C08K 9/04* (2006.01)
*C08L 101/02* (2006.01)

(52) U.S. Cl.
CPC . *B82Y 30/00* (2013.01); *C08K 3/04* (2013.01); *C09C 1/56* (2013.01); *C01P 2004/64* (2013.01); *C09B 67/0002* (2013.01); *C08K 3/08* (2013.01); *C09C 1/565* (2013.01); *C01P 2004/62* (2013.01); *C09B 67/0013* (2013.01); *C08K 5/0041* (2013.01); *C09B 68/44* (2013.01); *C09D 7/007* (2013.01); *C09D 7/1225* (2013.01); *C09B 67/0034* (2013.01); *C09C 3/10* (2013.01); *C09B 68/24* (2013.01); *C09B 67/0001* (2013.01); *C09B 68/41* (2013.01); *C09D 11/36* (2013.01); *C09D 11/32* (2013.01); *C01P 2006/80* (2013.01); *C09B 67/0085* (2013.01); *C08K 3/0033* (2013.01); *C08K 9/08* (2013.01); *C09B 67/0008* (2013.01); *C08K 9/04* (2013.01); *C09B 68/4253* (2013.01); *C09D 11/322* (2013.01); *C08L 101/02* (2013.01); *C09D 11/324* (2013.01)
USPC ....................................... 106/31.27

(58) Field of Classification Search
USPC ................... 106/31.27, 31.6, 31.9
See application file for complete search history.

(56) References Cited

U.S. PATENT DOCUMENTS

| | | | |
|---|---|---|---|
| 3,446,641 A | 5/1969 | Mitchell et al. | |
| 3,532,662 A | 10/1970 | Ansdell | |
| 3,567,932 A * | 3/1971 | Alburger | 250/302 |
| 3,963,694 A * | 6/1976 | Mory et al. | 534/740 |
| 4,016,151 A * | 4/1977 | Lotsch | 534/775 |
| 4,150,020 A | 4/1979 | Swidler et al. | |
| 4,491,481 A | 1/1985 | Robertson et al. | |
| 4,698,431 A | 10/1987 | Raymond et al. | |
| 4,860,829 A | 8/1989 | Carlberg et al. | |
| 5,243,032 A * | 9/1993 | Rieper | 534/581 |
| 5,281,261 A | 1/1994 | Lin | |
| 5,500,141 A | 3/1996 | Kormann et al. | |
| 5,571,311 A * | 11/1996 | Belmont et al. | 106/31.28 |
| 5,624,901 A | 4/1997 | Raymond et al. | |
| 5,630,868 A | 5/1997 | Belmont et al. | |
| 5,672,198 A | 9/1997 | Belmont | |

(Continued)

FOREIGN PATENT DOCUMENTS

| | | |
|---|---|---|
| EP | 0403797 | 12/1990 |
| EP | 1 088 865 | 4/2001 |

(Continued)

OTHER PUBLICATIONS

JP03-193357 to Taiho Ind Co Ltd (Aug. 23, 1991)—Abstract Only.

(Continued)

Primary Examiner — Veronica F Faison

(57) ABSTRACT

The present invention relates to a modified colorant comprising a colorant having attached at least one organic group. Various embodiments of the organic group are disclosed. For each of these embodiments, preferably the organic group has a defined calcium index value. Also disclosed are various uses for these modified colorants, including inkjet ink compositions.

20 Claims, No Drawings

(56) References Cited

U.S. PATENT DOCUMENTS

| | | | |
|---|---|---|---|
| 5,698,016 A | 12/1997 | Adams et al. | |
| 5,707,432 A | 1/1998 | Adams et al. | |
| 5,708,095 A | 1/1998 | Page et al. | |
| 5,713,993 A | 2/1998 | Page et al. | |
| 5,750,594 A | 5/1998 | Page et al. | |
| 5,795,376 A | 8/1998 | Ide | |
| 5,803,959 A | 9/1998 | Johnson et al. | |
| 5,837,045 A * | 11/1998 | Johnson et al. | 106/31.85 |
| 5,854,191 A | 12/1998 | Krause et al. | |
| 5,885,335 A | 3/1999 | Adams et al. | |
| 5,922,118 A | 7/1999 | Johnson et al. | |
| 5,958,999 A | 9/1999 | Bates et al. | |
| 6,042,643 A | 3/2000 | Belmont et al. | |
| 6,150,433 A | 11/2000 | Tsang et al. | |
| 6,187,086 B1 | 2/2001 | Rehman | |
| 6,203,909 B1 | 3/2001 | Chassot | |
| 6,204,307 B1 | 3/2001 | Miyabayashi | |
| 6,210,473 B1 | 4/2001 | Boils et al. | |
| 6,214,100 B1 | 4/2001 | Parazak et al. | |
| 6,221,476 B1 | 4/2001 | Bruening et al. | |
| 6,221,932 B1 | 4/2001 | Moffatt et al. | |
| 6,281,267 B2 | 8/2001 | Parazak | |
| 6,323,257 B1 | 11/2001 | Moffatt et al. | |
| 6,328,894 B1 | 12/2001 | Chan et al. | |
| 6,395,805 B1 | 5/2002 | Takao | |
| 6,458,458 B1 | 10/2002 | Cooke et al. | |
| 6,506,706 B1 | 1/2003 | Bruening et al. | |
| 6,533,851 B2 | 3/2003 | Lee et al. | |
| 6,538,047 B1 | 3/2003 | Miyabayashi | |
| 6,544,422 B2 | 4/2003 | Tarbet et al. | |
| 6,585,817 B2 | 7/2003 | Lee et al. | |
| 6,592,657 B2 | 7/2003 | Lee et al. | |
| 6,623,644 B2 | 9/2003 | Bruening et al. | |
| 6,641,653 B2 | 11/2003 | Yu | |
| 6,641,656 B2 | 11/2003 | Yu et al. | |
| 6,653,367 B2 | 11/2003 | Miyabayashi | |
| 6,719,905 B2 | 4/2004 | Bruening et al. | |
| 6,723,783 B2 | 4/2004 | Palumbo et al. | |
| 6,814,789 B2 | 11/2004 | Uhlir-Tsang et al. | |
| 6,831,194 B2 | 12/2004 | Srinivas | |
| 6,833,026 B2 | 12/2004 | Palumbo | |
| 6,866,707 B2 | 3/2005 | Kato | |
| 6,896,726 B2 | 5/2005 | Bugnon et al. | |
| 6,916,367 B2 | 7/2005 | Palumbo | |
| 6,960,250 B2 | 11/2005 | Luethge et al. | |
| 7,005,004 B2 | 2/2006 | Kalbitz et al. | |
| 7,160,377 B2 | 1/2007 | Zoch et al. | |
| 7,300,504 B2 | 11/2007 | Shakhnovich | |
| 7,347,894 B2 | 3/2008 | Yanagimoto et al. | |
| 7,393,403 B2 | 7/2008 | Lee et al. | |
| 7,427,361 B2 | 9/2008 | Small et al. | |
| 7,459,491 B2 | 12/2008 | Tyvoll et al. | |
| 7,501,017 B2 | 3/2009 | Sarkisian et al. | |
| 2002/0113854 A1 * | 8/2002 | Erdtmann et al. | 347/100 |
| 2002/0147252 A1 | 10/2002 | Adams et al. | |
| 2003/0097958 A1 * | 5/2003 | Yu et al. | 106/31.6 |
| 2004/0265348 A1 * | 12/2004 | Hollenberg et al. | 424/401 |
| 2005/0025914 A1 * | 2/2005 | Uhlir-Tsang et al. | 428/32.34 |
| 2005/0176848 A1 * | 8/2005 | Chen et al. | 523/160 |
| 2006/0089422 A1 | 4/2006 | Vasudevan et al. | |
| 2006/0243165 A1 | 11/2006 | Luthge et al. | |
| 2007/0044682 A1 | 3/2007 | Nick et al. | |
| 2007/0100023 A1 * | 5/2007 | Burns et al. | 523/160 |
| 2007/0126839 A1 | 6/2007 | Kelly-Rowley et al. | |
| 2007/0277699 A1 | 12/2007 | Bauer | |
| 2008/0083347 A1 | 4/2008 | Palumbo | |
| 2008/0264298 A1 * | 10/2008 | Burns | 106/31.86 |

FOREIGN PATENT DOCUMENTS

| | | |
|---|---|---|
| EP | 1061106 | 8/2003 |
| GB | 2373789 | 6/2004 |
| GB | 2385331 | 4/2005 |
| WO | WO9504109 | 2/1995 |
| WO | WO97/12944 | 4/1997 |
| WO | WO2005/090486 | 9/2005 |
| WO | WO2005090458 | 9/2005 |
| WO | WO2005/123855 | 12/2005 |

OTHER PUBLICATIONS

JP2002-167529 to Konica Corp (Jun. 11, 2002)—Abstract Only.

JP2002-371213 to Mitsubishi Chemicals Corp (Dec. 26, 2002)—Abstract Only.

JP2004-075825 to Fuji Photo Film Co Ltd (Mar. 11, 2004)—Abstract Only.

JP2005-029606 to Color Chemical Kogyo KK (Feb. 3, 2005)—Abstract Only.

JP2005-225955 to Ricoh Co Ltd (Aug. 25, 2005)—Abstract Only.

International Search Report and Written Opinion of the International Searching Authority for International Application No. PCT/US2006/042348, mailed Oct. 30, 2007.

International Preliminary Report on Patentability for International Application No. PCT/US2006/042348, mailed May 15, 2008.

Furia, T., Stability Constants of Various Metal Chelates, Chapter 6—Sequestrants in Foods, by Thomas E. Furia, in CRC Handbook of Food Additiv, $2^{nd}$ Ed., 1972.

Popov, K., et al., Stability Constants Data Sourses. Reliability. Algorithms and a Software for the Data Verification, The First International Proficiency Testing Conference, Romania, Oct. 11-13, 2007.

Popov, K., et al., Critical Evaluation of Stability Constants of Phosphonic Acids**, Pure Appl. Chem., vol. 73, No. 10, 2001, pp. 1641-1677.

* cited by examiner

MODIFIED COLORANTS AND INKJET INK COMPOSITIONS COMPRISING MODIFIED COLORANTS

CROSS-REFERENCE TO RELATED APPLICATIONS

This patent application claims the benefit of U.S. Provisional Patent Application No. 60/731,721, filed Oct. 31, 2005, U.S. Provisional Patent Application No. 60/815,305, filed Jun. 21, 2006, U.S. Provisional Patent Application No. 60/815,327, filed Jun. 21, 2006, and U.S. Provisional Patent Application No. 60/815,326, filed Jun. 21, 2006.

BACKGROUND OF THE INVENTION

1. Field of the Invention

The present invention relates to specific modified colorants and inkjet ink compositions comprising these modified colorants.

2. Description of the Related Art

The surface of pigments contains a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Methods for the preparation of modified pigment products have also been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt.

Other methods to prepare modified pigments, including those having attached polymeric groups, have also been described. For example, PCT Publication No. WO 01/51566 discloses methods of making a modified pigment by reacting a first chemical group and a second chemical group to form a pigment having attached a third chemical group. Ink compositions, including inkjet inks, containing these pigments are also described. In addition, U.S. Pat. Nos. 5,672,198, 5,922,118, 6,042,643, and 6,641,656 disclose modified pigments having various attached groups, including phosphonic acid groups. Also, U.S. Pat. Nos. 6,328,894, 6,398,858, 6,436,178, 6,494,943, and 6,506,245 disclose modified pigments having various attached groups, including aryl polycarboxylic acid groups, including 1,2,3-benzene tricarboxylic acid groups. Compositions comprising these modified pigments, including inkjet ink compositions, are also shown. Also, polymer coated carbon products and methods for their preparation are described in U.S. Pat. No. 6,458,458.

While these methods provide modified pigments having attached groups, there remains a need for modified pigments having improved performance properties in compositions such as inkjet inks, thereby providing advantageous alternatives to previous modified pigments.

SUMMARY OF THE INVENTION

The present invention relates to a modified colorant comprising a colorant having attached at least one organic group. In a first embodiment, the organic group comprises at least two phosphonic acid groups, partial esters thereof, or salts thereof. In a second embodiment, the organic group comprises at least one hydroxamic acid group or salt thereof. In a third embodiment, the organic group comprises at least one heterocyclic group having at least one OH group or salt thereof. In a fourth embodiment, the organic group comprises at least one phosphonic acid group or salt thereof and at least one second ionic, ionizable or basic group. In a fifth embodiment, the organic group comprises at least one heteroaryl group having at least one carboxylic acid group or salt thereof. In a sixth embodiment, the organic group comprises an aryl group having at least one nitroso group and at least one OH group, or a salt thereof. In a seventh embodiment, the organic group comprises an azoarene group having at least two OH groups, at least two $NH_2$ groups, or at least one OH group and at least one $NH_2$ group and has the formula $Ar^1$—N=N—$Ar^2$, wherein $Ar^1$ and $Ar^2$, which can be the same or different, are an arylene group or an aryl group and at least one of $Ar^1$ or $Ar^2$ is an arylene group. Preferably, the organic group has a calcium index value greater than a calcium index value of phenylphosphonic acid and more preferably greater than a calcium index value of 1,2,3-benzene tricarboxylic acid.

The present invention further relates to a modified colorant as described herein that further comprises a second organic group that is different from the organic group. The second organic group may comprise at least one ionic group, at least one ionizable group, or a mixture thereof. Also, the second organic group may be a polymeric group.

The present invention further relates to inkjet ink composition comprising a) a liquid vehicle and b) the modified colorants described herein. The inkjet ink compositions may further comprise a second modified pigment comprising a pigment having attached a second organic group different from the organic group, such as at least one ionic group, at least one ionizable group, or a mixture thereof. The second organic group may also be a polymeric group.

DETAILED DESCRIPTION OF THE INVENTION

The present invention relates to modified colorants and to inkjet ink compositions comprising modified colorants.

The modified colorant of the present invention comprises a colorant having attached at least one organic group. The colorant may be any colorant known to one skilled in the art, such as a dye (which is a soluble colorant) or a pigment (which is an insoluble colorant). Preferably the colorant is an organic colorant or a carbonaceous pigment and is either a pigment or a disperse dye (which is soluble in a solvent but is water insoluble). Most preferred are pigments.

The dye of the modified colorant may be any of those known in the art, particularly those to which at least one organic group may be attached. Thus, the dye can be selected from an acid dye, a basic dye, a direct dye, a disperse dye, or a reactive dye. Combinations of dyes may also be used in order to form different shades. Examples of acid dye include, but are not limited to, Acid Red 18, Acid Red 27, Acid Red 52, Acid Red 249, Acid Red 289, Acid Blue 9, Acid Yellow 23, Acid Yellow 17, Acid Yellow 23, and Acid Black 52. Examples of basic dyes include, but are not limited to, Basic Red 1, Basic Blue 3, and Basic Yellow 13. Examples of direct dyes include, but are not limited to, Direct Red 227, Direct Blue 86, Direct Blue 199, Direct Yellow 86, Direct Yellow 132, Direct Yellow 4, Direct Yellow 50, Direct Yellow 132, Direct Yellow 104, Direct Black 170, Direct Black 22, Direct Blue 199, Direct Black 19, and Direct Black 168. Examples of reactive dyes include, but are not limited to, Reactive Red 180, Reactive Red 31, Reactive Red 29, Reactive Red 23, Reactive Red 120, Reactive Blue 49, Reactive Blue 25, Reactive Yellow 37, Reactive Black 31, Reactive Black 8, Reactive Green 19, and Reactive Orange 84. Other types of dyes can also be used, including, for example, Yellow 104 and Magenta 377.

The pigment of the modified colorant can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regale 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). Preferably the pigment is a cyan pigment, such as Pigment Blue 15 or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or black pigment, such as carbon black.

The pigment can have a wide range of BET surface areas, as measured by nitrogen adsorption, depending on the desired properties of the pigment. Preferably, the pigments have a BET surface area between about 10 $m^2/g$ and about 1500 $m^2/g$, more preferably between about 20 $m^2/g$ and about 600 $m^2/g$ and most preferably between about 50 $m^2/g$ and about 300 $m^2/g$. If the desired surface area is not readily available for the desired application, it is also well recognized by those skilled in the art that the pigment may be subjected to conventional size reduction or comminution techniques, such as ball or jet milling or sonication, to reduce the pigment to a smaller particle size, if desired. Also, the pigment can have a wide variety of primary particle sizes known in the art. For example, the pigment may have a primary particle size of between about 5 nm to about 100 nm, including about 10 nm to about 80 nm and 15 nm to about 50 nm. In addition, the pigment can also have a wide range of dibutylphthalate absorption (DBP) values, which is a measure of the structure or branching of the pigment. For example, the pigment may be a carbon black having a DBP value of from about 25 to 400 mL/100 g, including from about 30 to 200 mL/100 g and from about 50 to 150 mL/100 g. Also, the pigment may be an organic colored pigment having an oil adsorption value (as described in ISO 787 T5) of from about 5 to 150 mL/100 g, including from about 10 to 100 mL/100 g and from about 20 to 80 mL/100 g.

The pigment may also be a pigment that has been oxidized using an oxidizing agent in order to introduce ionic and/or ionizable groups onto the surface. Pigments prepared in this way have been found to have a higher degree of oxygen-containing groups on the surface. Oxidizing agents include, but are not limited to, oxygen gas, ozone, $NO_2$ (including mixtures of $NO_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. In addition, pigments prepared using other surface modification methods to introduce ionic or ionizable groups onto a pigment surface, such as chlorination and sulfonylation, may also be used.

As described above, it is preferred that the colorant is a pigment, and, therefore, the modified colorant is preferably a modified pigment. The modified pigment comprises the pigment having attached at least one organic group. Preferably the organic group is directly attached. The modified pigments may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the pigment compared to dispersant type methods, which use, for example, polymers and/or surfactants. Other methods for preparing the modified pigments include reacting a pigment having available functional groups with a reagent comprising the organic group, such as is described in, for example, U.S. Pat. No. 6,723,783, which is incorporated in its entirety by reference herein. Such functional pigments may be prepared using the methods described in the references incorporated above. In addition modified carbon blacks containing attached functional groups may also be prepared by the methods described in U.S. Pat. Nos. 6,831,194 and 6,660,075, U.S. Patent Publication Nos. 2003-0101901 and 2001-0036994, Canadian Patent No. 2,351,162, European Patent No. 1 394 221, and PCT Publication No. WO 04/63289, as well as in N. Tsubokawa, Polym. Sci., 17, 417, 1992, each of which is also incorporated in their entirety by reference herein.

In a first embodiment of the present invention, the organic group comprises at least one phosphorus-containing group having at least one P—O or P=O bond, such as at least one phosphonic acid group, at least one phosphinic acid group, at least one phosphinous acid group, at least one phosphite group, at least one phosphate, diphosphate, triphosphate, or pyrophosphate groups, partial esters thereof, or salts thereof. For example, the organic group comprises at least one phosphonic acid group, partial ester thereof, or salt thereof. Preferably the organic group comprises at least two of these groups, such as at least two phosphonic acid groups, partial esters thereof, or salts thereof. By "partial ester thereof" is meant that the phosphonic acid group may be a partial phosphonic acid ester group having the formula —$PO_3RH$, or a salt thereof, wherein R is an aryl, alkaryl, aralkyl, or alkyl group. When the organic group comprises at least two phosphonic acid groups or salts thereof, either or both of the phosphonic acid groups may be a partial phosphonic ester group. Also, one of the phosphonic acid groups may be a phosphonic acid ester having the formula —$PO_3R_2$ while the other phosphonic acid group may be either a partial phosphonic ester group, a phosphonic acid group, or a salt thereof. However, it is preferred that, for this embodiment, at least one of the phosphonic acid groups is either a phosphonic acid, a partial ester thereof, or salts thereof. By "salts thereof" is meant that the phosphonic acid group may be in a partially or fully ionized form having a cationic counterion. When the organic group comprises at least two phosphonic acid groups, either or both of the phosphonic acid groups may be in either a partially or fully ionized form. Thus, preferably the organic group comprises at least two phosphonic acid groups, wherein either or both may have the formula —$PO_3H_2$, —$PO_3H^- M^+$ (monobasic salt), or —$PO_3^{-2} M^+_2$ (dibasic salt), wherein $M^+$ is a cation such as $Na^+$, $K^+$, $Li^+$, or $NR_4^+$, wherein R, which can be the same or different, represents hydrogen or an organic group such as a substituted or unsubstituted aryl and/or alkyl group.

For this embodiment, the organic group may comprise at least one geminal bisphosphonic acid group, partial esters thereof, or salts thereof—that is, the organic group may comprise at least two phosphonic acid groups, partial esters thereof, or salts thereof that are directly bonded to the same carbon atom. Such a group may also be referred to as a 1,1-diphosphonic acid group, partial ester thereof, or salt thereof. Thus, for example, the organic group may comprise a group having the formula —$CQ(PO_3H_2)_2$, partial esters thereof, or salts thereof. Q is bonded to the geminal position and may be H, R, OR, SR, or $NR_2$ wherein R, which can be the same or different, is H, a C1-C18 saturated or unsaturated, branched or unbranched alkyl group, a C1-C18 saturated or unsaturated, branched or unbranched acyl group, an aralkyl group, an alkaryl group, or an aryl group. For example, Q may be H, R, OR, SR, or $NR_2$, wherein R, which can be the same or different, is H, a C1-C6 alkyl group, or an aryl group. Preferably Q is H, OH, or $NH_2$. Furthermore, the organic group may comprise a group having the formula —$(CH_2)_n$—$CQ(PO_3H_2)_2$, partial esters thereof, or salts thereof, wherein Q is as described above and n is 0 to 9, such as 1 to 9. Preferably n is 0 to 3, such as 1 to 3, and more preferably, n is either 0 or 1. Also, the organic group may comprise a group having the formula —X—$(CH_2)_n$—$CQ(PO_3H_2)_2$, partial esters thereof, or salts thereof, wherein Q and n are as described above and X is an arylene, heteroarylene, alkylene, vinylidene, alkarylene, aralkylene, cyclic, or heterocyclic group. Preferably X is an arylene group, such as a phenylene, naphthalene, or biphenylene group, which may be further substituted with any group, such as one or more alkyl groups or aryl groups. When X is an alkylene group, examples include, but are not limited to, substituted or unsubstituted alkylene groups, which may be branched or unbranched and can be substituted with one or more groups, such as aromatic groups. Examples include, but are not limited to, $C_1$-$C_{12}$ groups like methylene, ethylene, propylene, or butylene, groups. Preferably, X is directly attached to the pigment, meaning there are no additional atoms or groups from the attached organic group between the pigment and X.

X may be further substituted with one or more functional groups. Examples of functional groups include, but are not limited to, R', OR', COR', COOR', OCOR', carboxylates, halogens, CN, $NR'_2$, $SO_3H$, sulfonates, sulfates, NR'(COR'), $CONR'_2$, imides, $NO_2$, phosphates, phosphonates, N=NR', SOR', $NR'SO_2R'$, and $SO_2NR_2'$, wherein R' which can be the same or different, is independently hydrogen, branched or unbranched $C_1$-$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

In addition, the organic group may comprise a group having the formula —X-Sp-$(CH_2)_n$—$CQ(PO_3H_2)_2$, partial esters thereof, or salt thereof, wherein X, Q, and n are as described above. Sp is a spacer group, which, as used herein, is a link between two groups. Sp can be a bond or a chemical group. Examples of chemical groups include, but are not limited to, —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR''$—, —O—, —S—, —NR''—, —NR''CO—, —CONR''—, —NR''CO$_2$—, —$O_2$CNR''—, —NR''CONR''—, —N(COR'')CO—, —CON(COR'')—, —NR''COCH($CH_2CO_2R''$)— and cyclic imides therefrom, —NR''COCH$_2$CH($CO_2R''$)— and cyclic imides therefrom, —CH($CH_2CO_2R''$)CONR''— and cyclic imides therefrom, —CH($CO_2R''$)CH$_2$CONR'' and cyclic imides therefrom (including phthalimide and maleimides of these), sulfonamide groups (including —$SO_2NR''$— and —NR''$SO_2$— groups), arylene groups, alkylene groups and the like. R'', which can be the same or different, represents hydrogen or an organic group such as a substituted or unsubstituted aryl or alkyl group. As shown by the structure above, a group comprising at least two phosphonic acid groups or salts thereof is bonded to X through the spacer group Sp. Preferably, Sp is —$CO_2$—, —$O_2C$—, —O—, —NR''—, —NR''CO—, or —CONR''—, —$SO_2NR''$—, —$SO_2CH_2CH_2NR''$—, —$SO_2CH_2CH_2O$—, or —$SO_2CH_2CH_2S$— wherein R'' is H or a C1-C6 alkyl group.

In addition, the organic group may comprise at least one group having the formula —N—$[(CH_2)_m(PO_3H_2)]_2$, partial esters thereof, or salts thereof, wherein m, which can be the same or different, is 1 to 9. Preferably m is 1 to 3 and more preferably is 1 or 2. For example, the organic group may comprise at least one group having the formula —$(CH_2)_n$—N—$[(CH_2)_m(PO_3H_2)]_2$, partial esters thereof, or salts thereof, wherein n is 0 to 9, such as 1 to 9, and is preferably 0 to 3, such as 1 to 3, and m is as defined above. Also, the organic group may comprise at least one group having the formula —X—$(CH_2)_n$—N—$[(CH_2)_m(PO_3H_2)]_2$, partial esters thereof, or salts thereof, wherein X, m, and n are as described above and X is preferably an arylene group. Also, the organic group may comprise at least one group having the formula —X-Sp-$(CH_2)_n$—N—$[(CH_2)_m(PO_3H_2)]_2$, partial esters thereof, or salts thereof, wherein X, m, n, and Sp are as described above.

In addition, the organic group may comprise at least one group having the formula —CR=$C(PO_3H_2)_2$, partial esters thereof, or salts thereof. R can be H, a C1-C18 saturated or unsaturated, branched or unbranched alkyl group, a C1-C18 saturated or unsaturated, branched or unbranched acyl group, an aralkyl group, an alkaryl group, or an aryl group. Preferably, R is H, a C1-C6 alkyl group, or an aryl group.

For this embodiment, the organic group may comprise more than two phosphonic acid groups, partial esters thereof, or salts thereof and may, for example comprise more than one type of group (such as two or more) in which each type of group comprises at least two phosphonic acid groups, partial esters thereof, or salts thereof. For example, the organic group may comprise a group having the formula —X—[CQ$(PO_3H_2)_2]_p$, partial esters thereof, or salt thereof. X and Q are as described above, and preferably X is an arylene, heteroarylene, alkylene, alkarylene, or aralkylene group. In this formula, p is 1 to 4 and is preferably 2.

In addition, the organic group may comprise at least one vicinal bisphosphonic acid group, partial ester thereof, or salts thereof, meaning that these groups are adjacent to each other. Thus, the organic group may comprise two phosphonic acid groups, partial esters thereof, or salts thereof bonded to adjacent or neighboring carbon atoms. Such groups are also sometimes referred to as 1,2-diphosphonic acid groups, partial esters thereof, or salts thereof. The group comprising the two phosphonic acid groups, partial esters thereof, or salts thereof may be an aromatic group or an alkyl group, and therefore the vicinal bisphosphonic acid group may be a vicinal alkyl or a vicinal aryl diphosphonic acid group, partial ester thereof, or salts thereof. For example, the organic group may be a group having the formula —$C_6H_3$—$(PO_3H_2)_2$, partial esters thereof, or salts thereof, wherein the acid, ester, or salt groups are in positions ortho to each other.

In a second embodiment of the present invention, the organic group comprises at least one hydroxamic acid group or salt thereof. Thus, the organic group may comprise at least one group having the formula —N(OH)—CO— or a salt thereof. Such groups include, for example, amide or imide groups in which the amide or imide nitrogen is substituted with an OH group, and tautomers thereof. The hydroxamic acid group may be acyclic, in which the N—C bond is part of a non-cyclic group, or cyclic, in which the N—C bond is part of a cyclic group. Preferably, the cyclic hydroxamic acid group is a heterocyclic group, and more preferably a heteroaryl group, such as a hydroxy pyridonyl group (which may also be referred to as a hydroxy pyridinyl N-oxide group) or a hydroxy quinolonyl group (which may also be referred to as a hydroxy quinolinyl N-oxide group). Specific examples include a 1-hydroxy-2-pyridonyl group, a 1-hydroxy-2-quinolonyl group, or salts thereof. One skilled in the art would recognize that isomers and tautomers of these can also be used. In addition, the organic group may further comprise additional functional groups, including those described above, such as those for X. It has surprisingly been found that modified colorants, in particular, modified pigments comprising a pigment having attached at least one hydroxamic acid group have improved properties, particularly performance in an inkjet ink composition, compared to pigments having attached at least one organic group, wherein the organic group comprises other types of ionic or ionizable groups or other types of heterocyclic groups.

In a third embodiment of the present invention, the organic group comprises at least one heteroaryl group having at least one OH group, or salts thereof. Preferably the heteroaryl group is a nitrogen-containing heteroaryl group, such as a pyridinyl group or a quinolinyl group, and the organic group is a hydroxy pyridinyl group or a hydroxy quinolinyl group. The hydroxy group is preferably at a position on the heteroaryl group such that it is geometrically close to the heteroatom, such as ortho to the heteroatom. Such a group may be in the salt form. For example, the organic group may comprise a 2-hydroxy pyridinyl group or a 2-hydroxy-quinolinyl group, as well as an 8-hydroxy-quinolinyl group or salts thereof. Other isomers or tautomers will also be known to one skilled in the art. Preferably the organic group comprises an 8-hydroxy-quinolinyl group. In addition, the organic group may further comprise additional functional groups, including those described above for X. For example, electron withdrawing groups, such as chloro or nitro groups, may be included in order to lower the pKa of the OH group.

For this embodiment, the organic group may also comprise at least one heteroaryl group having at least two OH groups. When there are two OH groups, preferably the OH groups are in positions ortho to each other on the heteroaryl group. When there are more than two OH groups, it is preferred that at least two of the OH groups are in positions ortho to each other on the heteroaryl group. For example, the organic group may be a dihydroxy-pyridinyl group, such as a 2,3-dihydroxy-pyridinyl group (which can also be referred to as a 3-hydroxy-2-pyridonyl group), a 3,4-dihydroxy-pyridinyl group (which can also be referred to as a 3-hydroxy-4-pyridonyl group), a 2,3-dihydroxy-quinolinyl group (which can also be referred to as 3-hydroxy-2-quinolonyl group), or a 3,4-dihydroxy-quinolinyl group (which can also be referred to as a 3-hydroxy-4 quinolonyl group). Other isomers and tautomers will also be known to one skilled in the art.

In a fourth embodiment of the present invention, the organic group comprises at least one phosphonic acid group, a partial ester thereof, or salts thereof and at least one second ionic, ionizable group, or basic group. The second group is not a phosphonic acid group or salt thereof. Preferably, the second ionic or ionizable group is a carboxylic acid group, a sulfonic acid group, or a salt thereof. Preferably the basic group is a Lewis base, such as an OH group (a hydroxyl group) or an amino group. Preferably these two groups are geminal to each other, by which is meant, are directly bonded to the same carbon atom. Thus, for example, when the second ionic or ionizable group is a carboxylic acid group or salt thereof, the organic group may comprise a group having the formula —$CQ(PO_3H_2)(CO_2H)$ or salts thereof. Q, which is bonded to the geminal position, may be any of those described above. Preferably, Q is H. In addition, the organic group may comprise a group having the formula —$(CH_2)_n$—$CQ(PO_3H_2)(CO_2H)$ or salts thereof, wherein n is 0 to 9 and is preferably 0 to 3. Furthermore, the organic group may comprise a group having the formula —X—$(CH_2)_n$—$CQ(PO_3H_2)(CO_2H)$ or salt thereof, wherein X is as described above. Preferably, X is an arylene group. Also, the organic group may comprise a group having the formula —X-Sp-$(CH_2)_n$—$CQ(PO_3H_2)(CO_2H)$ or salt thereof, wherein X and Sp, which is a spacer group, are as described above. Preferably, X is an arylene group.

As a further example for this embodiment, the organic group may comprise at least one phosphonic acid group, a partial ester thereof, or salts thereof and at least one hydroxy group or salt thereof, such as a group having the formula —X—$(PO_3H_2)(OH)$ or salts thereof, wherein X is as described above. Preferably, X is an arylene group and, for this preferred formula, the phosphonic acid group and hydroxy group are in positions ortho to each other. When these groups are geminal, the organic group may comprise at least one group having the formula —$CR(PO_3H_2)(OH)$ or salts thereof, wherein R is H or a C1-C6 alkyl group. Preferably, R is H. Also, the organic group may comprise at least one group having the formula —$(CH_2)_n$—$CR(PO_3H_2)(OH)$ or salts thereof, wherein n is 0 to 9 and is preferably 0 to 3. Furthermore, the organic group may comprise a group having the formulas —X—$(CH_2)_n$—$CR(PO_3H_2)(OH)$ or salts thereof or —X-Sp-$(CH_2)_n$—$CR(PO_3H_2)(OH)$ or salts thereof, wherein X and Sp are as described above. Preferably X is an arylene group.

In a fifth embodiment of the present invention, the organic group comprises a heteroaryl group having at least one carboxylic acid group or salt thereof. While the heteroaryl group may be any of those known in the art, preferably the heteroaryl group is a nitrogen containing heteroaryl group, such as a pyridinyl group, a pyrimidinyl group, a pyrrolyl group, a quinolinyl group, or a pyrazinyl group. Preferably the organic group comprises two carboxylic acid groups or salts thereof.

These acid groups may be anywhere on the heteroaryl ring but are preferably either ortho or meta to each other. Furthermore, when the heteroaryl group contains at least one nitrogen atom, it is preferred that the two acid groups are both adjacent to (that is, ortho to) the nitrogen atom. Thus, for example, the heteroaryl group may be a 2,6-pyridinyl-dicarboxylic acid group.

In a sixth embodiment of the present invention, the organic comprises an aryl group having at least one nitroso group and at least one OH group, or a salt thereof. The two groups may be located anywhere on the aryl group. Preferably, the aryl group is a phenyl group and the nitroso and OH groups are in positions ortho to each other. The aryl group may further comprise other substituents, such as alkyl groups, halogen groups, ether groups and the like, including electron withdrawing groups, such as chloro and nitro groups, capable of lowering the pKa of the organic group, regardless of which tautomeric form it is in. For example, the organic group can be a nitrosophenolic group, such as a group having the formula —$C_6H_3(OH)(NO)$ or, preferably a group having the formula —$C_6H_2Z(OH)(NO)$, wherein Z is an electron withdrawing group such as chloro or nitro.

In a seventh embodiment of the present invention, the organic group comprises an azoarene group. For example, the organic group may comprise a group having the formula $Ar^1$—N=N—$Ar^2$, wherein $Ar^1$ and $Ar^2$, which can be the same or different, are an arylene group, such as a phenylene or a naphthylene group, or an aryl group, such as a phenyl group or a naphthyl group, and at least one of $Ar^1$ or $Ar^2$ is an arylene group. For this embodiment, the azoarene group has at least one and preferably at least two OH groups, at least one and preferably at least two $NH_2$ groups, or at least one OH group and at least one $NH_2$ group. Thus, for example, the azoarene group may have the formula —(HO)$Ar^1$—N=N—$Ar^2$(OH) (a bis-hydroxy azoarene group), —($H_2$N)$Ar^1$—N=N—$Ar^2$($NH_2$) (a bis-amino azoarene group), or —(HO)$Ar^1$—N=N—$Ar^2$($NH_2$) or —($H_2$N)$Ar^1$—N=N—$Ar^2$(OH) (an amino-hydroxy azoarene group). Other combinations may also be possible. Preferably, the OH and/or $NH_2$ groups are located at positions ortho to the azo group (the N=N group). For example, the organic group may be a group having the structure —(HO)$C_6H_3$—N=N—$C_6H_4$(OH). Also, electron withdrawing groups, such as chloro or nitro groups, may be included on the aryl and/or arylene groups. Thus, preferably, the organic group is a group having the structure —(HO)$C_6H_3$—N=N—$C_6H_3$Z(OH), wherein Z is an electron withdrawing group such as chloro or nitro.

For each of these embodiments, the amount of attached organic groups can be varied, depending on the desired use of the modified colorant and the type of attached group. For example, the total amount of organic group may be from about 0.01 to about 10.0 micromoles of groups/$m^2$ surface area of pigment, as measured by nitrogen adsorption (BET method), including from about 0.5 to about 5.0 micromoles/$m^2$, from about 1 to about 3 micromoles/$m^2$, or from about 2 to about 2.5 micromoles/$m^2$. Additional attached organic groups, which differ from those described for the various embodiments of the present invention, may also be present and are described in more detail below.

The modified colorant and, in particular, the modified pigment may be either in a solid form, such as a powder or a paste, or in a dispersion form. For example, the modified pigment may be produced in the form of a dispersion, and isolated from the dispersion in the form of a solid, such as by spray drying. Alternatively, a solid form of the modified pigment may be produced directly. Preferably the modified pigment is in the form of a dispersion. The modified pigment dispersion may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art.

The modified pigment may also be dispersed into a liquid medium, and the resulting dispersions may be purified or classified to remove impurities and other undesirable free species that can co-exist in the dispersion as a result of the manufacturing process. For example, the dispersion can be purified to remove any undesired free species, such as unreacted treating agent using known techniques such as ultrafiltration/diafiltration, reverse osmosis, or ion exchange. Preferably, the large particle concentration of the dispersion is also reduced in order to improve the overall dispersion stability. Thus, for example, particles having a size greater than 500 nm can be removed using techniques such as centrifugation.

It is preferred that the organic group attached to the colorant be a group that has a high calcium index value. As used herein, the term "calcium index value" refers to a measure of the ability of a functional group to coordinate or bind calcium ions in solution. The higher the calcium index value, the more strongly or effectively the group can coordinate calcium ions. Such a value can be determined using any method known in the art. For example, the calcium index value may be measured using a method in which the amount of calcium coordinated by a compound in a standard solution containing soluble calcium ions and a color indicator is measured using UV-Vis spectroscopy. In addition, for compounds having a strong color, the calcium index value may be measured using an NMR method. Also, for some compounds, values measured using known literature techniques can be used. Details relating to specific methods are described below.

As used herein, the term "high" in reference to the calcium index value means that the value is greater than that of a reference material. For the purposes of the present invention, the reference is phenylphosphonic acid and more preferably 1,2,3-benzene tricarboxylic acid. Thus, the organic group attached to the pigment has a calcium index value that is greater than the calcium index value of phenyl phosphonic acid and more preferably has a calcium index value greater than that of 1,2,3-benzene tricarboxylic acid. Preferably, the organic group has a calcium index value greater than 2.8, more preferably greater than 3.0, and most preferably greater than 3.2, determined using UV-Vis spectroscopy, as described in more detail below. Surprisingly it has been found that modified colorants and, in particular, modified pigments comprising pigments having attached the organic groups described herein, particularly those having a calcium index value greater than that of phenylphosphonic acid and more preferably greater than that of 1,2,3-benzene tricarboxylic acid, have improved properties, especially when used in an inkjet ink composition, compared to other attached groups, particularly those that have a calcium index value that is less than these reference compounds.

For each of the embodiments discussed above, the modified colorant, such as the modified pigment, may further comprise a second organic group, which is different from the organic groups described above. These include, for example, the groups described in U.S. Pat. No. 5,630,868, which is incorporated in its entirety by reference herein. For example, the modified pigment may further comprise a second attached organic group that may comprise at least one ionic group, at least one ionizable group, or a mixture thereof. Preferably the ionic or ionizable group is an anionic or anionizable group.

Anionic groups are associated with a counterion of the opposite charge including inorganic or organic counterions such as $Na^+$, $K^+$, $Li^+$, $NH_4^+$, $NR'_4^+$, where R', which can be the same or different, represents hydrogen or an organic group such as a substituted or unsubstituted aryl and/or alkyl group. Anionizable groups are ones that are capable of forming anionic groups in the medium of use. Preferably, the attached group is an organic group. Organic anionic groups include those described in U.S. Pat. No. 5,698,016, the description of which is fully incorporated herein by reference.

Anionic groups are negatively charged ionic groups that may be generated from groups having ionizable substituents that can form anions (anionizable groups), such as acidic substituents. They may also be the anion in the salts of ionizable substituents. Representative examples of anionic groups include $-COO^-$, $-SO_3^-$, $-OSO_3^-$, $-HPO_3^-$, $-PO_3^{-2}$, and $-PO_3^{-2}$. Representative examples of anionizable groups include $-COOH$, $-SO_3H$, $-PO_3H_2$, $-R'SH$, $-R'OH$, and $-SO_2NHCOR'$, where R', which can be the same or different, represents hydrogen or an organic group such as a substituted or unsubstituted aryl and/or alkyl group. Preferably, the attached group comprises a carboxylic acid group, a sulfonic acid group, a phosphonic acid group, or salts thereof, including a $-C_6H_4COOH$ group, a $-C_6H_4SO_3H$, or salts thereof. Preferably, the second organic group has a calcium index value greater than that of phenylphosphonic acid.

In addition, the second organic group may be a polymeric group. Thus, the modified colorant may be a colorant, such as a pigment, having attached at least one group described above and having attached or adsorbed at least one polymer. Preferably, the second organic group is an attached polymeric group comprising a polymer. The polymer can be a homopolymer, copolymer, terpolymer, and/or a polymer containing any number of different repeating units. Further, the polymer can be a random polymer, branched polymer, alternating polymer, graft polymer, block polymer, star-like polymer, and/or comb-like polymer. The type of attached polymer can be varied depending on the intended application. For example, the polymeric group comprises a polymer comprising acid groups and having an acid number of less than 200, such as less than 150, or less than 100, or less than 50. Acid numbers can be determined using any method known in the art, including titration with a strong base such as KOH. Specific examples include acid numbers between 100 and 200, between 50 and 100, and between 0 and 50. Also, the polymeric group may comprise a polymer having a Tg less than 100, such as between 50 and 100, and preferably less than 50. Furthermore, the polymeric group may comprise a polymer having a molecular weight (Mw) of between about 500-100,000, such as between about 1000 and 50,000 and between about 2,000 and 25,000. The polydispersity of the polymer of the polymeric group is generally less than 3, such as less than 2.5, and less than 2. Alternatively, the molecular weight distribution may be polymodal, such as bimodal. The polymeric group may be present in an amount of 0.1 to 50% by weight of the colorant and preferably 0.2 to 25% by weight of the colorant.

The polymer of the polymeric group may be prepared using any method known in the art. For example, the polymer can be prepared by the polymerization of one or more radically polymerizable monomers. Such monomers may provide the polymer with additional desirable properties, particularly useful in an inkjet ink composition. Examples include, but are not limited to, acrylic and methacrylic acid, acrylate esters, methacrylate esters, acrylamides and methacrylamides, acrylonitriles, cyanoacrylate esters, maleate and fumarate diesters, vinyl pyridines, vinyl N-alkylpyrroles, vinyl acetate, vinyl oxazoles, vinyl thiazoles, vinyl pyrimidines, vinyl imidazoles, vinyl ketones, vinyl ethers, and styrenes. Vinyl ketones include those in which the -carbon atom of the alkyl group does not bear a hydrogen atom, such as vinyl ketones in which both -carbons bear a C1-C4 alkyl group, halogen, etc. or a vinyl phenyl ketone in which the phenyl group may be substituted with from 1 to 5 C1-C6 alkyl groups and/or halogen atoms. Styrenes include those in which the vinyl group is substituted with a C1-C6 alkyl group, such as at the -carbon atom, and/or those in which the phenyl group is substituted with from 1 to 5 substituents including a C1-C6 alkyl, alkenyl (including vinyl), or alkynyl (including acetylenyl) group, a phenyl group, a haloalkyl group, and functional groups such as C1-C6 alkoxy, halogen, nitro, carboxy, sulfonate, C1-C6 alkoxycarbonyl, hydroxy (including those protected with a C1-C6 acyl group), and cyano groups. Specific examples include methyl acrylate (MA), methyl methacrylate (MMA), ethyl acrylate (EA), ethyl methacrylate (EMA), butyl acrylate (BA), 2-ethylhexyl acrylate (EHA), acrylonitrile (AN), methacrylonitrile, styrene, and derivatives thereof.

The polymer can be prepared by the cationic or anionic polymerization of one or more polymerizable monomers. For example, polyvinyl ethers can be prepared by cationic polymerization of monomers, such as those having the general structure $CH_2=CH(OR)$, wherein R is an alkyl, aralkyl, alkaryl, or aryl group or is a group comprising one or more alkylene oxide groups. Other cationically or anionically polymerizable monomers can also be included.

The polymer can also be prepared by polycondensation techniques. For example, the polymer may be a polyester or a polyurethane. For polyurethanes, examples of suitable methods include a solution method which comprises preparing an isocyanate-terminated prepolymer in a low boiling solvent (such as acetone) unreactive with an isocyanate group, introducing a hydrophilic group such as diamine or polyol therein, effecting phase change by diluting with water, and distilling off a solvent to obtain a polyurethane dispersion. Another suitable method comprises preparing an isocyanate group-terminated prepolymer having a hydrophilic group introduced, dispersing in water, and extending a chain with an amine.

Particularly, a polyurethane may be prepared by the prepolymer method, and a polyhydroxy compound having a low molecular weight may be used at that time. Examples of the polyhydroxy compound having a low molecular weight include the above illustrated starting materials of the polyester diol, such as glycol and alkylene oxide-low mol adduct, a trihydric alcohol such as glycerin, trimethylolethane or trimethylolpropane, its alkylene oxide-low mol adduct, and the like.

For water dispersible polyurethanes, it is generally known to use a method which comprises effecting phase change of a urethane polymer prepared in an organic solvent phase and emulsifying to further extend a chain in an aqueous phase. It is usual to use polyamines such as diamine as a chain extender at that time. For example, the urethane prepolymer is subjected to neutralization of an acid group derived from dimethylolalkanoic acid and chain extension with water or di- or triamine after or while neutralizing. Examples of the polyamines used as a chain extender in the amine extension include generally diamine or triamine. Their particular examples include hexamethylenediamine, isophoronediamine, hydrazine, piperazine and the like.

The polymer may be either attached to the colorant or it may be a coating on the colorant. Thus, the second modified colorant may be a polymer coated pigment comprising a pigment and at least one adsorbed polymer, which can be prepared by the polymerization of at least one of the monomers described above. Such coated pigments can be prepared, for example, by combining the modified pigment and the polymer or by preparing the polymer in the presence of the modified pigment, using methods known in the art, such as those described in U.S. Pat. Nos. 5,085,698, 5,998,501, 6,074,467, and 6,852,777 as well as PCT Publication No. WO 2004/111140, each,of which is incorporated in their entirety by reference herein. p Furthermore, the polymer may be attached to the colorant. Thus, for example, the colorant may be a modified pigment comprising a pigment having attached at least one organic group described above and at least one second organic group which comprises a polymeric group, wherein the polymeric group comprises a polymer prepared by the polymerization of at least one of the monomers described above. Such polymer modified colorants and, in particular, polymer modified pigments, may be prepared using any technique known in the art including, for example, reaction of a functional group of a polymer with a functional group of a pigment (as shown in, for example, U.S. Pat. No. 6,723,783 or European Patent No. 0 272 127), including the reaction of an end or terminal functional polymer and a pigment, or reaction of an amine-containing functional group of a polymer, including end or terminal functional polymers, with a diazotizing agent which is then further reacted with a pigment (as shown in, for example, U.S. Pat. No. 6,478,863). The polymer modified pigments may also be prepared by polymerization of monomers from a pigment. For example, the polymer modified pigments may be prepared by radical polymerization, controlled polymerization methods, such as atom transfer radical polymerization (ATRP), stable free radical (SFR) polymerization, and reversible addition-fragmentation chain transfer polymerization (RAFT), ionic polymerizations (anionic or cationic) such as group transfer polymerization (GTP), and condensation polymerization. Also, the polymer modified pigments may be prepared using the methods described in, for example, U.S. Pat. Nos. 6,372,820; 6,350,519; 6,551,393; or 6,368,239 or in International Patent Publication Nos. 2006/086599 and 2006/086660. Each of these references are incorporated in their entirety by reference herein.

When the second organic group comprises a polymeric group, the organic group may comprise an aryl or alkyl poly-acid group comprising at least two carboxylic acid groups, preferably at least three carboxylic acid groups. For example, the organic group may be an alkyl poly-acid group having at least two acid groups, at least three, four, or more acid groups, such as at least two carboxylic acid groups, at least three or more carboxylic groups, as well as other types of acid groups in addition or in the alternative. The organic group may also comprise an aryl polyacid group. This group comprises at least two carboxylic acid groups. Preferably, the carboxylic acid groups are vicinal, meaning that they are adjacent to each. Thus, the aryl polyacid group can be substituted with at least one group that comprises two adjacent carboxylic acid groups (i.e., carboxylic acid groups bonded to adjacent or neighboring carbon atoms), sometimes also referred to as a vicinal dicarboxylic acid or a 1,2-dicarboxylic acid. Thus, the aryl polyacid group may comprise a group having three or more carboxylic acid groups, wherein at least two of the carboxylic acid groups are adjacent to each other, forming a vicinal dicarboxylic acid group. For example, the aromatic amine may comprise a 1,2,3- or 1,2,4-tricarboxylic acid group, such as a —$C_6H_2$—$(COOH)_3$ group, or may comprise a 1,2,3,4- or 1,2,4,5-tetra carboxylic acid group, such as a —$C_6H$—$(COOH)_4$ group. Other substitution patterns are also possible and will be known to one skilled in the art.

The modified colorants of the present invention may be used in a variety of applications, including, for example, plastic compositions, aqueous or non-aqueous inks, aqueous or non-aqueous coatings, rubber compositions, paper compositions and textile compositions. In particular, these pigments may be used in aqueous compositions, including, for example, automotive and industrial coatings, paints, toners, adhesives, latexes, and inks. The pigments have been found to be most useful in ink compositions, especially inkjet inks. Thus, the present invention further relates to an inkjet ink composition comprising a vehicle and a colorant. Preferably the colorant is a pigment. The vehicle can be either an aqueous or non-aqueous liquid vehicle, but is preferably a vehicle that contains water. Thus, the vehicle is preferably an aqueous vehicle, and the inkjet ink composition is an aqueous inkjet ink composition. More preferably the vehicle contains greater than 50% water and includes, for example, water or mixtures of water with water miscible solvents such as alcohols.

The colorant can be any of the modified colorants described above and is preferably a modified pigment. The colorant is present in the inkjet ink composition in an amount effective to provide the desired image quality (for example, optical density) without detrimentally affecting the performance of the inkjet ink. Typically, the colorant is present in an amount ranging from about 0.1% to about 30% based on the weight of the ink. More or less colorant may be used depending on a variety of factors. For example, for the inkjet ink composition comprising the modified pigments of the present invention, the amount of pigment may vary depending on the amount of attached organic group, particularly when the organic group has a high molecular weight. It is also within the bounds of the present invention to use a mixture of colorants, including, for example, a mixture of the various modified pigments described herein, or mixtures of these modified pigments and unmodified pigments, such as oxidized pigments including self-dispersible oxidized pigments prepared using peroxide, ozone, persulfate, and hypohalites (some of which are commercially available from Rohm and Haas or Orient), other modified pigments, or both. Furthermore, it is also within the bounds of the present invention to use the modified pigments of the present invention, which have been encapsulated by a polymer, including any of the polymers described above relating to the attached polymeric group. Also, mixtures of modified colorants wherein one colorant comprises a dye and one colorant comprises a pigment may also be used.

For example, the inkjet ink composition of the present invention may comprises a liquid vehicle, a first modified pigment, which is a modified pigment of the present invention as described above, and a second modified pigment comprising a second pigment having attached at least one second organic group, which is different from the organic group of the first modified pigment. The pigment and the second pigment may be the same or different, depending, for example, if the blends of pigments are to create a specific target color or if the blend of pigments is to provide the same color using different types of modified pigments. The second organic group can be a group comprising at least one ionic group, at least one ionizable group, or a mixture thereof. Any of the ionic or ionizable groups described above relating to a second attached organic group of the modified pigment can be used here.

Also, the inkjet ink composition of the present invention may comprise a liquid vehicle, a first modified pigment, which is a modified pigment of the present invention as described above, and a second modified pigment comprising a second pigment having at least one attached or adsorbed polymer. Any of the polymers described above relating to the modified pigment of the present invention may also be used here. For example, the second modified pigment may be a polymer coated pigment, such as a polymer encapsulated pigment, comprising a pigment and at least one adsorbed polymer. Also, the second modified pigment may comprise a pigment having at least one attached polymeric group, wherein the polymeric group comprises the polymer.

The inkjet ink composition of the present invention can be formed with a minimum of additional components (additives and/or cosolvents) and processing steps. However, suitable additives may be incorporated in order to impart a number of desired properties while maintaining the stability of the compositions. For example, surfactants and/or dispersants, humectants, drying accelerators, penetrants, biocides, binders, and pH control agents, as well as other additives known in the art, may be added. The amount of a particular additive will vary depending on a variety of factors but generally ranges between 0% and 40%.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be in solid form or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Specific examples include, but are not limited to, commercial products such as Versa® 4, Versa® 7, and Versa® 77 (National Starch and Chemical Co.); Lomar® D (Diamond Shamrock Chemicals Co.); Daxad®19 and Daxad® K (W. R. Grace Co.); and Tamol® SN (Rohm & Haas). Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols (such as Surfynol® 420, Surfynol® 440, and Surfynol® 465, available from Air Products), polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used, such as Igepal® CA and CO series materials (Rhone-Poulenc Co.), Brij® Series materials (ICI Americas, Inc.), and Triton® series materials (Union Carbide Company). These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, such as Elvanols from DuPont, Celvoline from Celanese, polyvinylpyrrolidones such as Luvatec from BASF, Kollidon and Plasdone from ISP, and PVP-K, Glide, acrylic or methacrylic resins (often written as "(meth)acrylic") such as poly (meth)acrylic acid, Ethacryl line from Lyondell, Alcosperse from Alco, acrylic acid-(meth)acrylonitrile copolymers, potassium (meth)acrylate-(meth)acrylonitrile copolymers, vinyl acetate-(meth)acrylate ester copolymers and (meth) acrylic acid-(meth)acrylate ester copolymers; styrene-acrylic or methacrylic resins such as styrene-(meth)acrylic acid copolymers, such as the Joncryl line from BASF, Carbomers from Noveon, styrene-(meth)acrylic acid-(meth)acrylate ester copolymers, such as the Joncryl polymers from BASF, styrene-methylstyrene-(meth)acrylic acid copolymers, styrene-methylstyrene-(meth)acrylic acid-(meth)acrylate ester copolymers; styrene-maleic acid copolymers; styrene-maleic anhydride copolymers, such as the SMA polymers from Sartomer, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof. Polymers, such as those listed above, variations and related materials, that can be used for dispersants and additives in inkjet inks are included in the Tego products from Degussa, the Ethacryl products from Lyondell, the Joncryl polymers from BASF, the EFKA dispersants from Ciba, and the Disperbyk and Byk dispersants from BYK Chemie.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene)glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propyl-carboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols (Elvanols from DuPont, Celvoline from Celanese), hydroxypropylenecellulose, hydroxyethylcellulose, polyvinylpyrrolidinone (such as Luvatec from BASF, Kollidon and Plasdone from ISP, and PVP-K, Glide), polyvinylether, starch, polysaccharides, polyethyleneimines with or without being derivatized with ethylene oxide and propylene oxide including the Discole® series (DKS International); the Jeffamine® series (Huntsman); and the like. Additional examples of water-soluble polymer compounds include various dispersants or surfactants described above, including, for example, styrene-acrylic acid copolymers (such as the Joncryl line from BASF, Carbomers from Noveon), styrene-acrylic acid-alkyl acrylate terpolymers, styrene-methacrylic acid copolymers (such as the Joncryl line from BASF), styrene-maleic acid copolymers (such as the SMA polymers from Sartomer), styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers (such as NeoCryl materials from NSM Neoresins, the AC and AS polymers from Alberdingk-Boley) or may be a water dispersible polyurethane (such as ABU from Alberdingk-Boley) or polyester (such as AQ polymers from Eastman Chemical). Polymers, such as those listed above, variations and related materials, that can be used for binders in inkjet inks are included in the Ethacryl products from Lyondell, the Joncryl polymers from BASF, the NeoCryl materials from NSM Neoresins, and the AC and AS polymers Alberdingk-Boley.

Various additives for controlling or regulating the pH of the inkjet ink composition of the present invention may also be used. Examples of suitable pH regulators include various amines such as diethanolamine and triethanolamine as well as various hydroxide reagents. An hydroxide reagent is any reagent that comprises an $OH^-$ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate $OH^-$ ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate conventional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink composition can be purified and/or classified using methods such as those described above for the modified pigments of the present invention. An optional counterion exchange step can also be used. Thus, unwanted impurities or undesirable large particles can be removed to produce an ink with good overall properties.

It has surprisingly been found that inkjet ink compositions comprising the modified colorants and, in particular, the modified pigments of the present invention, have improved overall properties compared to previously described inkjet ink compositions. While not wishing to be bound by theory, it is believed that a modified pigment comprising a pigment having the attached groups described above, particularly those with a calcium index value as set forth above, produce stable dispersions that rapidly destabilize when in contact with a substrate, such as paper. The destabilization may be a result of an interaction or binding with calcium salts or other divalent metal salts present in or on the substrate, whether present in the substrate or whether subsequently added, such as by printing with a fixer fluid containing metal salts. Alternatively, or in addition, destabilization may result from a change in pH on contact with the substrate, which may be particularly advantageous for pigments having the attached functional groups described above. It is believed that the rapid destabilization after printing, caused either by a change in pH, interaction with calcium, or both, results in printed images with good overall properties, such as optical density, edge acuity, and/or intercolor bleed.

The present invention further relates to an inkjet ink set which comprises various inkjet ink compositions and includes the inkjet ink composition of the present invention. The inkjet ink compositions of this set may differ in any way known in the art. For example, the inkjet ink set may comprise inkjet ink compositions comprising different types and/or colors of colorants, including, for example, an inkjet ink composition comprising a cyan pigment, an inkjet ink composition comprising a magenta pigment, and/or an inkjet ink composition comprising a black pigment. Other types of inkjet ink compositions may also be used, including, for example, compositions comprising agents designed to fix the inkjet ink compositions onto the substrate. Other combinations will be known in the art.

The present invention will be further clarified by the following examples, which are intended to be only exemplary in nature.

EXAMPLES

Examples 1-6

The following examples describe the preparation of materials (treating agents) used to produce modified pigments according to an embodiment of the present invention, comprising a pigment having attached at least two phosphonic acid groups or salts thereof.

Example 1

[2-(4-(Aminophenyl)-1-hydroxyethane-1,1-diyl]bisphosphonic acid monosodium salt was prepared using a procedure similar to that shown in Kieczykowski et al., J. Org. Chem., 1995, 60, 8310-8312 as well as in U.S. Pat. No. 4,922,007, which are incorporated in their entirety by reference herein. Thus, a 500 mL three neck flask was fitted with a condenser with a gas outlet on the top of the condenser, a thermometer and dry nitrogen inlet, and a 100 mL pressure equilibrating addition funnel. To this flask was first added 32 g of phosphorous acid (380 mmol) and 160 mL of methanesulfonic acid (solvent). To the stirred mixture was added portion-wise 57.4 g of aminophenyl acetic acid (380 mmol). The stirred mixture was heated to 65° C. for 1-2 hours to allow the solids to completely dissolve. The whole system was flushed with dry nitrogen, and the temperature was reduced to 40° C. after all of the solids had dissolved. To this heated solution was slowly added 70 mL of $PCl_3$ (800 mmol) through the addition funnel. HCl gas was generated from the reaction, which flowed through the gas outlet, into a dry tube, and then into a concentrated NaOH solution in a beaker through a funnel. After the addition was complete, the reaction mixture was stirred and heated at 40° C. for two hours. After this time, the temperature was raised to 65-70° C., and the mixture was stirred overnight. The resulting clear, brown colored solution was cooled to room temperature and quenched by addition into 600 g of an ice/water mixture. The aqueous mixture was placed into a 1 L beaker and was heated to 90-95° C. for 4 hours (the top of the beaker could be covered with a glass plate). The mixture was then allowed to cool to room temperature, and the pH of the mixture was adjusted to 4-5 with 50% NaOH solution, added slowly as the temperature would rise as a result of the quenching. The mixture was cooled to 5° C. with an ice bath for 2 hours and then the resulting solids were collected by suction filtration, washed with 1 L cold DI water and dried at 60° C. overnight, yielding a white or off white solid product (yield was 48 g, 39%). $^1$HNMR data for this compound ($D_2O$/NaOH) was as follows: 7.3 (2H, d), 6.76(2H, d), 3.2 (2H, t). $^{13}$CNMR data for this compound ($D_2O$/NaOH) was as follows: 141, 130, 128, 112, 73.

Example 2

[2-(4-(Aminophenyl)-1-hydroxypropane-1,1-diyl]bisphosphonic acid monosodium salt was prepared (66% yield) using the procedure described in Example 1, with the exception that 4-aminophenyl propionic acid was used in place of 4-aminophenyl acetic acid, which was prepared by hydrogenation of 4-nitrocinnamic acid.

Example 3

[2-(4-(Aminophenyl)-1-hydroxybutane-1,1-diyl]bisphosphonic acid monosodium salt was prepared (58% yield) using the procedure described in Example 1, with the exception that 4-aminophenyl butyric acid was used in place of 4-aminophenyl acetic acid.

Example 4

[4-(Aminophenyl)(hydroxyl)methylene]bisphosphonic acid monosodium salt was prepared following the general procedure described in Lecouvey et al., Tetrahedron Lett., 42, 2001, 8475-8478, which is incorporated in its entirety by reference herein. Thus, 4-nitrobenzoyl chloride (14.1 g, 75 mmol) was dissolved in 100 mL of dry THF in a 300 mL round bottom flask. The mixture was stirred and cooled to −78° C. with a dry ice/acetone bath. To this was slowly added tris(trimethylsilyl)phosphite (50 mL, 150 mmol) by a syringe through a rubber septum. The low temperature was maintained for another 30 min after the addition was complete. After 30 min, the temperature was allowed to rise to room temperature by taking away the cold bath. Once at room temperature, volatile components were removed with in vacuo. To the resulting residue was added 150 mL of methanol, and the mixture was stirred at room temperature for 1 hour. The solvent was again removed in vacuo.

The resulting crude product was dissolved in 150 mL of DI water with pH adjusted to 8.5 using NaOH. To this was added 5 g 5% Pd/C and the mixture was hydrogenated at 40 psi for 4 hours. After this time, the catalyst was filtered off, and the pH of the filtrate was adjusted to 4.5 with concentrated HCl. After cooling to 4° C. overnight, the precipitated light yellow solid was collected by suction filtration and dried, yielding 20.8 g (88% from benzoyl chloride) of product.

$^1$HNMR data for this compound ($D_2O$/NaOH) was as follows: 7.6 (2H, d), 6.8(2H, d).

Example 5

[Amino-(4-(aminophenyl)methylene]bisphosphonic acid, monosodium salt was prepared using either Method 1 or Method 2, described below.

Method 1:

This procedure is similar to that described in M. Eisenhut, et al., Appl. Radiat. Isot., 38(7), 1987, 535-540. Thus, a 1000 mL round bottom flask was charged with 4-nitrobenzonitrile (50 g, 0.333 mol) and phosphorous acid (55 g, 0.666 mol) in 400 mL of 1,4-dioxane. The mixture was stirred at room temperature until all the solids dissolved. To this was added phosphorous tribromide (180 g, 0.666 mol) through an addition funnel. After the addition was complete, the addition funnel was replaced with a reflux condenser, and the mixture was stirred, first at room temperature for 2 hours and then at 60° C. for 4 hours. On cooling, the reaction mixture separated into two phases. The upper phase, which was essentially 1,4-dioxane and unreacted starting material, was decanted off. The remaining sticky oily residue layer was hydrolyzed by the addition of 200 mL of DI water to form a mixture that is heated to 70° C. for approximately 30 minutes and then allowed to cool to room temperature. To the resulting mixture was added 400 mL of methanol, and this was left at 4° C. overnight. The resulting precipitate was collected by suction filtration and used without further purification in the next step.

All of the precipitate was mixed with 600-700 mL of DI water, and the pH of the mixture was adjusted to 9-10 with concentrated NaOH. The hydrogenation was accomplished in three portions with 10 g of Pd/C used for each portion (2 hours each at 40 psi $H_2$). The catalyst was then filtered off, and the filtrate was pH adjusted to 4 with concentrated HCl. The resulting precipitate was collected and redissolved in 600 ml DI water (pH adjusted to 9 with NaOH). Acidification with HCl afforded 32.7 g of the desired product as a white solid (32.5%). $^1$HNMR data for this compound ($D_2O$/NaOH) was as follows: 7.5 (2H, d), 6.7(2H, d).

Method 2:

This procedure is similar to that of described in Example 1. Thus, a 500 mL three neck flask was fitted with a condenser with a gas outlet on the top of the condenser, a thermometer and dry nitrogen inlet, and a 100 mL pressure equilibrating addition funnel. To this flask was first added 34 g of phosphorous acid (400 mmol) and 200 mL of methanesulfonic acid (solvent). To the stirred mixture was added portion-wise 23.6 g of 4-aminobenzonitrile (200 mmol). The stirred mixture was heated to 65° C. for 1-2 hours to allow the solids to completely dissolve. The whole system was flushed with dry nitrogen, and the temperature was reduced to 30° C. after all of the solids had dissolved. To this heated solution was slowly added 35 mL of $PCl_3$ (400 mmol) through the addition funnel. HCl gas was generated from the reaction, which flowed through the gas outlet, into a dry tube and then into a concentrated NaOH solution in a beaker through a funnel. After the addition was complete, the reaction mixture was stirred and heated at 40° C. for two hours. After this time, the temperature was raised to 60° C., and the mixture was stirred for 6-8 hours (or until no bubbles were observed). The resulting clear, sticky brown colored mixture was cooled to room temperature and quenched by addition into 600 g of an ice/water mixture. The aqueous mixture was placed into a 1 L beaker and was heated to 90-95° C. for 1 hour. The mixture was then allowed to cool to room temperature. The resulting solids were collected by filtration and redissolved in 600 ml of DI water (pH adjusted to 9 with NaOH). Acidification with HCl afforded the desired product as a white solid (32 g, 51% yield).

Example 6

[2-(4-(Aminophenyl)ethane-1,1-diyl]bisphosphonic acid monosodium salt was prepared using one of the following methods.

Method A

In an ice bath-cooled 500 mL round bottom flask, NaH (4.3 g, 60% in mineral oil, 0.107 mol) was suspended in 100 mL of dry THF with protection from moisture. To this suspension was slowly added tetraisopropyl methylenediphosphonate (37.0 g, 0.107 mol) through an addition funnel. The mixture was stirred at 10-15° C. for 1 hour or until the mixture became a light yellow clear solution. The solution was then cooled to −78° C. with a dry ice/acetone bath. To this was added 4-nitrobenzyl bromide (23.4 g, 0.107 mol) dissolved in 100 mL of dry THF. The dry ice/acetone bath was removed after the addition was completed. The mixture turned to a dark brown color and was stirred at room temperature overnight. In the morning, the mixture had become yellowish again. The NaBr solids were filtered off, and the solvent was removed by evaporation. The resulting residue was then dissolved in 400 mL of ethyl acetate and washed first with 300 mL of DI water, then with 300 mL of a 1M HCl solution, and finally with 300 mL of a saturated $NaHCO_3$ solution. After drying over $Na_2SO_4$, the ethyl acetate was removed in vacuo. The oil residue was mixed with 250 mL of concentrated HCl, and the mixture was refluxed for 4 hours. After cooling to room temperature, the solids were filtered off, and the solvent of the filtrate was removed in vacuo. The resulting oily residue was redissolved in 200 mL of DI water, was pH adjusted to 8.5 with NaOH, and finally extracted with 3×150 mL of ethyl acetate.

To the aqueous layer was added 10 g of 5% Pd/C, and this was hydrogenated at 40 psi for 4 hours. The catalyst was filtered off, and the pH of the filtrate was adjusted to approximately 4 with 5 M HCl. The desired product formed as a white precipitate, which was isolated by filtration and dried (13.7 g, 45% yield). $^1$HNMR data for this compound ($D_2$ONaOH) was as follows: 7.2 (2H, d), 6.7(2H, d), 3.0 (2H, t).

Method B

A method described in Lehnert, W. Tetrahedron, 30, 1974, 201-355 was followed by condensing tetraethylmethylenediphosphonate with 4-nitrobenzaldehyde in the presence of TiCl4 and N-methylmorpholine, followed by hydrogenation with Pd/C and hydrolysis of the intermediate with concentrated HCl. By using this method, the yield could be improved to 50-60% based on tetraethylmethylenediphosphonate.

Examples 7-13

The following examples describe the preparation of modified pigments according to an embodiment of the present invention, comprising a pigment having attached at least two phosphonic acid groups or salts thereof. For each example, the mean volume particle size (mV) of the modified pigment in the dispersion was measured using a Microtrac® Particle Size Analyzer.

Examples 7a-7c

For these examples, the following general procedure was followed. For Example 7a, Black Pearls 700® carbon black (available from Cabot Corporation) was used, for Example 7b, Pigment Red 122 (available from Sun Chemical) was used, and for Example 7c, Pigment Blue 15:4 (available from Sun Chemical) was used.

20 g of pigment, 20 mmol of the material prepared in Example 1, 20 mmol of nitric acid, and 200 mL of DI water were mixed with a Silverson mixer (6000 rpm) at room temperature. After 30 min, sodium nitrite (20 mmol) in a small amount of water was added slowly into the mixture. The temperature reached 60° C. through mixing, and this was allowed to proceed for 1 hour. A modified pigment of the present invention was produced. The pH was adjusted to 10 with a NaOH solution. After 30 min, the resulting dispersion of modified pigment, comprising a pigment having attached at least two phosphonic acid groups or salts thereof, was diafiltered with a Spectrum membrane using 20 volumes of DI water and concentrated to approximately 12% solids. After 30 min of sonication with a sonic probe, the mean volume particle size (mV) of the modified pigment in the dispersion was determined. Results are shown in Table 1 below.

Example 8

The procedure described in Example 7a was followed, with the exception that the material prepared in Example 2 was used in place of the material prepared in Example 1. The mean volume particle size (mV) of the modified pigment in the dispersion was determined. Results are shown in Table 1 below.

Example 9

The procedure described in Example 7a was followed, with the exception that the material prepared in Example 3 was used in place of the material prepared in Example 1. The mean volume particle size (mV) of the modified pigment in the dispersion was determined. Results are shown in Table 1 below.

Example 10

The procedure described in Example 7a was followed, with the exception that the material prepared in Example 4 was used in place of the material prepared in Example 1. The mean volume particle size (mV) of the modified pigment in the dispersion was determined. Results are shown in Table 1 below.

Example 11

20 mmol of the material prepared in Example 5 was dissolved in 200 mL of DI water at pH 9. The solution was mixed with 20 g of Black Pearls® 700 carbon black with a Silverson mixer (6000 rpm) at room temperature. The pH of the mixture was adjusted to 9 with a dilute NaOH solution to allow the material to dissolve. After 30 min, 40 mmol of nitric acid was added, and the pH of the mixture was found to be approximately 4. Sodium nitrite (40 mmol) in a small amount of water was added slowly into the mixture. The temperature reached 60° C. through mixing, and this was allowed to proceed for 1 hour. A modified pigment of the present invention was produced. The pH, which was found to be approximately 6, was adjusted to 10 with a NaOH solution. After 30 min, the resulting modified pigment dispersion was diafiltered with a Spectrum membrane using 20 volumes of DI water and concentrated to approximately 12% solids. After 30 min of sonication with a sonic probe, the mean volume particle size (mV) of the modified pigment in the dispersion was determined and found to be between approximately 120-130 nm.

Example 12

The procedure described in Example 7a was followed, with the exception that the material prepared in Example 6 was used in place of the material prepared in Example 1. The mean volume particle size (mV) of the modified pigment in the dispersion was determined. Results are shown in Table 1 below.

Example 13

30 mmol of the material prepared in Example 5 was dissolved in 200 mL of DI water at pH 9. Sodium nitrite (40 mmol) was added, and the solution was mixed with 20 g of Black Pearls® 700 carbon black with a Silverson mixer (6000 rpm) at room temperature. After 30 min, the pH of the mixture was adjusted to approximately 5 with 60 mmol of 70% nitric acid. The temperature reached 60° C. through mixing, and this was allowed to proceed for 1 hour. A modified pigment of the present invention was produced. The pH was adjusted to 10 with NaOH solution. After 30 min, the resulting modified pigment dispersion was diafiltered with a Spectrum membrane using 20 volumes of DI water and concentrated to approximately 12% solids. After 30 min of sonication with a sonic probe, the mean volume particle size (mV) of the modified pigment in the dispersion was determined. Results are shown in Table 1 below.

Comparative Example 1

A modified pigment comprising a carbon black pigment having attached a phenyl acetic acid salt group (that is, having attached one alkyl carboxylic acid salt group) was prepared using a procedure similar to Example 7a, with the exception that 4-aminophenyl acetic acid was used in place of the material from Example 1.

Comparative Example 2

A modified pigment comprising a carbon black pigment having attached a benzyl phosphonic acid salt group (that is, having attached one phosphonic acid group or salts thereof) was prepared using a procedure similar to Example 7a, with the exception that 4-aminobenzyl phosphonic acid (available from Sigma Aldrich) was used in place of the material from Example 1.

Comparative Example 3

A modified pigment comprising a carbon black pigment having attached a 1,2,3-phenylene tricarboxylic acid group was prepared using a procedure similar to that of Example 73.

Examples 14-19

The following examples describe the preparation and print performance of inkjet ink compositions according to an embodiment of the present invention. The modified pigment dispersions of Examples 7a, 8, 9, 10, 12, and 13 were centrifuged and suction filtered to remove any potential small amounts of large particles. Na$^+$ concentration was measured using an ion selective electrode (Thermo Orion Sure-flow Ross sodium probe, calibrated for solutions containing 20 ppm to 6000 ppm sodium ions) and calculated on a solids basis. Results are shown in Table 1 below.

TABLE 1

| Example # | Treatment Level (mmol/gr) | pH | mV (nm) | Na$^+$ (ppm) | Attachment Level (µmol/m$^2$) |
|---|---|---|---|---|---|
| 7a | 1 | 8.8 | 130 | 11776 | 1.4 |
| 8 | 1 | 8.6 | 125 | 15125 | 1.9 |
| 9 | 1 | 8.3 | 113 | 15777 | 2.0 |
| 10 | 1 | 7.8 | 110 | 12581 | 1.5 |
| 12 | 1 | 8.0 | 122 | 12650 | 1.5 |
| 13 | 1.5 | 8.7 | 135 | 12508 | 1.5 |

The amount of sodium and phosphorus were also determined by elemental analysis. Phosphorus levels were used to calculate the attachment levels shown in Table 1. In general, it was found that, for 1 mmol treating level (i.e., the amount of treating agent/g carbon black), as described in the examples above, the attachment level (i.e., the amount of attached organic group) was approximately 10-15% by weight. At pH 8.5-9, the ratio of $Na^+$ to P was found to be approximately 1:1.

Inkjet ink compositions were prepared using the formulation shown in Table 2 below.

TABLE 2

| Ingredient | Amount |
| --- | --- |
| 2-pyrrolidinone | 7% |
| 1,5-pentanediol | 7% |
| 1,2,3-Trimethylolpropane | 5% |
| Surfynol 465 | 2% |
| Pigment | 4% |
| Water | 75% |

The pigments used for each example are shown in Table 3 below. For each inkjet ink composition, the pigment levels were corrected by using the weight percentage minus the amount of treating agent on the surface. The surface tensions of the inks were found to be approximately 35 dynes/cm.

The inkjet ink compositions were printed using a Canon i550 printer. Default settings were used except that "print quality" was set on "Best" and "grayscale" was checked. Images were printed on the following 5 types of plain paper: Great White Ink Jet (GWIJ), Hammermill Copy Plus (HCP), Hewlett Packard Advance paper (HPAP), Hewlett Packard printing paper (HPPP) and Xerox 4024 (X4024). The optical density (OD, or visual density) of a solid area fill at maximum print density was measured using ImageXpert™. Four measurements of OD are performed on 3 replicate prints of each type of paper. Results, which are averages of these measurements, are shown in Table 3 below.

TABLE 3

| Example # | Pigment | GWIJ | HCP | HPAP | HPPP | X4024 | Average |
| --- | --- | --- | --- | --- | --- | --- | --- |
| 14 | Example 7a | 1.24 | 1.29 | 1.60 | 1.31 | 1.44 | 1.37 |
| 15 | Example 8 | 1.24 | 1.23 | 1.57 | 1.22 | 1.40 | 1.33 |
| 16 | Example 9 | 1.13 | 1.19 | 1.57 | 1.08 | 1.25 | 1.25 |
| 17 | Example 10 | 1.34 | 1.39 | 1.59 | 1.44 | 1.51 | 1.45 |
| 18 | Example 13 | 1.41 | 1.38 | 1.63 | 1.40 | 1.43 | 1.45 |
| 19 | Example 12 | 1.25 | 1.31 | 1.58 | 1.28 | 1.44 | 1.37 |
| Comp Ex 4 | COJ300* | 1.07 | 1.14 | 1.48 | 1.03 | 1.18 | 1.18 |
| Comp Ex 5 | Comp Ex 1 | 1.05 | 1.13 | 1.51 | 1.04 | 1.19 | 1.18 |
| Comp Ex 6 | Comp Ex 2 | 1.17 | 1.21 | 1.52 | 1.13 | 1.28 | 1.26 |
| Comp Ex 7 | Comp Ex 3 | 1.26 | 1.26 | 1.53 | 1.25 | 1.38 | 1.34 |

*COJ300 is Cab-O-Jet ® 300 colored pigment dispersion, an aqueous dispersion of a modified carbon black pigment having attached $CO_2Na$ groups commercially available from Cabot Corporation As the results in Table 3 show, the OD for images produced using inkjet ink compositions of the present invention are higher, on average, than those of comparative inkjet ink compositions. In particular, use of a modified pigment comprising a pigment having attached an organic group that comprises one phosphonic acid group or salts thereof in an inkjet ink composition (Comparative Example 6) produces images having lower OD than those of Examples 14, 15, and 17-19, which comprise a pigment having attached at least two phosphonic acid groups. While the OD for the inkjet ink composition of Example 16 is similar to that of Comparative Example 6, this modified pigment has a high attachment level, as shown in Table 1. It would be expected that lowering the attachment level to one similar to the other examples would produce an inkjet ink composition that would given an image having higher optical density.

Furthermore, the OD of images produced using the inkjet ink compositions of the present invention are, in general, higher than those produced using the inkjet ink of Comparative Examples 4, 5, and 7. The comparative inkjet ink compositions comprise modified pigments, wherein the modified pigments comprise a pigment having attached an organic group that does not comprise phosphonic acid groups or salts thereof. Rather, these organic groups comprise different ionic or ionizable groups. In addition, as shown above, the organic groups of the modified pigments of the present invention have a calcium index value greater than the organic groups of the modified pigments of the comparative examples and, in particular, 1,2,3-benzene tricarboxylic acid (Comparative Example 7). While the OD for the inkjet ink composition of Example 15 and Example 16 are less than that of Comparative Example 7, as noted above, these modified pigments have high attachment levels, as shown in Table 1, and it would be expected that lowering the attachment level to one similar to the other examples would produce an inkjet ink composition that would give an image having higher optical density. Thus, it has surprisingly been found that, for organic groups having a high calcium index value, inkjet ink compositions comprising these modified pigments produce images having improved optical density properties over images produced from the comparative examples.

Examples 20-21

The following examples describe the preparation and print performance of inkjet ink compositions according to an embodiment of the present invention. Inkjet ink compositions of the present invention were prepared as described in Examples 14-19 above, with the exception that the modified colored pigments of Example 7b (for Example 20) and Example 7c (for Example 21) were used in the formulation shown in Table 2. Attachment levels for these modified colored pigments were found to be approximately 3-5% (w/w).

Images were printed as described in Examples 14-19, using the corresponding colored ink cartridges. The settings were similar, with the exception that "grayscale" was not checked. Twelve blocks of different density gradients were designed as print targets to test the color performance at different densities. The blocks were set up with Microsoft Powerpoint using the "fill color" function to differentiate the density of color. For magenta, the color was set as follows. The highest density block (block number 1): red 255, blue 255, green 0; the second lower density block (block number 2): red 255, blue 255, green 20; and so up to the lower density block (block number 12): red 255, blue 255, green 220. For the cyan color, the gradients are similar except that the blue and green were kept constant (255) and the color red was increased from 0 to 220 for the blocks from number 1 to umber 12.

Images were printed on 2 types of plain paper: Hewlett Packard printing paper (HPPP) and Xerox 4024 (X4024). ImageXpert™ was used to measure the a* and b* values for each block as well as the darkness parameter (L*) of the color block. Chromaticity of color is defined as parameter C* (C*=sqrt (a*^2+b*^2)). Color saturation is closely related to the chromaticity of color as well as the darkness of the color. To have a higher color saturation, it is desirable to have the chromaticity parameter larger and the darkness parameter smaller. Results chromaticity and darkness are shown in Table 4a, 4b, 4c, and 4d below.

TABLE 4a

Performance on HPPP

| Color Gradient | C* COJ260 | C* Ex 20 | C* % change | L* COJ260 | L* Ex 20 | L* % change |
|---|---|---|---|---|---|---|
| 1 | 45.0 | 54.2 | 20% | 58.6 | 52.8 | −10% |
| 2 | 45.4 | 53.7 | 18% | 59.5 | 54.8 | −8% |
| 3 | 45.2 | 52.3 | 16% | 60.3 | 56.7 | −6% |
| 4 | 44.3 | 50.1 | 13% | 62.7 | 60.1 | −4% |

TABLE 4b

Performance on X4024

| Color Gradient | C* COJ260 | C* Ex 20 | C* % change | L* COJ260 | L* Ex 20 | L* % change |
|---|---|---|---|---|---|---|
| 1 | 46.3 | 54.6 | 18% | 55.6 | 50.3 | −9% |
| 2 | 46.1 | 53.6 | 16% | 56.8 | 52.2 | −8% |
| 3 | 46.0 | 52.4 | 14% | 58.0 | 54.5 | −6% |
| 4 | 45.3 | 49.7 | 10% | 60.1 | 57.6 | −4% |

TABLE 4c

Performance on HPPP

| Color Gradient | C* COJ250 | C* Ex 21 | C* % change | L* COJ250 | L* Ex 21 | L* % change |
|---|---|---|---|---|---|---|
| 1 | 37.3 | 45.2 | 21% | 56.7 | 54.2 | −4% |
| 2 | 37.9 | 45.0 | 19% | 58.0 | 56.3 | −3% |
| 3 | 38.1 | 44.4 | 16% | 59.3 | 58.8 | −1% |
| 4 | 37.6 | 42.7 | 14% | 63.1 | 63.3 | 0% |

TABLE 4d

Performance on X4024

| Color Gradient | C* COJ250 | C* Ex 21 | C* % change | L* COJ250 | L* Ex 21 | L* % change |
|---|---|---|---|---|---|---|
| 1 | 38.0 | 45.7 | 20% | 54.1 | 50.8 | −6% |
| 2 | 38.1 | 46.3 | 22% | 55.6 | 53.4 | −4% |
| 3 | 38.6 | 45.1 | 17% | 56.6 | 55.5 | −2% |
| 4 | 37.9 | 43.8 | 16% | 59.9 | 60.3 | 1% |

As the data in Tables 4a-d show, significant changes in chromaticity and darkness were observed for images produced using the inkjet ink compositions of the present invention compared to images produced using comparative inkjet ink compositions, prepared in the same way using, as the pigments, Cab-O-Jet® 260 colored pigment dispersion (an aqueous dispersion of a modified magenta pigment comprising a pigment having attached sulfonic acid groups, commercially available from Cabot Corporation) and Cab-O-Jet® 250 colored pigment dispersion (an aqueous dispersion of a modified cyan pigment comprising a pigment having attached sulfonic acid groups, commercially available from Cabot Corporation). In particular, the chromaticity of the prints from inks made from an inkjet ink composition of the present invention, comprising a modified magenta pigment having attached an organic group which comprise two phosphonic acid groups or salts thereof, are, on average, 10-20% higher for the first 4 blocks compared to the same blocks produced with a comparative inkjet ink composition, comprising Cab-O-Jet® 260, on two plain papers. The darkness of the color has also dropped about 4-10%. Similar results are shown in the tables for the modified cyan pigment.

Examples 22-23

The following examples describe the preparation of materials (treating agents) used to produce modified pigments according to an embodiment of the present invention, comprising a pigment having attached at least one hydroxamic acid group and, in particular, at least one hydroxy pyridonyl group (an hydroxypyridinyl N-oxide group) or at least one hydroxy quinolonyl group (an hydroxy quinolinyl N-oxide group).

Example 22

5-amino-2-hydroxypyridine-N-oxide was prepared as follows. One hundred grams of the 2-hydroxypyridine-N-oxide were dissolved in 500 mL of acetic acid with warming. The solution was cooled to approximately 10° C., and 65 mL of 70% nitric acid was added slowly to keep the temperature below 35° C. The mixture was stirred for an additional 30 min and the product was collected by filtration. After washing with acetic acid, and then water, the product was dried under vacuum at 70° C., to give 5-nitro-2-hydroxypyridine-N-oxide (95.9 g, 68% yield). $^1$HNMR data for this compound (DMSO) was as follows: δ 9.2 (d, 1H), 8.1 (dd, 1H), 6.6 (d, 1H).

5-nitro-2-hydroxypyridine-N-oxide (8.52 g) was dissolved in 151 g of a 0.34M NaOH solution and hydrogenated with 5% Pd/carbon (5.2 g) at about 45 psi for 75 minutes. The catalyst was removed by filtration to give an aqueous solution of the sodium salt of 5-amino-2-hydroxypyridine-N-oxide. $^1$HNMR data for this compound (DMSO) was as follows: δ 7.3 (s, 1H), 6.4 (d, 1H), 6.0 (d, 1H). This material was used without further purification.

Example 23

6-amino-2-hydroxyquinoline-N-oxide was prepared as follows. A solution of 25 g 6-nitroquinoline, 560 g of trifluoroacetic acid, and 60 g of 30% hydrogen peroxide was heated at reflux for 6 hr. After checking for the absence of peroxides, the mixture was cooled and poured into 3750 mL of water. The product was collected by filtration, washed with water and dried under vacuum at 60° C., to give 6-nitro-2-hydroxyquinoline-N-oxide (5.48 g, 19% yield). $^1$HNMR data for this compound (DMSO) was as follows: δ 8.8 (s, 1H), 8.4 (d, 1H), 8.1 (d, 1H), 7.8 (d, 1H), 6.9 (d, 1H).

6-nitro-2-hydroxyquinoline-N-oxide (6 g) was dissolved in 658 g of a 0.088M NaOH solution and hydrogenated with 5% Pd/carbon (2.2 g) at about 45 psi for 30 minutes. The catalyst was removed by filtration to give an aqueous solution of the sodium salt of 6-amino-2-hydroxyquinoline-N-oxide. $^1$HNMR data for this compound (DMSO) was as follows: δ 7.9 (d, 1H), 7.2 (d, 1H), 6.9 (dd, 1H), 6.7 (d, 1H), 6.5 (d, 1H). This material was used without further purification.

Examples 24-26

The following examples describe the preparation of modified pigments according to an embodiment of the present invention, comprising a pigment having attached at least one hydroxamic acid group.

Example 24

Methanesulfonic acid was added to 61 g of a 1.1M solution of the sodium salt of 5-amino-2-hydroxypyridine-N-oxide in water, prepared as shown in Example 22, until the pH was reduced to 5. The resulting solution was mixed with about 125 g of water, 3.6 g methanesulfonic acid, and 50 g of Black Pearls® 700, a carbon black with a surface area of 200 m$^2$/g and a DBPA of 117 mL/100 g available from Cabot Corporation. The mixture was heated to 70° C., and 12.9 g of a 40% solution of NaNO$_2$ in water was added gradually. The mixture was stirred for two hours at 70° C. and cooled to room temperature. The product was brought to a pH of 10 with an aqueous solution of NaOH and purified by filtration followed by diafiltration with 10 volumes of water having a pH of 10, to give a modified carbon black dispersion comprising a carbon black having attached a 1-hydroxy-2-pyridonyl group.

Example 25

A modified carbon black dispersion comprising a carbon black having attached a 1-hydroxy-2-pyridonyl group was prepared following the procedure described in Example 24, with the exception that 50 g of Black Pearls® 1100 (a carbon black with a surface area of 240 m$^2$/g and a DBPA of 50 mL/100 g) was used in place of Black Pearls® 700.

Example 26

Hydrochloric acid was added to 330 g of a 0.044M solution of the sodium salt of 6-amino-2-hydroxyquinoline-N-oxide in water, prepared as shown in Example 23, until the pH was reduced to 5. The resulting solution was mixed with 0.70 g methanesulfonic acid, 14.5 g of Black Pearls® 700 carbon black, a carbon black with a surface area of 200 m$^2$/g and a DBPA of 117 mL/100 g available from Cabot Corporation. The mixture was heated to 70° C., and 2.5 g of a 40% solution of NaNO$_2$ in water was added gradually. The mixture was stirred for two hours at 70° C. and cooled to room temperature. The pH of the product was brought to a pH of 10 with an aqueous solution of NaOH and purified by filtration followed by diafiltration with 10 volumes of water having a pH of 10, to give a modified carbon black dispersion comprising a carbon black having attached a 1-hydroxy-2-quinolonyl group.

Example 27

This example describes methods for determining calcium index values.

Method A

For this method, a series of solutions were prepared at pH 9 that contained 0.087 mM Congo Red indicator, 5 mM cesium chloride, 1 wt % MW350 polyethylene glycol methyl ether, and calcium chloride in concentrations ranging from 0 to 7 mM (0.2, 0.5, 1, 2, 3, 4, 4.5, 5, 6, and 7 mM). The UV-Vis spectra of these solutions were recorded within 1 hour of their preparation using a UV-2501PC. These spectra were used to create a calibration curve relating the absorbance at 520 nm to the calcium concentration.

A compound was then chosen that corresponds to a specific organic group attached to a pigment. For example, for a modified carbon black comprising a carbon black pigment having attached a 3,4,5-tricarboxyphenyl group or salts thereof, 1,2,3-benzene tricarboxylic acid would be chosen. Test solutions were then prepared at pH 9 that contained 0.087 mM Congo Red indicator, 1 wt % MW350 polyethylene glycol methyl ether, 5 mM calcium chloride, and the cesium salt of the compound of interest such that the ion concentration at pH 9 was 5 mM. The uncomplexed calcium concentration was determined by comparison with the calibration curve. The calcium index value was then calculated as $\log_{10}((0.005 - \text{uncomplexed calcium})/((\text{uncomplexed calcium})^2))$. Measurements were made in duplicate and averaged.

Using this method, the calcium index values of various compounds, relating to the organic groups of modified pigments comprising pigments having these organic groups attached, were determined and are shown in Table 5A below.

TABLE 5A

| Compound | Calcium index value |
| --- | --- |
| Toluene sulfonic acid | 0.78 |
| benzoic acid | 1.27 |
| isophthalic acid | 1.76 |
| phthalic acid | 2.05 |
| succinic acid | 2.37 |
| benzohydroxamic acid | 2.43 |
| 1,2,4-benzene tricarboxylic acid | 2.53 |
| benzenephosphonic acid | 2.53 |
| 1,2,3-benzene tricarboxylic acid | 2.79 |
| 2,3-dihydroxypyridine | 3.06 |
| 8-hydroxyquinoline | 3.08 |
| 2-hydroxypyridine oxide | 3.27 |
| methylene diphosphonic acid | 3.45 |

Thus, as the data in Table 5A shows, compounds such as 2-hydroxypyridine N-oxide (1-hydroxy pyridone), 8-hydroxyquinoline, and methylene diphosphonic acid have calcium index values greater than that of 1,2,3-benzene tricarboxylic acid. These also have calcium index values greater than or equal to that of benzene phosphonic acid (phenylphosphonic acid). Compounds comprising these or similar groups, such as other bisphosphonates or groups having at least two phosphonic acid groups, partial esters thereof, or salts thereof, would also be expected to have similarly high calcium index values.

Method B

For compounds which develop a high level of color and are therefore difficult to use in Method A, a second method was developed. For this method, an aqueous solution that was 0.01M in $^{43}$CaCl$_2$, 0.01M in NaCl, 10% D$_2$O and at pH 8 or 9 was prepared from $^{43}$CaCO$_3$, HCl/D$_2$O, NaOH/D$_2$O, D2O and water. The pH was chosen to ionize the compound under investigation and to dissolve the compound. A portion of the solution weighing about 0.65 g was added to a 5 mm NMR tube and weighed to the nearest 0.001 g. The chemical shift of the unbound $^{43}$Ca was measured using a Bruker Avance II spectrometer with a proton resonance frequency at 400.13 MHz. A 0.2-1.0M solution of the compound (ligand) under investigation was added in successive increments. After each addition, the $^{43}$Ca chemical shift was measured, and δ, the difference between the chemical shift of the sample and that of unbound calcium was calculated. The successive increments were planned such that the $L_o/Ca_o$ ratio was 0.25, 0.5, 1, 2, 3, 4, 6 and 8 where $L_o$ is the total concentration of complexed, protonated and free anions from the ligand and Ca$_o$ is the total concentration of calcium in all species present. The calcium binding index (NMR) was calculated as $\log_{10}(X)$ where X was determined by fitting the parameters X and $_m$ in the equation $$\delta = \frac{\delta_m}{2}\left\{[1+(L_0/Ca_0)+(1+H^+/K_a)/(XCa_0)] - \sqrt{[1+(L_0/Ca_0)+(1+H^+/K_a)/(XCa_0)]^2 - 4(L_0/Ca_0)}\right\}$$

so that the RMS difference between the data and the predicted chemical shifts from the equation are minimized where
 is the difference in the $^{43}$Ca chemical shift of the sample vs that of free aqueous $^{43}$Ca$^{2+}$
$\delta_m$ is the calculated difference in the $^{43}$Ca chemical shift at infinite L/Ca vs that of free $^{43}$Ca$^{2+}$
$L_o$ is the total concentration of complexed, protonated and free anions from the ligand
$Ca_o$ is the total concentration of calcium in all species present
X is a fitting parameter
$K_a$ is the proton dissociation constant for the ligand LH Using this method, the calcium index values of various compounds, relating to the organic groups of modified pigments comprising pigments having these organic groups attached, were determined and are shown in Table 5B below.

TABLE 5B

| Compound | Calcium index value |
| --- | --- |
| benzoic acid | 0.58 |
| 1,2,3-benzene tricarboxylic acid | 1.99 |
| 2-chloro-4-methyl-6-nitrosophenol | 2.22 |

The calcium index values by Method B are different than those done by Method A and cannot be compared directly with them.

Examples 28-29

The following examples describe the preparation and print performance of inkjet ink compositions according to an embodiment of the present invention. Inkjet ink compositions were prepared using the formulation shown in Table 6 below.

TABLE 6

| Ingredient | Amount |
| --- | --- |
| 2-pyrrolidinone | 7% |
| 1,5-pentanediol | 7% |
| 1,2,3-Trimethylolpropane | 5% |
| Surfynol 465 | 1% |
| Pigment | 3.1% |
| Water | 76.9% |

The pigments used for each example are shown in Table 7 below. Also shown are comparative inkjet ink compositions. For Comparative Example 8, the modified carbon black of Comparative Example 3, comprising carbon black having attached a 1,2,3-benzene tricarboxylic acid group, was used. For Comparative Examples 9 and 10, Cab-O-Jet® 200 and 300 colored pigment dispersions were used.

The inkjet ink compositions were printed using an HP45 inkjet cartridge and an HP Photosmart 1000 inkjet printer. Images were printed on Hammermill Copy Plus paper (paper 1), Hammermill Premium Inkjet paper (paper 2), and Hewlett Packard Bright White paper (paper 3). The optical density (OD, or visual density) of a solid area fill at maximum print density was measured with a MacBeth RD915. Five measurements of OD were performed on each print of each type of paper. Results are shown in Table 7 below.

TABLE 7

| Example # | Pigment | Calcium Index Value of the Organic Group | Paper 1 | Paper 2 | Paper 3 | Average OD |
| --- | --- | --- | --- | --- | --- | --- |
| 28 | Example 24 | 3.27 | 1.50 | 1.29 | 1.54 | 1.44 |
| 29 | Example 26 | 3.27 | 1.55 | 1.47 | 1.57 | 1.53 |
| Comp Ex 8 | Comp Ex 3 | 2.79 | 1.30 | 1.21 | 1.51 | 1.34 |
| Comp Ex 9 | COJ200* | 0.78 | 1.02 | 0.98 | 1.32 | 1.11 |
| Comp Ex 10 | COJ300* | 1.27 | 1.02 | 1.02 | 1.32 | 1.12 |

*COJ200 is Cab-O-Jet ® 200 colored pigment dispersion, an aqueous dispersion of a modified carbon black pigment having attached SO$_3$Na groups commercially available from Cabot Corporation. COJ300 is Cab-O-Jet ® 300 colored pigment dispersion, an aqueous dispersion of a modified carbon black pigment having attached CO$_2$Na groups commercially available from Cabot Corporation.

The calcium index values are taken from Table 5A above.

As the results in Table 7 as well as Table 3 show, inkjet inks of the present invention, comprising modified pigments wherein the modified pigment comprises a pigment having attached at least one organic group, and wherein the organic group has a calcium index value greater than 2.8, which is greater than that of 1,2,3-benzene tricarboxylic acid, have improved print performance over those of comparative inkjet ink compositions. In particular, images produced using the inkjet ink compositions of the present invention have greater average optical densities than those produced by inkjet ink compositions comprising other modified pigments, wherein the modified pigments comprise a pigment having attached different organic groups, especially those having lower calcium index values.

Examples 30-31

The following examples describe the preparation of materials (treating agents) used to produce modified pigments according to an embodiment of the present invention, comprising a pigment having attached at least one phosphonic acid group or salt thereof and at least one carboxylic acid group or salt thereof.

Example 30

3-(4-Aminophenyl)-2-phosphonopropanoic acid, monosodium salt was prepared as follows. In an ice bath-cooled 300 mL round bottom flask, NaH (4.3 g, 60% in mineral oil, 0.107 mol) was first suspended in 100 mL of dry THF with protection from moisture. Into the suspension was slowly added triethylphosphonoacetate (22.5 g, 100 mmol) through an addition funnel. After 1 hour, a solution of 4-nitrobenzyl bromide (21.5 g, 100 mmol dissolved in 100 mL of dry THF), cooled with an ice-bath, was added into the previous mixture. The color of the mixture turned dark brown. The mixture was stirred at room temperature overnight and then heated to 60° C. for 4 hours. After cooling to room temperature, the mixture became yellowish again, and the observed solids were filtered off. The filtrate was evaporated to dryness under vacuum. The resulting residue was mixed with 150 mL concentrated HCl, and this mixture was refluxed at 100° C. for 4 hours and then cooled down to room temperature. The resulting mixture was filtered, and the filtrate was evaporated to dryness under vacuum. The residue was mixed with 100 mL of DI water, and the pH was adjusted to approximately 8.5 with a concentrated NaOH solution. All observed solids were dissolved. The solution was then mixed with 1 g of 5% Pd/C and hydrogenated at 40 psi for about 4 hours. After the catalyst was filtered off, the pH of the filtrate was adjusted to approximately 4.5 with concentrated HCl. A white precipitate formed overnight at 4° C., which was collected by filtration and dried (approximately 12 g, 50% yield). $^1$HNMR data for this compound ($D_2O$/NaOH) was as follows: 7.3 (2H, d), 6.7 (2H, d), 3.8 (2H, dd), 3.7(1H, m).

Example 31

(4-Aminophenyl)(phosphono)acetic acid, monosodium salt was prepared using either Method 1 or Method 2, described below.

Method 1:

Under nitrogen, NaH (4 g, 60% in mineral oil, 100 mmol) was reacted with 24.6 g of triethylphosphonoacetate (100 mmol) in 200 mL of THF as described in Example 30. After 1 hour, 25 g of 4-nitro-1-iodobenzene and 21 g of CuI (100 mmol) were added, and the mixture was heated to reflux for 24 hours. After cooling to room temperature, the reaction mixture was filtered and the resulting filtrate was evaporated to dryness under vacuum. The oily residue was then partitioned between 600 mL of ethyl acetate and 2×300 mL of water. The organic phase was dried with $Na_2SO_4$. Analysis by thin layer chromatograph (TLC) indicated approximately a 40-50% conversion. The ethyl acetate was then evaporated under vacuum.

Method 2:

In a 250 mL round bottom flask, equipped with an outlet connected to a mixture of ice/water by tubing (to collect the ethylbromide side product) was charged 24.3 g of ethyl-bromophenyl-acetate (100 mmol) and 18 g of triethylphosphite (110 mmol). The mixture was heated to 130° C. for 24 hours. Analysis by TLC indicated a nearly quantitative conversion. After the mixture was cooled to room temperature, the resulting oil was added drop wise into an ice-cooled mixture of 150 mL of 70% nitric acid and 100 mL of 98% sulfuric acid. After the mixture was stirred cold for 1 hour, the temperature was allowed to rise to room temperature by removing the ice/water bath. The mixture was then poured into 300 g of ice and extracted with 2×300 mL of ethyl acetate. The combined acetate phases were washed with 300 mL of water, then 300 mL of saturated sodium bicarbonate, and dried over sodium sulfate. Ethyl acetate was then removed under vacuum.

The resulting product from Method 1 or Method 2 was mixed with 200 mL of concentrated HCl, and this mixture was refluxed at 100° C. for 4 hours. After cooling to room temperature, this was then filtered, and the filtrate was evaporated to dryness under vacuum. The resulting residue was mixed with 100 mL of DI water, and, after adjusting the pH to approximately 8.5 with a concentrated NaOH solution, all of the observed solids dissolved. This solution was then mixed with 1 g of 5% Pd/C and hydrogenated at 40 psi for approximately 4 hours. After the catalysts were filtered off, the pH of the filtrate was adjusted to approximately 4.5 with concentrated HCl, and a light yellow precipitate formed overnight at 4° C. and was collected by filtration and dried (approximately 7 g, 30% yield, for Method 1 and 12 g, 50% yield for Method 2. $^1$HNMR data for this compound ($D_2O$/NaOH) was as follows: 7.25 (2H, d), 6.63 (2H, d), 3.82 (1H, d).

Examples 32-33

The following examples describe the preparation of materials (treating agents) used to produce modified pigments according to an embodiment of the present invention, comprising a pigment having attached at least one group having the formula —N—[$(CH_2)_m(PO_3H_2)$]$_2$ or salts thereof.

Example 32

[{[2-(4-Aminophenyl)ethyl]imino}bis(methylene)]bisphosphonic acid, monosodium salt was prepared using a procedure similar to that described in Moedritzer, K., and Irani, R. R., J. Org. Chem. 31, 1603, 1966, which is incorporated in its entirety by reference herein. Thus, in a 1000 mL three-neck round bottom flask, 4-nitrophenethylammonium nitrate/sulfate, mixed salt (available from ChemPacific, 100 g) and phosphorous acid (82 g, 1 mol) were mixed with 100 mL of concentrated HCl and 130 mL of DI water. The mixture was heated to 100° C. to allow the salt to dissolve, forming a light greenish solution. Into the heated mixture was added 160 mL of 37% formaldehyde solution (2 mol) dropwise through an addition funnel over one hour. The color of the solution changed to brownish during the addition. The solution was then heated to 110° C., at which temperature the mixture started to boil. The heating was continued for another hour. A large amount of a white solid precipitated out of the solution during the process. After cooling to room temperature, the solids were collected by suction filtration (approximately 122 g).

25 g of the resulting solid (dried) were dissolved in 200 mL of DI water with pH adjusted to approximately 7 using a concentrated NaOH solution. This solution was mixed with 1 g of 5% Pd/C and hydrogenated at 45 psi hydrogen. After 5 hours, the catalyst was filtered off, and the resulting filtrate was evaporated to dryness. This was used without further purification as a treating agent (some contamination of NaCl would be expected). $^1$HNMR data for this compound ($D_2O$/NaOH) was as follows: 7.2 (2H, d), 6.8 (2H, d), 3.0 (2H, t), 2.7 (6H, m).

Example 33

{[(4-Aminobenzyl)imino]bis(methylene)}bisphosphonic acid, monosodium salt was prepared as follows. In a 500 mL three-neck round bottom flask, nitrobenzylammonium salt (HCl salt, 36 g, 200 mmol) and phosphorous acid (44 g, 530 mol) were mixed with 60 mL of concentrated HCl and 50 mL of DI water. The mixture was heated to 100° C. to allow the salt to dissolve, forming a light yellow solution. Into the heated mixture was added 84 mL of 37% formaldehyde solution (1 mol) drop wise through an addition funnel over one hour. The color of the solution changed to brownish during the addition. The solution was then heated to 110° C., at which temperature the mixture started to boil. The heating was continued for another hour. A large amount of a white solid precipitated out of the solution during the process. After cooling to room temperature, the solids were collected by suction filtration (approximately 58 g, 77% yield).

38 g (100 mmol) of the resulting solid (dried) were mixed with 200 mL of DI water with pH adjusted to approximately 8.5 using a concentrated NaOH solution. To this was added 20 g of a 50% $(NH_4)_2S$ solution (300 mmol). The mixture was heated to 50° C. briefly, and then stirred at room temperature overnight, during which the color of the mixture changed from brown to yellow and some yellow sulfur precipitate was observed. Another 20 g of sulfide was added, and the mixture was heated to 50° C. for 5 hours. After allowing the mixture to cool to room temperature, all solids were filtered off. The filtrate was pH adjusted to 2 with HCl, and all of the solvent was removed under vacuum, leaving a yellowish oil. This oil was used without further purification as a treating agent. $^1$HNMR data for this compound ($D_2O$/NaOH) was as follows: 7.3 (2H, d), 6.9 (2H, d), 3.8 (2H, s), 2.7 (4H, d).

Example 34

This example describes the preparation of a material (treating agents) used to produce a modified pigment according to an embodiment of the present invention, comprising a pigment having attached at least one group having the formula —$CR(PO_3H_2)(OH)$ or salts thereof.

[(4-Aminophenyl)(hydroxy)methyl]phosphonic acid, monosodium salt was prepared as follows. In a 300 mL round bottom flask equipped with an addition funnel and a drying tube was added 15.1 g of p-nitrobenzaldehyde (100 mmol) in 100 mL of dry THF. The solution was cooled with dry ice/acetone to −78° C., and to this was added tris(trimethylsilyl) phosphite (31 g, 105 mmol) drop wise through the addition funnel. After the addition was complete, the temperature was allowed to rise to room temperature by removing the dry ice bath. The reaction mixture was stirred at room temperature for 1 hour. THF was then removed under vacuum. To the flask was added 100 mL of methanol, and this was stirred at room temperature overnight. After the methanol was evaporated under vacuum, the resulting dark red residue was dissolved in 200 mL of DI water with pH adjusted to 8.5. To this was added 1 g of 5% Pd/C, and the mixture was hydrogenated at 45 psi of hydrogen for 4 hours. After the solids were filtered off, the pH of the filtrate was adjusted to 3.8, and the resulting precipitated solid was collected by suction filtration (14 g, 69% yield). $^1$HNMR data for this compound ($D_2O$/NaOH) was as follows: 7.3 (2H, d), 6.98 (2H, d), 4.5 (1H, d).

Examples 35-39

The following examples describe the preparation of modified pigments according to embodiments of the present invention, comprising a pigment having attached at least one phosphonic acid group or salt thereof and at least one carboxylic acid group or salt thereof (Examples 35-36), comprising a pigment having attached at least one group having the formula —N—[$(CH_2)_m(PO_3H_2)$]$_2$ or salts thereof (Examples 37-38), and comprising a pigment having attached at least one group having the formula —$CR(PO_3H_2)(OH)$ or salts thereof (Example 39).

For these examples, the following general procedure was used. Black Pearls 700® carbon black (20 g, available from Cabot Corporation), treating agent (type and amount shown in Table 8 below), and 200 mL of DI water were mixed with a Silverson mixer (6000 rpm) at room temperature. After 30 min, sodium nitrite (20 mmol for a 20 mmol level of treating agent) in a small amount of water was added slowly into the mixture. The temperature reached 60° C. through mixing, and this was allowed to proceed for 1 hour. A modified pigment of the present invention was produced. The pH was adjusted to 9 with a NaOH solution. After 30 min, the resulting dispersion of modified pigment, comprising a pigment having attached at least one organic group described above, was diafiltered with Spectrum membrane with 10 volumes of DI water and concentrated to approximately 12% solids. After 30 min of sonication with a sonic probe, the mean volume particle size (mV) was measured using a Microtrac® Particle Size Analyzer and found to be between approximately 120-130 nm.

The resulting dispersions were then centrifuged and suction filtered to remove any large particles. Na$^+$ concentration was measured using an ion selective electrode (Thermo Orion Sure -flow Ross sodium probe, calibrated for solutions containing 20 ppm to 6000 ppm sodium ions) and calculated on a solids basis. Results are shown in Table 8 below.

TABLE 8

| Example # | Treating Agent | Treatment Level (mmol/gr) | Na$^+$ (ppm) |
|---|---|---|---|
| 35 | Example 30 | 1 | 16900 |
| 36 | Example 31 | 0.9 | 13360 |
| 37a | Example 32 | 0.7 | 15386 |
| 37b | Example 32 | 1 | 17095 |
| 38 | Example 33 | 0.5 | 7268 |
| 39 | Example 34 | 1 | 13422 |

Examples 40-51

The following examples describe the preparation and print performance of inkjet ink compositions according to embodiments of the present invention.

Inkjet ink compositions were prepared using the formulations shown in Table 9 and Table 10 below.

TABLE 9

| Formulation A | |
|---|---|
| Ingredient | Amount |
| 2-pyrrolidinone | 7% |
| 1,5-pentanediol | 7% |
| 1,2,3-Trimethylolpropane | 5% |
| Surfynol 465 | 2% |
| Pigment | 4% |
| Water | 75% |

TABLE 10

| Formulation B | |
|---|---|
| Ingredient | Amount |
| Glycerol | 7% |
| diethylene glycol | 5% |
| 1,2,3-Trimethylolpropane | 7% |
| Surfynol 465 | 1% |
| Pigment | 4% |
| Water | 76% |

In each formulation, the level of pigment was checked by measuring the absorbance of a sample of ink diluted 2000 fold at 550 nm in a spectrophotometer. An extinction coefficient, determined using standard dispersions of Cab-O-Jet® 300 colored pigment dispersion, an aqueous dispersion of a modified carbon black pigment having attached $CO_2Na$ groups commercially available from Cabot Corporation, was used to estimate the pigment level in each inkjet ink composition. A 4% pigment load was used in each example, with an allowed error within 2%.

The inkjet ink compositions using Formulation A were printed using a Canon i550 printer and those using Formulation B were printed using a Epson C86, using a procedure similar to that described in Examples 14-19. Images were printed on the following 5 types of plain paper: Great White Ink Jet (GWIJ), Hammermill Copy Plus (HCP), Hewlett Packard Advance paper (HPAP), Hewlett Packard printing paper (HPPP) and Xerox 4024 (X4024). The optical density (OD, or visual density) of a solid area fill at maximum print density was measured using ImageXpert™. Four measurements of OD are performed on 3 replicate prints of each type of paper and averaged. Results are shown in Table 11 below.

As the results in Table 11 show, the OD for images produced using inkjet ink compositions of the present invention are high, on average, and are comparable to the OD for inkjet ink compositions prepared using a modified pigment similar to that of Example 7a whether using Formulation A or Formulation B. However, higher OD was observed for inkjet ink compositions prepared using Formulation A compared to those prepared using Formulation B. Since, as discussed in more detail above, inkjet ink compositions comprising the modified pigment of Example 7a have higher OD than comparative inkjet ink compositions, the inkjet ink compositions of Examples 40-49 would also be expected to have higher OD than these comparative inkjet ink compositions.

TABLE 11

| Ex. # | Pigment Ex. # | Formulation | GWIJ | HCP | HPAP | HPPP | X4024 | Average |
|---|---|---|---|---|---|---|---|---|
| 40 | 35 | A | 1.28 | 1.30 | 1.63 | 1.31 | 1.40 | 1.38 |
| 41 | 35 | B | 1.18 | 1.33 | 1.63 | 1.11 | 1.27 | 1.30 |
| 42 | 36 | A | 1.29 | 1.33 | 1.59 | 1.34 | 1.35 | 1.38 |
| 43 | 36 | B | 1.21 | 1.25 | 1.59 | 1.18 | 1.29 | 1.30 |
| 44 | 37a | A | 1.27 | 1.29 | 1.68 | 1.23 | 1.38 | 1.37 |
| 45 | 37a | B | 1.15 | 1.25 | 1.65 | 1.08 | 1.25 | 1.28 |
| 46 | 37b | A | 1.28 | 1.25 | 1.67 | 1.24 | 1.37 | 1.36 |
| 47 | 37b | B | 1.12 | 1.14 | 1.64 | 1.08 | 1.22 | 1.24 |
| 48 | 38 | A | 1.24 | 1.39 | 1.59 | 1.23 | 1.38 | 1.36 |
| 49 | 39 | A | 1.31 | 1.35 | 1.57 | 1.36 | 1.43 | 1.40 |
| 50 | * | A | 1.24 | 1.29 | 1.60 | 1.31 | 1.44 | 1.37 |
| 51 | * | B | 1.22 | 1.23 | 1.58 | 1.18 | 1.33 | 1.31 |

* The modified pigment used in this inkjet ink composition was prepared using a procedure similar to that of Example 7a. The Na+ concentration was determined to be 17250 ppm.

Example 52

The following example describes the preparation of a material (treating agent) used to produce modified pigments according to an embodiment of the present invention, comprising a pigment having attached at least one heteroaryl group having at least two carboxylic acid groups or salts thereof.

Following a procedure similar to that described in Michael M. Robison, J. Am. Chem. Soc. (1958) 80 (20) 5481-5483, which is incorporated in its entirety by reference herein, 4-chloro-2,6-pyridinedicarboxylic acid was prepared as follows. Chelidamic acid mono hydrate (43.76 g/0.218 mol) was added to phenylphosphonic dichloride (122 mL/0.87 mol) in a 500 ml, 3-neck round bottom flask equipped with a nitrogen gas inlet, a reflux condenser, and a calcium chloride drying tube. This stirred suspension was then heated on an oil bath under an atmosphere of dry nitrogen. At 75° C. a vigorous exotherm ensued, causing the mixture to foam. The heat was periodically removed and the foam reduced by passing nitrogen gas directly onto the foam. Once the foaming became controllable, the temperature was slowly raised to 130° C. and stirred for 3 hours. The resultant reddish mixture was allowed to cool to approximately 50° C. and then poured slowly, with stirring, into 500 mL of DI water. The water became warm as the product and residual phenylphosphonyl chloride was hydrolyzed. Additional water was added to complete the transfer from the round bottom flask (final amount of water used was 800 mL). This resulted in a cream-colored solid, which was subsequently warmed and stirred at 40-50° C. for 1 hour. This was allowed to cool slowly to room temperature and stirred overnight. The resulting fine precipitate was suction filtered, washed with excess DI water, and air dried. $^1$HNMR data for this compound ($d_6$-DMSO) showed the desired product contaminated with phenyl phosphonic acid. The solid was then taken up in 500 mL DI water and stirred at 55° C. for another 30 minutes, followed by suction filtration, water washing and finally air drying (43.9 g). $^1$HNMR data for this compound ($d_6$-DMSO) showed pure product: 8.24 (s). Elemental analysis calculated for $C_7H_4ClNO_4$—$(H_2O)_{0.8}$: 38.93% C, 2.71% H, 6.49% N, 16.42% Cl. Found: 38.8% C, 2.88% H, 6.23% N, and 16.72% Cl.

4-Amino-2,6-pyridinedicarboxylic acid (4-aminodipicolinic acid) was prepared as follows. The chloro compound obtained above was suspended in 400 mL of concentrated ammonium hydroxide and placed in a 1 L stainless steel Parr High Pressure reactor. The mixture was heated at 150° C. for 8.5 hours and then allowed to cool to room temperature overnight. The resulting solid was suction filtered and washed with a minimum amount of DI water. This solid was then dissolved in alkaline water (NaOH to pH 13) and then reprecipitated with HCl (pH 3). The solid was then suction filtered and air dried to afford 13 g of a tan powder.

The original filtrate from the reaction was allowed to concentrate at room temperature in a large crystallization dish to about ⅓ the original volume. The resulting solid was suction filtered, washed and dried. This solid was similarly reprecipitated with NaOH/HCl to afford another 16.5 g of tan powder. $^1$HNMR data for this compound (NaOD/$D_2$O) was as follows: 7.1 (s). The solid obtained from the filtrate also showed a small (<10%) impurity peak at 7.2(s). M+=183.04 (M+1). These two batches of material were then combined (total 29.5 g, 74% yield from chelidamic acid) and used to prepare a modified pigment of the present invention.

Examples 53-54

The following examples describe the preparation of modified pigments according to embodiments of the present invention, comprising a pigment having attached at least one heteroaryl group having at least one, preferably two, carboxylic acid groups or salts thereof.

For these examples, the general procedure described for Examples 35-39 was modified due to the poor water solubility of the treating agent of Example 52. Thus, the reaction was run in 20-25% sulfuric acid. The modified pigment of Example 53 was prepared using Black Pearls 700® carbon black (available from Cabot Corporation) with a treatment level of 1.0 mmol/g while the modified pigment of Example 54 was prepared using a carbon black having a nitrogen surface area of 220 $m^2$/g and a DBP of 112 mL/100 g (available from Cabot Corporation) at a treatment level of 1.1 mmol/g. Amounts of reagents are shown in Table 12 below. The resulting modified pigments were isolated by filtration or centrifugation followed by water washing to remove the excess acid. The modified pigments were then redispersed in sodium hydroxide solution and then diafiltered. Properties of the resulting modified pigment dispersions are shown in the Table 12 below.

TABLE 12

| | Example 53 | Example 54 |
|---|---|---|
| treatment level | 1 mmol/g | 1.1 mmol/g |
| amount $NaNO_2$ | 1.25 mmol/g | 1.2 mmol/g |
| % solids of final dispersion | 14.5 | 12.5 |

TABLE 12-continued

|  | Example 53 | Example 54 |
|---|---|---|
| yield | 200 g | 316 g |
| pH | 8.92 | n.a. |
| particle size (mV) | 0.1388 microns | 0.1107 microns |
| Na+ | 9464 ppm | 14076 ppm |
| TGA | 4.85% | 6.17% |

Mean volume particle size and Na+ concentration were determined as described above. Thermal gravimetric analysis (TGA) was used to assess attachment levels.

Examples 55-56

The following examples describe the preparation and print performance of an inkjet ink composition according to an embodiment of the present invention.

Inkjet ink compositions were prepared using the formulation shown in Table 13 below.

TABLE 13

| Ingredient | Amount |
|---|---|
| Glycerin | 10% |
| triethyleneglycol monobutyl ether | 5% |
| Surfynol 465 | 1% |
| Pigment | 5% |
| Water | 79% |

The inkjet ink compositions were printed using an Epson C-86 printer on 6 different papers: Xerox 4200 (X4200), Hewlett Packard Bright White (HPBW), Hammermill Copy Plus (HCP), Hammermill Inkjet (HammIJ), Hewlett Packard Advance paper (HPAP), and Hewlett Packard printing paper (HPPP). The optical density (OD, or visual density) of a solid area fill at maximum print density was measured using ImageXpert™. Four measurements of OD were performed on 3 replicate prints of each type of paper and averaged. Results are shown in Table 14 below.

TABLE 14

| Ex. # | Pigment Ex. # | X4200 | HPBW | HCP | HammIJ | HPAP | HPPP |
|---|---|---|---|---|---|---|---|
| 55 | 53 | 1.43 | 1.52 | 1.41 | 1.39 | 1.51 | 1.36 |
| 56 | * | 1.40 | 1.55 | 1.40 | 1.38 | 1.55 | n/d |
| OEM | ** | 1.39 | 1.47 | 1.39 | 1.36 | 1.54 | 1.35 |

* The modified pigment used in this inkjet ink composition was prepared using a procedure similar to that of Example 7a.
** OEM is the Epson black inkjet ink used for the Epson C-86 printer.
n/d = not determined As can be seen from the above print data, the inkjet ink compositions of the present invention, comprising modified pigments of the present invention, produce images with high OD on most plain papers studied. The inkjet ink compositions of Example 55 are comparable in OD performance compared to that of Example 56. Since the pigment loading is 5%, it would be expected that even greater differentiation between the inkjet ink compositions of the present invention and the OEM ink would be observed at a different pigment loading.

Examples 57-66

The following examples describe the preparation and print performance of an inkjet ink composition according to an embodiment of the present invention.

For Examples 57-61, inkjet ink compositions were prepared using the formulation shown in Table 15 below. For Examples 62-66, inkjet ink compositions were prepared using the formulation shown in Table 16 below. These two formulations differ in the level of Joncryl 2635, which is a water dispersible urethane available from Johnson Polymer, Inc.

TABLE 15

| | Amounts | | | | |
|---|---|---|---|---|---|
| Ingredient | Ex 57 | Ex 58 | Ex 59 | Ex 60 | Ex 61 |
| Pigment dispersion | 34.83% | 30.18% | 26.83% | 23.47% | 20.12% |
| Joncryl 2635 | 12% | 12% | 12% | 12% | 12% |
| glycerin | 10% | 10% | 10% | 10% | 10% |
| triethyleneglycol monobutyl ether | 5% | 5% | 5% | 5% | 5% |
| Surfynol 465 | 0.7% | 0.7% | 0.7% | 0.7% | 0.7% |
| Water | 37.27% | 41.92% | 45.27% | 48.63% | 51.98% |

TABLE 16

| | Amounts | | | | |
|---|---|---|---|---|---|
| Ingredient | Ex 62 | Ex 63 | Ex 64 | Ex 65 | Ex 66 |
| Pigment dispersion | 34.83% | 30.18% | 26.83% | 23.47% | 20.12% |
| Joncryl 2635 | 6% | 6% | 6% | 6% | 6% |
| glycerin | 10% | 10% | 10% | 10% | 10% |
| triethyleneglycol monobutyl ether | 5% | 5% | 5% | 5% | 5% |
| Surfynol 465 | 0.7% | 0.7% | 0.7% | 0.7% | 0.7% |
| Water | 43.27% | 47.92% | 51.27% | 54.63% | 57.98% |

As can be seen from Table 15 and Table 16, for each of these examples, varying levels of a pigment dispersion were used, which was a dispersion of a modified pigment comprising a pigment having attached at least one organic group, wherein the organic group comprises at least two phosphonic acid groups or salts thereof, were used. The dispersion was prepared as follows. 20 g of Black Pearls® 700 carbon black (commercially available from Cabot Corporation), 20 mmol of 2-(4-(aminophenyl)-1-hydroxyethylidene)bisphosphonic acid monosodium salt (prepared as described in Example 1), 20 mmol of nitric acid, and 200 mL of DI water were mixed with a Silverson mixer (6000 rpm) at room temperature. After 30 min, sodium nitrite (20 mmol) in a small amount of water was added slowly into the mixture. The temperature reached 60° C. through mixing, and this was allowed to proceed for 1 hour. A modified black pigment comprising a carbon black having attached at least two phosphonic acid groups or salts thereof was produced. The pH was adjusted to 9 with a NaOH solution. After 30 min, the resulting dispersion of modified pigment was diafiltered with a Spectrum membrane using 10 volumes of DI water and concentrated to approximately 15.75% solids. After 30 min of sonication with a sonic probe, the mean volume particle size (mV) of the modified pigment in the dispersion was determined using a Microtrac® particle Size Analyzer to be between 120 and 130 nm.

The inkjet ink compositions were printed using an Epson C-86 printer on 4 different papers: Xerox 4200 (X4200), Hewlett Packard Bright White (HPBW), Hammermill Copy Plus (HCP), and Hewlett Packard multi-purpose printing paper (HPMP). The optical density (OD, or visual density) of a solid area fill at maximum print density was measured using ImageXpert™. Five measurements of OD were performed on 2 replicate prints of each type of paper and averaged. Results are shown in Table 17 and Table 18 below.

TABLE 17

| Ex. # | % Pigment | X4200 | HPBW | HCP | HPMP | Average |
|---|---|---|---|---|---|---|
| 57 | 5.5 | 1.30 | 1.38 | 1.31 | 1.40 | 1.35 |
| 58 | 4.8 | 1.28 | 1.36 | 1.28 | 1.39 | 1.33 |
| 59 | 4.2 | 1.25 | 1.33 | 1.24 | 1.35 | 1.29 |
| 60 | 3.7 | 1.20 | 1.29 | 1.20 | 1.30 | 1.25 |
| 61 | 3.2 | 1.16 | 1.26 | 1.16 | 1.23 | 1.20 |

TABLE 18

| Ex. # | % Pigment | X4200 | HPBW | HCP | HPMP | Average |
|---|---|---|---|---|---|---|
| 62 | 5.5 | 1.33 | 1.43 | 1.32 | 1.42 | 1.37 |
| 63 | 4.8 | 1.29 | 1.40 | 1.29 | 1.40 | 1.35 |
| 64 | 4.2 | 1.27 | 1.37 | 1.25 | 1.34 | 1.30 |
| 65 | 3.7 | 1.23 | 1.33 | 1.20 | 1.32 | 1.28 |
| 66 | 3.2 | 1.18 | 1.28 | 1.18 | 1.28 | 1.23 |

As can be seen from the above print data, the inkjet ink compositions of the present invention, comprising modified pigments of the present invention, produce images with high average OD across several plain papers and in both types of formulations. Also, even at relatively low pigment levels (such as in Example 61 and 66), the OD performance is maintained.

Furthermore, smear resistance was also measured on high optical density stripes using a yellow Avery Fluorescent Hi-Lighter™ Chisel Point #111646 and an orange ACCENT™ Highlighter Fluorescent Chisel Tip #25006. For each highlighter, two swipes were made on an unprinted section of paper, and then two swipes were made across three 2 mm wide stripes printed 2 mm apart using the specified inkjet ink composition. The highlighter pen was cleaned between swipes on a piece of scrap paper. Smear resistance was visually evaluated to assess visible evidence of smearing from the printed stripe within the highlighter swipe. For all of these inkjet ink compositions, no smearing was found. Thus, these inkjet ink compositions provide a combination of both high OD and high smear resistance.

Examples 67-71

The following examples describe the preparation and print performance properties of an embodiment of the inkjet ink composition of the present invention comprising a modified pigment of the present invention and a second modified pigment. For each example that was printed using an Epson C88 printer, the inkjet ink composition was loaded into an Epson compatible cartridge (available from Inkjet Warehouse, black cartridge part number E-0601-K, cyan cartridge part number E-0602-K) and printed with print settings "plain paper/best photo/ICM off". For each example that was printed using a Canon i550 printer, each ink was loaded into a Canon compatible cartridge (available from Inkjet Warehouse) and printed with the following print settings: print quality—high, plain paper, gray scale, and no photo options selected.

Print performance properties were determined for the resulting printed images. Optical density was measured using either a SpectroEye Gretag Macbeth or X-rite 938 spectrodensitometer. For both instruments, the following settings were used: Illumination at D65, 2 degree standard observer, DIN density standards, white base set to Abs, and no filter. Results are reported as an average of five optical density measurements taken at each corner and the middle of a 15 mm×6.5 mm printed area.

Smear resistance was measured on high optical density stripes using a yellow Avery Fluorescent Hi-Lighter™ Chisel Point #111646 and an orange ACCENT™ Highlighter Fluorescent Chisel Tip #25006. For each highlighter, two swipes were made on an unprinted section of paper, and then two swipes were made across three 2 mm wide stripes printed 2 mm apart using the specified inkjet ink composition. The highlighter pen was cleaned between swipes on a piece of scrap paper. Smear resistance was visually evaluated to assess visible evidence of smearing from the printed stripe within the highlighter swipe: "yes"=noticeable smearing is observed, "trace"=a slight amount of smearing is seen, and "no"=no smearing is found.

Example 67

First Colorant

A modified pigment comprising a pigment having attached at least one organic group, wherein the organic group comprises at least two phosphonic acid groups or salts thereof was prepared as follows. 20 g of Black Pearls® 700 carbon black (commercially available from Cabot Corporation), 20 mmol of 2-(4-(aminophenyl)-1-hydroxyethylidene)bisphosphonic acid monosodium salt, 20 mmol of nitric acid, and 200 mL of DI water were mixed with a Silverson mixer (6000 rpm) at room temperature. After 30 min, sodium nitrite (20 mmol) in a small amount of water was added slowly into the mixture. The temperature reached 60° C. through mixing, and this was allowed to proceed for 1 hour. A modified black pigment comprising a carbon black having attached at least two phosphonic acid groups or salts thereof was produced. The pH was adjusted to 9 with a NaOH solution. After 30 min, the resulting dispersion of modified pigment was diafiltered with a Spectrum membrane using 10 volumes of DI water and concentrated to approximately 14.4% colorant. After 30 min of sonication with a sonic probe, the mean volume particle size (mV) of the modified pigment in the dispersion was determined using a Microtrac® Particle Size Analyzer to be between 120 and 130 nm. This first colorant dispersion was used to prepare inkjet ink compositions of the present invention.

Second Colorant

A pigment comprising at least one polymer was prepared as follows. A copolymer was prepared using semi-continuous feed techniques at 60% solids in N-methyl pyrrolidinone. A monomer mixture containing 33.4 wt % methoxypolyethyleneglycol monomethacrylate (molecular weight 550), 20% styrene, 33.4% lauryl methacrylate, and 13.2% methacrylic acid was prepared, and, to this, was added dodecanethiol (1% based on the monomer feed). The mixture was fed into the solvent over 335 minutes, with the temperature being held between 95 and 100° C. Benzoyl peroxide (3% based on the monomer feed) was dissolved in NMP (22.5% by weight) and added as a cofeed over the same period of time. The reaction temperature was maintained for one hour after the feeds were completed. An additional aliquot of benzoyl peroxide, equal to the first, was then added, and allowed to stir for an additional hour, resulting in the formation of a polymer solution.

A small amount of polymer was isolated from the polymer solution by precipitation into hexanes four times, and the resulting material was dissolved in tetrahydrofuran to a concentration of 0.5 g/dL. The inherent viscosity of the polymer was 0.16 dL/g, and the acid number was 87.5 mg KOH/g polymer. The balance of polymer solution was used without purification.

A pigment comprising at least one polymer was prepared by adding to an Eiger 1 H Laboratory vessel (5.5 inch diameter stainless steel beaker) 20 g of Black Pearls® 700 carbon black (commercially available from Cabot Corporation), 110 g of the polymer solution described above (39.97% solids polymer in NMP), and 2000 g of Norstone milling media (BSLZ-1 0.07-0.125 mm, commercially available from Norstone, Wyncote, Pa.). The mixture was milled at 5000 rpm, with addition of NMP as needed to keep the mixture fluid, for 30 minutes. To this was added 27.49 g of a 10% aqueous sodium hydroxide solution, along with 250 mL of deionized water, and milling was continued for an additional 10 minutes. The mixture, which contained the pigment comprising a polymer, was filtered to remove the milling media. The resulting dispersion had a total volume of 3 L, including the water used to rinse the milling media.

This dispersion was concentrated to 400 mL by diafiltration using a Spectrum Membrane (1050 cm$^2$) and a peristaltic pump. The dispersion was further purified by diafiltration with 2 volumes 0.5% sodium chloride in water, and then 10 volumes of water. The resulting dispersion of a pigment comprising at least one polymer (16.8% solids) was found to have a mean volume particle size (mV), determined using a Microtrac® Particle Size Analyzer, of 143 nm.

The amount of polymer coated on the pigment was determined by comparing the UV/Vis absorbance of the polymer-coated pigment in a dispersion of a known concentration to that of a dispersion of the starting pigment at the same concentration, using a wavelength where the pigment absorbs. For the second colorant used in this example, a wavelength of 550 nm was chosen for absorbance measurements on the UV/Vis Spectrophotometer. The extinction coefficient for both the polymer-coated pigment and the starting pigment will be the same. Since both dispersions are at the same concentration, any observed decrease in absorbance must be due to a difference in the actual amount of pigment in the polymer-coated pigment dispersion. This difference is the amount of polymer present and can be reported as % polymer. For the second colorant of this example, the amount of polymer coated on the pigment was found to be 43.6% polymer by this UV method. This second colorant dispersion was used to prepare inkjet ink compositions of the present invention.

Inkjet Ink Compositions

Inkjet ink compositions of the present invention were prepared by combining a base composition comprising the first colorant dispersion (Base 1-67) and a base composition comprising the second colorant dispersion (Base 2-67) in varying ratios. The two base compositions are shown in Table 19, and the combined inkjet ink compositions are shown in Table 20. In this table, the percent colorant is shown, which is the loading of pigment, without including the amount of attached groups or polymer, present in the ink composition. For the second colorant, this can be determined by using the % polymer value, measured as shown above. For the first colorant, since the attached group has a low molecular weight, this can be approximated by the % solids level of the dispersion, or it can be determined using a variety of analytical techniques known in the art.

TABLE 19

|  | Base 1-67 | Base 2-67 |
|---|---|---|
| First colorant dispersion | 31.3 g | 0 |
| Second colorant dispersion | 0 | 47.43 g |
| Glycerol | 10 g | 10 g |
| 1,2-hexanediol | 5 g | 5 g |
| Surfynol 465 | 1 g | 1 g |
| Water | 52.7 g | 36.57 g |

TABLE 20

| | Wt fraction | | % Colorant | | Smear | | |
|---|---|---|---|---|---|---|---|
| | Base 1-67 | Base 2-67 | First colorant | Second colorant | Yellow | Orange | OD |
| Base 2-67 | 0 | 1 | 0 | 4.5 | no | No | 1.11 |
| Ex 67A | 0.25 | 0.75 | 1.1 | 3.4 | no | No | 1.15 |
| Ex 67B | 0.5 | 0.5 | 2.25 | 2.25 | no | No | 1.24 |
| Ex 67C | 0.75 | 0.25 | 3.4 | 1.1 | trace | No | 1.31 |
| Base 1-67 | 1 | 0 | 4.5 | 0 | yes | Yes | 1.36 |

Inkjet ink compositions of the present invention (Examples 67A, 67B, and 67C) as well as the base compositions from which they were prepared (Base 1-67 and 2-67) were printed using an Epson C88 printer on Xerox 4200 paper. Print properties are also shown in Table 20 above.

As the data shows, the inkjet ink compositions of the present invention, comprising both the first colorant and the second colorant, have performance properties that would not have been expected based on the performance of the base compositions from which they were prepared. For example, Base 2-67 has an OD value of 1.11, and each of Examples 67A, 67B, and 67C have improved OD over this base composition. Furthermore, the inkjet ink compositions of Examples 67A, 67B, and 67C produced printed images having improved smear resistance compared to that of Base 1-67. Thus, the inkjet ink compositions of the present invention, comprising a modified colorant of the present invention and a second colorant, have a combination of OD and smear resistance that would not be expected based on the performance of base compositions comprising the first colorant and the second colorant individually, based on the weighted average.

Example 68

First Colorant

A modified pigment comprising a pigment having attached at least one organic group, wherein the organic group comprises at least two phosphonic acid groups or salts thereof, was prepared using the procedure described in Example 1, with the exception that Pigment Blue 15:4 (commercially available from Sun Chemical) was used. The resulting first colorant dispersion (10% solids) was used to prepare inkjet ink compositions of the present invention.

Second Colorant

A pigment comprising at least one polymer was prepared as follows. To an Eiger 1 H Laboratory vessel was added 20 g Pigment Blue 15:4 (commercially available from Sun Chemicals), 85.06 g of the polymer solution described in Example 1 (39.97% solids polymer in NMP), and 3000 grams of Norstone milling media (BSLZ-1 0.07-0.125 mm, commercially available from Norstone, Wyncote, Pa.). The mixture was milled at 5000 rpm, with addition of NMP as needed to keep the mixture fluid, for 45 minutes. To this was added 21.24 g of a 10% aqueous sodium hydroxide solution, along with 500 mL of deionized water, and milling was continued for an additional 20 minutes. The mixture, which contained the pigment comprising a polymer, was filtered to remove the milling media. The resulting dispersion had a total volume of 3 L, including the water used to rinse the milling media.

This dispersion was concentrated to 300 mL by diafiltration using a Spectrum Membrane (1050 cm$^2$) and a peristaltic pump. The dispersion was further purified by diafiltration with 10 volumes of water. The resulting dispersion of a pigment comprising at least one polymer (12.9% solids) was found to have a mean volume particle size (mV), determined using a Microtrac® Particle Size Analyzer, of 197 nm. The amount of polymer coated on the pigment, determined using the procedure described in Example 1, with the exception that a wavelength of 614 nm was chosen for absorbance measurements on the UV/Vis Spectrophotometer, was found to be 50.89% polymer.

Inkjet Ink Compositions

Inkjet ink compositions of the present invention were prepared by combining a base composition comprising the first colorant dispersion (Base 1-68) and a base composition comprising the second colorant dispersion (Base 2-68) in varying ratios. The two base compositions are shown in Table 21, and the combined inkjet ink compositions are shown in Table 22.

TABLE 21

|  | Base 1-68 | Base 2-68 |
| --- | --- | --- |
| First colorant dispersion | 67.78 g | 0 |
| Second colorant dispersion | 0 | 106.54 g |
| Glycerol | 15 g | 15 g |
| 1,2-hexanediol | 7.5 g | 7.5 g |
| Surfynol 465 | 1.5 g | 1.5 |
| Water | 58.22 g | 19.46 g |

TABLE 22

| | Wt fraction | | % Colorant | | | |
| --- | --- | --- | --- | --- | --- | --- |
| | Base 1-68 | Base 2-68 | First colorant | Second colorant | % solids | OD |
| Base 2-68 | 0 | 1 | 0 | 4.5 | 9.2 | 1.13 |
| Ex 68A | 0.25 | 0.75 | 1.1 | 3.4 | 8.0 | 1.20 |
| Ex 68B | 0.5 | 0.5 | 2.25 | 2.25 | 6.8 | 1.21 |
| Ex 68C | 0.75 | 0.25 | 3.4 | 1.1 | 5.7 | 1.25 |
| Base 1-68 | 1 | 0 | 4.5 | 0 | 4.5 | 1.26 |

OD of colors is measured using a SpectroEye (from Gretag-Macbeth) with a diffraction grating (3.3 nm internal resolution) with RGB filters conforming to ANSI (status A, M, E, I, T). Density and calorimetric data are recalculated mathematically. Inkjet ink compositions of the present invention (Examples 68A, 68B, and 68C) as well as the base compositions from which they were prepared (Base 1-68 and 2-68) were printed using an Epson C88 printer on Xerox 4200 paper. Print properties are also shown in Table 22 above.

As the data shows, the inkjet ink compositions of the present invention, comprising both the first colorant and the second colorant, have performance properties that would not have been expected based on the performance of the base compositions from which they were prepared. For example, Base 2-68 has an OD value of 1.13, and each of Examples 68A, 68B, and 68C have improved OD over this base composition. This is also surprising since the observed OD is higher than the expected weighted average of the two colorants. Furthermore, the inkjet ink compositions of the present invention achieve these desirable print performance properties at lower overall percent solids levels versus Base 2-68, which would be expected to result in lower viscosity inks.

Thus, the inkjet ink compositions of the present invention, comprising a modified colorant of the present invention and a second colorant, produce printed images having an OD higher than would be expected based on the performance of inkjet ink compositions comprising either the first colorant or the second colorant individually, based on the weighted average. Similarly, it was found that the smear resistance of the printed images from the inkjet ink compositions of the present invention, evaluated visually as described above, was improved. Thus, the inkjet ink compositions of the present invention were found to have a good balance of OD and durability.

Example 69

First Colorant

The sodium salt of 5-amino-2-hydroxypyridine-N-oxide was prepared as follows. 2-Hydroxypyridine-N-oxide (100 g) was dissolved in 500 mL of acetic acid with warming. The solution was cooled to approximately 10° C., and 65 mL of 70% nitric acid was added slowly to keep the temperature below 35° C. The mixture was stirred for an additional 30 min, and the product (5-nitro-2-hydroxypyridine-N-oxide) was collected by filtration. After washing with acetic acid, followed by water, the product was dried under vacuum at 70° C.

5-Nitro-2-hydroxypyridine-N-oxide (10 g) was dissolved in 388 g of 0.16M NaOH and hydrogenated with 2.1 g of 5% Pd/carbon at approximately 45 psi. The catalyst was removed by filtration to give a solution of the sodium salt of 5-amino-2-hydroxypyridine-N-oxide.

A modified pigment comprising a pigment having attached at least one organic group, wherein the organic group comprises at least one hydroxamic acid group and, in particular, 1-hydroxy-2-pyridon-5-yl group, or salt thereof was prepared as follows. 20 g of a carbon black with a surface area of 200 $m^2/g$ and a DBPA of 117 mL/100 g was added to 181 g of a 0.11M solution of the sodium salt of 5-amino-2-hydroxypyridine-N-oxide in water. The mixture was heated to 70° C. and agitated with a Promixer rotor-stator. Methanesulfonic acid (0.96 g) was added, followed by a solution of 1.38 g $NaNO_2$ in water was added. The mixture was stirred for two hours at 70° C. and then cooled to room temperature. The product was brought to a pH of 10 with an aqueous NaOH solution, and the resulting dispersion of modified pigment was then purified by filtration and by diafiltration with 10 volumes of water having a pH of 10. The mean volume particle size (mV) of the modified pigment in the dispersion was reduced to 132 nm with sonication, as determined using a Microtrac® Particle Size Analyzer. This first colorant dispersion (11.48% solids) was used to prepare inkjet ink compositions of the present invention.

Second Colorant

A pigment comprising at least one polymer was prepared as described in Example 67. This second colorant dispersion was used to prepare inkjet ink compositions of the present invention.

Inkjet Ink Compositions

Inkjet ink compositions of the present invention were prepared by combining a base composition comprising the first colorant dispersion (Base 1-69) and a base composition comprising the second colorant dispersion (Base 2-69) in varying ratios. The two base compositions are shown in Table 23, and the combined inkjet ink compositions are shown in Table 24.

TABLE 23

|  | Base 1-69 | Base 2-69 |
| --- | --- | --- |
| First colorant dispersion | 21.55 g | 0 |
| Second colorant dispersion | 0 | 21.08 g |
| diethylene glycol | 9.0 g | 7.5 g |
| Surfynol 465 | 0.3 g | 0.25 g |
| Water | 29.15 g | 21.17 g |

TABLE 24

| | Wt fraction | | % Colorant | | | |
| --- | --- | --- | --- | --- | --- | --- |
| | Base 1-69 | Base 2-69 | First colorant | Second colorant | % solids | Smear |
| Base 2-69 | 0 | 1 | 0 | 4 | 7.1 | No |
| Ex 69A | 0.25 | 0.75 | 1 | 3 | 6.3 | No |
| Ex 69B | 0.5 | 0.5 | 2 | 2 | 5.7 | No |
| Ex 69C | 0.75 | 0.25 | 3 | 1 | 4.9 | No |
| Base 1-69 | 1 | 0 | 4 | 0 | 4.1 | Yes |

Inkjet ink compositions of the present invention (Examples 69A, 69B, and 69C) as well as the base compositions from which they were prepared (Base 1-69 and 2-69) were printed using an Epson C88 printer on Xerox 4200 paper. Print properties are also shown in Table 24 above.

As the data shows, the inkjet ink compositions of the present invention, comprising both the first colorant and the second colorant, have performance properties that would not have been expected based on the performance of the base compositions from which they were prepared. For example, the inkjet ink compositions of Examples 69A, 69B, and 69C produce printed images having improved smear resistance compared to that of Base 1-69. Furthermore, the inkjet ink compositions of the present invention achieve these desirable print performance properties at lower overall percent solids levels versus Base 2-69, which would be expected to result in lower viscosity inks. Thus, the inkjet ink compositions of the present invention, comprising a modified colorant of the present invention and a second colorant, have a combination of properties that would not be expected based on the performance of base compositions comprising the first colorant and the second colorant individually, based on the weighted average.

Example 70

First Colorant

The sodium salt of 5-amino-2-hydroxypyridine-N-oxide was prepared as follows. 2-Hydroxypyridine-N-oxide (100 g) was dissolved in 500 mL of acetic acid with warming. The solution was cooled to approximately 10° C., and 65 mL of 70% nitric acid was added slowly to keep the temperature below 35° C. The mixture was stirred for an additional 30 min and the product (5-nitro-2-hydroxypyridine-N-oxide) was collected by filtration. After washing with acetic acid, and then water, the product was dried under vacuum at 70° C. $^1$HNMR data for this compound (DMSO) was as follows: 9.2 (d, 1H), 8.1 (dd, 1H), 6.6 (d, 1H).

5-Nitro-2-hydroxypyridine-N-oxide (15 g) was dissolved in 296 g of 0.32M NaOH and hydrogenated with 5% Pd/carbon at approximately 45 psi. The catalyst was removed by filtration to give a solution of the sodium salt of 5-amino-2-hydroxypyridine-N-oxide. $^1$HNMR data for this compound (DMSO) was as follows: 7.3 (s, 1H), 6.4 (d, 1H), 6.0 (d, 1H).

A modified pigment comprising a pigment having attached at least one organic group, wherein the organic group comprises at least one hydroxamic acid group and, in particular, 1-hydroxy-2-pyridon-5-yl group, salt thereof was prepared as follows. Methanesulfonic acid was added to 61 g of a 1.1M solution of the sodium salt of 5-amino-2-hydroxypyridine-N-oxide in water until the pH was reduced to 5. The resulting solution was mixed with approximately 125 g of water, 3.6 g methanesulfonic acid, and 50 g of a carbon black with a surface area of 240 m$^2$/g and a DBPA of 50 mL/100 g. The mixture was heated to 70° C., and 12.9 g of a 40% solution of NaNO$_2$ in water was added gradually. The mixture was stirred for two hours at 70° C. and then cooled to room temperature. The product was brought to a pH of 10 with an aqueous NaOH solution, and the resulting dispersion of modified pigment was then purified by filtration and by diafiltration with 10 volumes of water having a pH of 10. The mean volume particle size (mV) of the modified pigment in the dispersion was reduced to 89 nm with sonication and filtration, as determined using a Microtrac® Particle Size Analyzer. This first colorant dispersion (8.8% solids) was used to prepare inkjet ink compositions of the present invention.

Second Colorant

Cab-O-Jet® 300 black colorant, which is a 15% solids aqueous dispersion of a modified carbon black pigment having attached CO$_2$Na groups commercially available from Cabot Corporation, was used as the second colorant.

Inkjet Ink Compositions

Inkjet ink compositions of the present invention were prepared by combining a base composition comprising the first colorant dispersion (Base 1-70) and a base composition comprising the second colorant dispersion (Base 2-70) in varying ratios. The two base compositions are shown in Table 25, and the combined inkjet ink compositions are shown in Table 26a and Table 26b.

TABLE 25

| | Base 1-70 | Base 2-70 |
| --- | --- | --- |
| First colorant | 35.24 g | 0 g |
| Second colorant | 0 g | 21.31 g |
| 2-pyrrolidinone | 7.00 g | 7.00 g |
| 1,5-pentanediol | 7.00 g | 7.00 g |
| trimethylol propane | 5.00 g | 5.00 g |
| Surfynol 465 | 0.20 g | 0.20 g |
| Water | 45.56 g | 59.49 g |

TABLE 26a

| | Wt fraction | | % Solids | | |
| --- | --- | --- | --- | --- | --- |
| | Base 1-70 | Base 2-70 | First colorant | Second colorant | OD |
| Base 2-70 | 0 | 1 | 0 | 3.20 | 1.22 |
| Ex 70A | 0.2 | 0.8 | 0.62 | 2.56 | 1.29 |
| Ex 70B | 0.5 | 0.5 | 1.55 | 1.60 | 1.32 |
| Base 1-70 | 1 | 0 | 3.10 | 0 | 1.18 |

TABLE 26b

| | Wt fraction | | % Solids | | |
| --- | --- | --- | --- | --- | --- |
| | Base 1-70 | Base 2-70 | First colorant | Second colorant | Gloss |
| Base 2-70 | 0 | 1 | 0 | 3.20 | 14.6 |
| Ex 70A | 0.2 | 0.8 | 0.62 | 2.56 | 25.4 |
| Ex 70B | 0.5 | 0.5 | 1.55 | 1.60 | 26.8 |
| Base 1-70 | 1 | 0 | 3.10 | 0 | 27.4 |

Inkjet ink compositions of the present invention (Examples 70A and 70B) as well as the base compositions from which they were prepared (Base 1-70 and 2-70) were printed using a Canon i550 printer onto Hammermill Premium Inkjet, Hammermill Copy Plus, and HP Bright White papers. Print properties are reported as an average of three papers. In addition, these inkjet ink compositions were printed using a Canon i550 printer onto Canon PP101, Canon PR101 and Staples. Professional High Gloss photo paper, with the exception of Base 2-70, which was printed on two papers (PP-101 and Staples). Gloss (20°) are reported as an average of the data. Results are shown in Table 26a above (for OD) and Table 26b (for gloss). The gloss was measured with a BYK-Gardner micro haze plus gloss meter.

As the data shows, the inkjet ink compositions of the present invention, comprising both the first colorant and the second colorant, have performance properties that would not have been expected based on the performance of the base compositions from which they were prepared. For example, Base 2-70 has an OD value of 1.22, and each of Examples 70A and 70B have improved OD over this base composition. This is also surprising since the observed OD is higher than the expected weighted average of the two colorants. The OD values for the inkjet ink compositions of the present invention produce printed images having OD higher than either of the corresponding base compositions. In addition, as shown in Table 26b, inkjet ink compositions of the present invention (Base 1-70) also have improved gloss at similar OD compared to the base composition 2-70 and mixtures of the present invention have improved OD and gloss over base composition 2-70.

Thus, the inkjet ink compositions of the present invention, comprising a modified colorant of the present invention and a second colorant, produce printed images having an OD higher than would be expected based on the performance of inkjet ink compositions comprising either the first colorant or the second colorant individually, based on the weighted average.

Example 71

First Colorant

A modified pigment comprising a pigment having attached at least one organic group, wherein the organic group comprises at least two phosphonic acid groups or salts thereof, was prepared using the procedure described in Example 67. The resulting first colorant dispersion (13.7% colorant) was used to prepare inkjet ink compositions of the present invention.

Second Colorant

A 13.3% colorant dispersion of a modified carbon black comprising Black Pearls® 700 carbon black having attached —$C_6H_4$—$SO_3Na$ groups was prepared using a procedure similar to that described above for the preparation of the first colorant of Example 67. The resulting second colorant dispersion was used to prepare inkjet ink compositions of the present invention.

Inkjet Ink Compositions

Inkjet ink compositions of the present invention were prepared by combining a base composition comprising the first colorant dispersion (Base 1-71) and a base composition comprising the second colorant dispersion (Base 2-71) in varying ratios. The two base compositions are shown in Table 27, and the combined inkjet ink compositions are shown in Table 28.

TABLE 27

|  | Base 1-71 | Base 2-71 |
| --- | --- | --- |
| First colorant dispersion | 18.25 g | 0 g |
| Second colorant dispersion | 0 g | 18.85 g |
| Glycerin | 5 g | 5 g |
| triethyleneglycol monobutylether | 2.5 g | 2.5 g |

TABLE 27-continued

|  | Base 1-71 | Base 2-71 |
| --- | --- | --- |
| Surfynol 465 | 0.5 g | 0.5 g |
| Water | 23.75 g | 23.15 g |

TABLE 28

|  | Wt fraction | | % Colorant | | |
| --- | --- | --- | --- | --- | --- |
|  | Base 1-71 | Base 2-71 | First colorant | Second colorant | OD |
| Base 2-71 | 0 | 1 | 0 | 5 | 1.24 |
| Ex 71A | 0.1 | 0.9 | 0.5 | 4.5 | 1.29 |
| Ex 71B | 0.3 | 0.7 | 1.5 | 3.5 | 1.36 |
| Ex 71C | 0.5 | 0.5 | 2.5 | 2.5 | 1.39 |
| Ex 71D | 0.7 | 0.3 | 3.5 | 1.5 | 1.38 |
| Ex 71E | 0.9 | 0.1 | 4.5 | 0.5 | 1.38 |
| Base 1-71 | 1 | 0 | 5 | 0 | 1.43 |

Inkjet ink compositions of the present invention (Examples 71A-71E) as well as the base compositions from which they were prepared (Base 1-71 and 2-71) were printed using an Epson C88 printer on Xerox 4200 paper. Print properties are also shown in Table 28 above.

As the data shows, the inkjet ink compositions of the present invention, comprising both the first colorant and the second colorant, have performance properties that would not have been expected based on the performance of the base compositions from which they were prepared. For example, Base 2-71 has an OD value of 1.24, and each of Examples 71A-71E has improved OD over this base composition. A substantial amount of the lower OD ink composition (Base 1-71) can be included with the higher OD ink composition (Base 2-71) without a substantial loss in observed OD.

Thus, the inkjet ink compositions of the present invention, comprising a modified pigment of the present invention and a second colorant, produce printed images having an OD higher than would be expected based on the performance of inkjet ink compositions comprising either the first colorant or the second colorant individually, based on the weighted average.

Example 72

The following examples describe the preparation of modified pigments according to an embodiment of the present invention, comprising a pigment having attached at least two phosphonic acid groups or salts thereof.

Three aqueous dispersions of a carbon black having attached phenyl-2-(sulfatoethylsulfone) groups was prepared according to the following general procedure. A ProcessAll 4HV Mixer (4 liter) was charged with 500 g of dry carbon black (having an approximate nitrogen surface area=220 $m^2/g$ and a DBP=105 cc/g), 1 L of DI water, and 4-aminophenyl-2-sulfatoethylsulfone (APSES). The amount of APSES used for each dispersion (treatment level, moles of APSES per kg of carbon black) is shown in Table 29 below. The resultant mixture was then heated to 60° C. while intensely mixing at 300 RPM for 10 minutes. To this was added a 20% aqueous sodium nitrite solution (1 equivalent based on the amount of APSES) over 15 minutes. Heating and mixing was continued for a total of 3 hours. The contents of the mixer were removed by diluting with an additional 750 ml of DI water, and the resulting dispersion was then purified by diafiltration using DI water. At the end of the diafiltration (permeate conductivity <200 micro siemens) the concentration of pigment was adjusted to 15% and then centrifuged in a Carr Continuous Centrifuge (PilotFuge). The sodium content of the dispersion was then measured with an Orion Ion Selective Electrode, and the results, expressed on a solid basis, are shown in Table 29 below. From these values, an attachment level of the phenyl-2-(sulfatoethylsulfone) group was determined.

TABLE 29

| Dispersion | Treatment level (mol/Kg) | Na+ (ppm) | Attachment level (mol/Kg) |
|---|---|---|---|
| A | 0.5 | 6646 | 0.29 |
| B | 1 | 9769 | 0.42 |
| C | 1.5 | 11746 | 0.51 |

Modified pigments of the present invention were prepared from these dispersions using one of the following methods. Method A describes the preparation of the modified pigment of Example 72-1 while Method B describes the preparation of the modified pigment of Example 72-3. Specific amounts and conditions for each example are shown in Table 30 below, along with the type of mixer used (P=overhead paddle mixer, R/S=high speed rotor-stator mixer). The mole ratio relates the moles of alendronate sodium to the calculated attachment level shown in Table 29 above.

TABLE 30

| Example No. | Dispersion | Dispersion Solids (%) | mole ratio | Temp (° C.) | Method | Mixer type |
|---|---|---|---|---|---|---|
| 72-1 | A | 20 | 1 | 70 | A | P |
| 72-2 | B | 15 | 2 | 47.5 | A | R/S |
| 72-3 | C | 20 | 1 | 25 | B | P |
| 72-4 | A | 10 | 3 | 70 | B | P |
| 72-5 | C | 10 | 1 | 70 | A | R/S |
| 72-6 | A | 10 | 1 | 25 | B | R/S |
| 72-7 | B | 15 | 2 | 47.5 | A | P |
| 72-8 | C | 10 | 3 | 25 | A | P |
| 72-9 | A | 20 | 3 | 25 | A | R/S |
| 72-10 | C | 20 | 3 | 70 | B | R/S |
| 72-11 | C | 20 | 0.5 | 25 | B | P |
| 72-12 | C | 20 | 0.3 | 25 | B | P |

Method A

Alendronate sodium, 9.39 g (the monosodium salt of a 4-amino-1-hydroxybutane-1,1-diyl)bisphosphonic acid, commercially available from Zentiva, Prague, Czech Republic) was placed in a 2.5 L beaker. To this was added 37.56 g of DI water followed by 64.73 g of a 10% aqueous sodium hydroxide solution. The mixture was stirred until the solid had dissolved. Under vigorous mixing, 500 g of Dispersion A (at 20% solids) was introduced by pumping at approximately 25 ml/min. After all of the dispersion had been added, the pH was measured to ensure a pH>12.5. Mixing was continued at 70° C. for 4 hours, and the resulting dispersion comprising the modified pigment of the present invention was purified as described in the Method B.

Method B

Alendronate sodium (16.6 g) (the monosodium salt of a 4-amino-1-hydroxybutane-1,1-diyl)bisphosphonic acid, commercially available from Zentiva, Prague, Czech Republic) was placed in a 2.5 L stainless steel beaker containing 66.39 g of DI water. To this was added 500 g of Dispersion C (at 20% solids), and the resultant mixture was stirred vigorously until the solid had dissolved. To this vigorously mixed solution was added 114.4 g of 10% NaOH, by pumping at approximately 25 ml/min. After all of the base had been added, the pH was measured to ensure a pH>12.5. Mixing was continued at 25° C. for 4 hours.

The resulting dispersion, comprising the modified pigment of the present invention, was diluted to 5% solids and diafiltered with DI water until the permeate pH was <8 (after the first diafiltration volume the retentate was concentrated to 10% solids). The dispersion (adjusted to a solids concentration of approximately 13%) was then sonicated for 20 minutes using a Misonix probe sonicator, centrifuged using a Beckman Ultracentrifuge at 5000 G for 10 minutes to remove any large particles.

Ink compositions comprising the modified pigments were prepared according to the formulation shown in Table 31.

TABLE 31

| Component | Concentration |
|---|---|
| Pigment: | 4% |
| Trimethylol propane: | 7% |
| Diethylene glycol (DEG) | 5% |
| Surfynol 465: | 1% |
| Glycerin: | 7% |
| DI Water: | 76% |

Resulting physical and print properties are shown in Table 32 below. The mean volume particle size (mV) of the modified pigment in the dispersion was measured using a Microtrac® Particle Size Analyzer. Images were printed using a Canon iP4000 printer, and the optical density (OD) of a solid area fill at maximum print density was measured using ImageXpert™. Four measurements of OD are performed on 3 replicate prints of each of 6 types of paper—HP Bright White, HP Advanced Paper, HP Plain Paper, Hammermill Copy Plus, Hammermill InkJet, and Xerox 4200. OD averaged across this paper set is shown in Table 32. Also included in this table are the print properties of the ink from the Canon iP4000 printer (OEM).

TABLE 32

| Example No. | mV (microns) | Sodium (ppm) | Ave. OD |
|---|---|---|---|
| 72-1 | 0.1031 | 10869 | 1.45 |
| 72-2 | 0.0919 | 14705 | 1.46 |
| 72-3 | 0.1057 | 15448 | 1.46 |
| 72-4 | 0.0987 | 11178 | 1.43 |
| 72-5 | 0.0959 | 13602 | 1.46 |
| 72-6 | 0.0988 | 9459 | 1.44 |
| 72-7 | 0.0991 | 14120 | 1.46 |
| 72-8 | 0.0979 | 15386 | 1.45 |
| 72-9 | 0.104 | 10861 | 1.44 |
| 72-10 | 0.0894 | 14078 | 1.46 |
| 72-11 | 0.109 | 13282 | 1.47 |
| 72-12 | 0.1031 | 12077 | 1.47 |
| OEM | NA | NA | 1.31 |

As the results in Table 32 show, inkjet ink compositions of the present invention, comprising a modified pigment which comprises a pigment having attached a bisphosphonic acid group or salt thereof, had superior optical density compared to the OEM ink.

In addition, it has been found that inkjet ink compositions comprising different modified pigments, prepared as described in this example with the exception that a different colored pigment is used instead of the described carbon black, can also be prepared. These inkjet inks have been found to produce printed images having overall improved print properties. For example, using Pigment Violet 19, the inkjet ink compositions of the present invention produce printed images having improved durability, improved gloss on photomedia, and improved color saturation on plain paper compared to the an Epson C88 OEM inkjet ink composition.

Examples 73-75

The following examples describe the preparation of a modified pigment of the present invention, comprising a pigment having attached at least one organic group having a calcium index value greater than a calcium index value of phenylphosphonic acid and a second organic group that is polymeric.

Example 73

Black Pearls® 700 carbon black (500 g), 81 g of 1-amino-3,4,5-benzenetricarboxylic acid, and 650 g of water was charged to a ProcessAll 4HV Mixer (4 liter) which was held at 50° C. The mixer was sealed and agitation was started (300 RPM). In a separate vessel, 17.28 g sodium hydroxide was dissolved in 200 g of water. This sodium hydroxide solution was added to the mixer during agitation. In a third vessel 24.84 g sodium nitrite was dissolved in 75.16 g water. When the contents of the mixer were at 50° C., the sodium nitrite solution was pumped into the mixer over 15 minutes. The temperature and agitation were maintained for two hours. At the end of the 2 hours, the mixer was opened, and 61 g of 4-aminobenzyl amine were added. The mixer was sealed and agitated for five minutes, after which the vessel was again opened and a further 61 g of 4-aminobenzyl amine was added. The sealed mixture was agitated another ten minutes. In a separate vessel, 180 g of 70% aqueous nitric acid was mixed with 180 g water, and this solution was pumped into the agitated vessel over five minutes. The pump line was rinsed with 50 mL water, and agitation was maintained for 15 minutes, during which the temperature was raised to 60° C. In another vessel 69 g of sodium nitrite were dissolved in 276 g water, and this sodium nitrite solution was pumped into the mixer over 15 minutes. The temperature and agitation were maintained for two hours, and then 200 g water was added and mixed for fifteen minutes. The resulting slurry was removed from the mixer, and the mixer was rinsed twice with 1 L of water, with each rinse being added to the slurry, resulting in 4,645 g of slurry. One half of this, approximately 2,323 g was diluted with water to a volume of 3.5 L and stirred with a paddle blade for 20 minutes. This slurry was filtered with a Buchner funnel and Whatman 1 filter paper, slurried with fresh water, and recombined with the unwashed slurry, resulting in a dispersion that was 11.88% solids comprising a modified pigment having attached benzene tricarboxylic acid groups.

This dispersion (1262 g) and 378 mL water were placed in a stainless steel beaker, equipped with a rotor-stator, thermocouple, pH meter and addition funnel. Sodium hydroxide (20% aqueous, 26 g) was added to adjust the pH to 11.35. To the addition funnel was added 225 g of 2-bromoisobutyryl-bromide. The rate of addition of the acid bromide was adjusted to maintain a temperature below 50° C., and the total time of addition was 4.25 hours. During the course of the addition, the pH was monitored, and 20% sodium hydroxide was added as needed to maintain a pH of 9-10. Thus, over the course of the addition, 539 g of 20% sodium hydroxide was added. After the addition was complete, the pH was adjusted to 4.1 with a 5 M nitric acid solution. After cooling to room temperature, the reaction was diluted to 3.5 L, and filtered with a Buchner funnel and Whatman 1 filter paper. The material was washed with fresh water and filtered three times. The pH was adjusted to 3, and the resulting modified carbon black was collected by filtration and dried in a vacuum oven at 60° C. and 20 Torr. The resulting product was found to have 4.72% bromine by combustion analysis.

The modified carbon black (10 g) was then combined with 36 g isopropanol, 5.2 g ethylene glycol, 2 g methacrylic acid and 8 g 2-ethylhexylmethacrylate in a round bottom flask with sonication and purged with nitrogen for 30 minutes. In a separate vessel, 0.75 g of ethylenedithiol diacetic acid, sodium salt and 4.5 g of water were combined with stirring and purged with nitrogen. Into a third vessel was added 0.212 g of Cu (I) Br, and the atmosphere was purged with nitrogen. When the ethylenedithiol diacetic acid, sodium salt, had dissolved, it was added to the Cu (I) Br. This was warmed to about 50° C. with stirring, during which the Cu (I) Br dissolved. Once dissolved, the resulting solution was added in a steady stream by syringe to the purged monomer mixture. The temperature of the mixture was then brought up to 70° C. The reaction was monitored by GC over the course of 40 hours, and, after this time, the reaction was cooled to room temperature.

This reaction mixture was then diluted 1:1 with 2-propanol, and sonicated for 10 minutes. This was further diluted to 1% solids with 2-propanol, and diafiltered with 2 volumes of 2-propanol. The resulting mixture was treated with 75 g of 50 mM NaOH solution in water and allowed to stir for 2 hours. The pH was found to be 8.9. This mixture was then diafiltered with 4 volumes water and then sonicated for 1.5 hours, while adjusting the pH to 8.5 with 50 mM NaOH solution. After allowing the mixture to stand for 14 hours, the pH was adjusted again, and the dispersion was diafiltered with 2 volumes water and sonicated for 1.25 hours, while maintaining the pH at 8.5. The resulting dispersion of a modified carbon black, which is a modified pigment of the present invention, was concentrated to 500 mL (13% solids) and found to have a particle size of 245 nm (measured using a Microtrac UPA 150) with a surface tension of 63.6 dynes/cm$^2$. The amount of attached polymer, determined by TGA, was 30% polymer by weight.

Example 74

A dispersion of a modified carbon black of the present invention was prepared using the procedure described in Example 73, with the exception that 2.5 g of methacrylic acid and 7.5 g of 2-ethylhexyl acrylate was used, and the final sonication was for 30 minutes. The resulting dispersion of a modified carbon black was concentrated to 11.8 solids and was found to have a particle size of 232 nm (measured using a Microtrac UPA 150) with a surface tension of 70.6 dynes/cm$^2$. The amount of attached polymer, determined by TGA, was 23% polymer by weight.

Example 75

A dispersion of a modified carbon black of the present invention was prepared using the procedure described in Example 73, with the exception that, for the polymerization, the time elapsed was 65 hours. Also, at the end of the polymerization, the contents of the reaction vessel were decanted into a 250 mL nalgene container, and the reaction vessel was rinsed with methanol. This mixture was then centrifuged at 4400 rpm for 20 minutes. The supernatant was decanted, and the solids were dispersed in 235 g of a 50 mM NaOH solution with a rotor-stator mixer for 30 minutes and then sonicated for 9 hours. The dispersion was adjusted to pH 8.5 with a 50 mM NaOH solution, sieved through a 45 micron screen, then diafiltered with 2 volumes of a 50 mM NaOH solution followed by 11 volumes of water. The resulting dispersion of modified carbon black was concentrated to 185 g (4.64% solids). After further sonication for 2 hours, the dispersion was allowed to stand for 14 hours, after which the dispersed material was poured off any settled material. The particle size of the dispersion was found to be 343 nm (measured using a Microtrac UPA 150) with a surface tension of 60.1 dynes/cm$^2$. The amount of attached polymer, determined by TGA, was 36% polymer by weight.

Examples 76-78

Inkjet ink compositions of the present invention were prepared using the dispersions of modified pigments of Examples 73-75. For each of these examples, an amount of each dispersion needed to give a 4.5 wt % pigment was weighed out. To this was added the following components, in amounts to yield an inkjet ink composition with the corresponding weight percents: water (balance), diethylene glycol (15 wt %), Surfonyl 465 (available from Air Products) (1 wt %).

Each inkjet ink composition was individually charged to an Epson-compatible ink cartridge (Inkjetwarehouse.com, part number E-0431-K) and printed from an Epson C88 printer onto papers as indicated in Table 33 and Table 34 below. Printer settings for the data in Table 33 were "best photo/heavy matt/Black only" while those for the data in Table 34 were "best photo/plain paper/ICM off". The resulting images were evaluated for optical density (measured using ImageXpert™ and resistance to highlighter smear ("pass" means little or no smear and "fail" means visible smear).

TABLE 33

| Pigment Ex No. | OD Hammermill Copy Plus | OD HP multipurpose | OD HP Brite White | Highlighter Smear Orange | Highlighter Smear Yellow |
|---|---|---|---|---|---|
| Comp Ex 10 | 1.40 | — | — | FAIL | FAIL |
| 73 | 1.5 | — | 1.51 | PASS | PASS |
| 74 | 1.45 | — | — | PASS | PASS |
| 75 | 1.30 | 1.37 | 1.27 | PASS | PASS |

TABLE 34

| Pigment Ex No. | OD Hammermill Copy Plus | OD HP multipurpose | OD HP Brite White | Highlighter Smear Orange | Highlighter Smear Yellow |
|---|---|---|---|---|---|
| Comp Ex 10 | 1.27 | — | — | FAIL | FAIL |
| 73 | 1.29 | 1.21 | 1.29 | PASS | PASS |
| 74 | 1.21 | 1.26 | 1.24 | PASS | PASS |
| 75 | 0.99 | 0.98 | 1.07 | PASS | PASS |

As the results show, inkjet ink compositions of the present invention, comprising a modified pigment which comprises a pigment having two attached groups, wherein one group has a calcium index value greater than a calcium index value of phenylphosphonic acid, produce printed images having good highlighter smear compared to Comparative Example 10, which is a modified carbon black prepared using a procedure similar to that described in Example 73 using 0.4 mmol/g 5-aminobenzene tricarboxylic acid and sodium nitrite, and 0.57 mmoles NaOH.

Example 79

The following example describes the preparation of a modified pigment of the present invention comprising a pigment having attached at least one organic group having a calcium index value greater than a calcium index value of phenylphosphonic acid and a second organic group that is polymeric.

4,4'-Azobis(4-cyanovaleric acid) (25 g, 89 mmol) was added to thionyl chloride (50 ml), and the reaction mixture was refluxed at 80° C. for 40 min or until solids were completely dissolved. The hot solution was immersed in an ice bath and cooled to room temperature. This solution was poured into cold hexane (500 ml) and stirred for 4 hours at 5° C. to allow the product to precipitate. The precipitate was filtered and washed with cold hexane (500 ml) to yield 4,4'-azobis(4-cyanovaleric acid chloride) as a white solid (26.2 g, 93%).

4-Nitroaniline (34.2 g, 248 mmol) and pyridine (13.03 g, 164 mmol) were added to dichloromethane (100 ml) and cooled to 5° C. in an ice bath. A solution of 4,4'-azobis(4-cyanovaleric acid chloride) (26.2 g, 82 mmol) in dichloromethane (150 ml) was added dropwise to the above suspension. The reaction mixture was gradually warmed up to room temperature and stirred at this temperature for 14 hours. Formed pyridine hydrochloride was filtered off and washed with dichloromethane (150 ml). The filtrate was added to water (400 ml) and stirred for 30 min to allow for the product to precipitate. The resulting yellow precipitate was filtered to yield 13.8 g of 4,4'-azobis(N-p-nitrophenyl-4-cyanovaleramide) (32% yield). The structure was confirmed by mass spectra (MI+520.93).

A methacrylic acid/n-butyl methacrylate copolymer (25% methacrylic acid, 75% n-butyl methacrylate) was prepared using semi-continuous feed techniques at 50% solids in i-butyl acetate (IBA). 4-Aminothiophenol (1% based on the monomer feed) was added to the mixed monomers, and the mixture was fed into the solvent over 150 minutes, with the temperature being held between 90° C. and 95° C. 4,4'-Azobis(N-p-nitrophenyl-4-cyanovaleramide) (1% based on the monomer feed) was dissolved in 15 ml of N-methyl-2-pyrrolidone (NMP) and added as a cofeed over the same period of time. The reaction temperature was maintained for an hour after the feed ended, and an aliquot of 4,4'-azobis(4-cyanovaleric acid) (1% based on the monomer feed) was added at the end of the hour. The polymer was collected by precipitation into hexanes three times, and then dissolved in tetrahydrofuran (approximately 20-30% solids). The inherent viscosity of the resulting polymer was 0.17 dL/g in THF, and the acid number was 150 mg KOH/g polymer.

A solution of this polymer in THF (200 ml, 10% solids) was then purged with nitrogen for 10 min. To this solution was added 10% palladium on carbon catalyst (2.5 g), and the mixture was hydrogenated in a Parr apparatus at 45 psi for 3-4 hours. The catalyst was then filtered off, resulting in a 200 ml solution of polymer having aminophenyl end groups in THF (10% solids).

This hydrogenated polymer was then used to prepare modified pigments of the present invention. Thus, hydrochloric acid (10 mmol) was added to a stirring dispersion of 25 g of a carbon black product, prepared as described in Comparative Example 10, in 133 g of water. The mixture was centrifuged and the supernatant liquid was decanted. The remaining solids were suspended in more water, the mixture was centrifuged, and the supernatant liquid was decanted. The residue contained 75 g of water.

A solution of the hydrogenated polymer described above in THF containing 5 g solids and additional THF were added so that the total amount of THF was 180 g. The mixture was heated to 55° C. and stirred with a mechanical stirrer and with a rotor stator. After addition of 0.43 g methanesulfonic acid and an aqueous solution containing 0.31 g $NaNO_2$, the mixture was stirred for two hours. The mixture was allowed to cool to room temperature, and the pH was increased to 10 with a sodium hydroxide solution. Methanol (1 L) was added and the mixture was allowed to stand for two days. The top layer was decanted, and the residue was dispersed in water. The product was purified by diafiltration with ten volumes of water, and filtered through 45 and 20 micron screens as well as 2 and 1 micron filters. The resulting product was a dispersion of a modified carbon black of the present invention having attached both an ionic group and a polymeric group (16% volatiles determined by TGA).

Comparative Example 11

A mixture of 20 g of a carbon black having a nitrogen surface area of 200 $m^2$/g and a DBPA of 117 mL/100 g, 80 g of water, and a solution of hydrogenated polymer described in Example 79 in THF containing 20 g solids and additional THF was prepared so the total amount of THF was 320 g. The mixture was heated to 55° C. and stirred with a mechanical stirrer and with a rotor stator. After addition of 3.84 g methanesulfonic acid and an aqueous solution containing 2.76 g $NaNO_2$, the mixture was stirred for two hours. The mixture was allowed to cool to room temperature. Water was added to bring the volume to 2 L, and the pH was increased to 10 with sodium hydroxide solution. The dispersion was sonicated and allowed to stand for three days. The product was purified by diafiltration with ten volumes of water, and filtered through 2 and 1 micron filters. The product was further purified by diafiltration with ten volumes of methanol followed by ten volumes of water. The product was a dispersion of a modified carbon black with attached polymeric groups having 16% volatiles by TGA but with no attached organic group having a calcium index value greater than a calcium index value of phenylphosphonic acid.

Example 80

The dispersions prepared in Example 79 and Comparative Example 11 were used to make inkjet ink compositions containing 4% carbon black (with solids at 4.2-4.6%), 7% glycerin, 7% trimethylolpropane, 5% diethylene glycol, 1% Surfynol® 465 surfactant with the balance as water. In addition, a similar inkjet ink composition was prepared using the same carbon black (Comparative Example 10), which is the carbon black from which the modified carbon black of Example 79 was prepared. These inks were loaded into cartridges and printed with a Canon I550 printer onto three different papers—Hammermill Copy Plus (HCP), Hammermill Premium Inkjet (HPI), and HP Bright White (HPBW). The resulting images were evaluated for optical density (measured using ImageXpert™ and resistance to highlighter smear ("good" means little or no smear and "fair" means only a slight amount of visible smear), and the results are shown in Table 35 below.

TABLE 35

| Pigment | Optical Density | | | | Highlighter resistance | |
|---|---|---|---|---|---|---|
| Example No. | HCP | HPI | HPBW | Average | Orange | Yellow |
| 79 | 1.23 | 1.19 | 1.50 | 1.31 | Good | Good |
| Comp Ex 10 | 1.30 | 1.24 | 1.52 | 1.36 | Fair | Fair |
| Comp Ex 11 | 1.09 | 1.00 | 1.22 | 1.11 | Good | Good |

The print results show that the product of the inkjet ink composition of the present invention, comprising a modified pigment which comprises a pigment having attached an organic group having a defined calcium index value and having attached a polymeric group, has an optical density superior to that of a comparable inkjet ink composition comprising a modified pigment having only the attached polymeric group (Comparative Example 11) with equal durability performance. The print results also show that the inkjet ink composition of the present invention has durability performance superior to that of a comparable inkjet ink composition having only the attached organic group (Comparative Example 10) with nearly the same optical density. Thus, the inkjet ink composition of the present invention has a good balance of overall properties.

Example 81

The following example describes the preparation of a modified pigment of the present invention comprising a pigment having attached at least one organic group having a calcium index value greater than a calcium index value of phenylphosphonic acid and a second organic group that is polymeric.

A modified pigment comprising carbon black having attached an organic group comprising at least two phosphonic acid groups or salts thereof was prepared using the procedure described in Example 7a, with the exception that 0.165 mmoles of the material prepared in Example 1 per gram of carbon black was used.

A copolymer of 92.8 weight percent butyl methacrylate and 7.2 weight percent methacrylic acid was prepared using semicontinuous feed techniques following the procedure described in Example 79, with the exception that 0.4 weight percent of 4-aminothiophenol and 0.9 percent of 4,4'azobis (N-p-nitrophenyl-4-cyanovaleramide) were used. The inherent viscosity of this polymer was 0.16 dL/g in THF, and the acid number was 42.3 mg KOH/g polymer. This was used at 14% solids in THF after purification by precipitation in hexanes and was hydrogenated following the procedure described in Example 79.

To a 500 mL stainless steel beaker was added 20 g of the modified carbon black having attached at least one organic group which comprises at least two phosphonic acid groups or salts thereof, 46 g of the hydrogenated polymer solution, 104 g of THF, and 20 g of water. This mixture was agitated with a propeller blade and a rotor-stator, and heated to a temperature of 50° C. In a separate vessel 0.25 g sodium nitrite was dissolved in 16 g of water. Methanesulfonic acid (0.66 g) was added to the agitating mixture, and the sodium nitrite solution was added dropwise over 5 minutes. The mixture was maintained at 50° C. with agitation for 2 hours.

After 2 hours, THF (800 mL) was charged to a polyethylene vessel, and the resulting reaction mixture was added to this with manual agitation. The solids were collected by centrifugation, and washed twice. The solids were dispersed in 500 mL water at pH 9 with a sonic probe for 30 minutes. The resulting dispersion was filtered through a 45 micron screen and diafiltered with 10 volumes of water (approximately 5 liters). The resulting product was a dispersion of a modified carbon black of the present invention having both an attached organic group and an attached polymeric group. The particle size of the dispersion was found to be 144 nm (measured using a Microtrac UPA 150) and the amount of attached material, determined by TGA, was 5.3% volatiles.

The resulting dispersion of the modified carbon black and Comparative Example 12 were used to make inkjet ink compositions containing 4% carbon black (with solids at 4.2-4.6%), 7% glycerin, 7% trimethylolpropane, 5% diethylene glycol, 1% Surfynol 465 surfactant with the balance as water. The comparative pigment of Comparative Example 12 is a modified pigment comprising carbon black having attached an organic group comprising at least two phosphonic acid groups or salts thereof and was prepared using the procedure described in Example 7a, with the exception that 0.165 mmoles of the material prepared in Example 1 per gram of carbon black was used. These inks were loaded into cartridges and printed with a Canon I550 printer onto four different papers—Hammermill Copy Plus (HCP), Hammermill Premium Inkjet (HPI), Xerox 4200 and HP Bright White (HPBW). The resulting images were evaluated for optical density (measured using ImageXpert™ and resistance to highlighter smear ("fair" means only a slight amount of smear and "poor" means a significant amount of visible smear), and the results are shown in Table 36 below.

TABLE 36

| Pigment Example No. | Average OD | Highlighter resistance | |
|---|---|---|---|
| | | Orange | Yellow |
| 81 | 1.40 | Fair | Fair |
| Comp Ex 12 | 1.38 | Poor | Poor |

The results show that a modified carbon black comprising a carbon black having attached at least one organic group having a calcium index value greater than a calcium index value of phenylphosphonic acid and a second organic group that is polymeric has improved OD and highlighter smear compared to a modified carbon black having only the attached organic group.

Examples 82-86

The following examples describe the preparation of materials (treating agents) used to produce modified pigments according to an embodiment of the present invention, comprising a pigment having attached at least two phosphonic acid groups or salts thereof.

Example 82

The 4-aminobenzamide of alendronate sodium was prepared as follows. In a 500 mL beaker, 54 g (166 mmol) of sodium alendronate was dissolved in 150 mL of DI water with a pH adjusted to 11 with concentrated NaOH. Nitrobenzoyl chloride, 28 g (150 mmol), dissolved in 100 mL of THF, was added dropwise into the aqueous alendronate solution. The pH was kept at 11 with additional NaOH solution during the addition. After the addition was complete, the solution was stirred for another 2 hours at room temperature. THF was removed in vacuo, and the pH of the solution was adjusted to 4. The resulting precipitate, which was collected by filtration at room temperature, was primarily nitrobenzoic acid and was discarded. The solution was kept at 4° C. overnight, and the resulting precipitate was collected by filtration, washed with DI water, and dried. The resulting solid weighted approximately 56 g (86%).

The dried solid was redissolved in 200 mL of water and hydrogenated with 2 g of 5% Pd/C under 40 psi of $H_2$. After the catalyst was removed by filtration, all of the water was evaporated from the solution, affording a white solid product. $^1$HNMR (NaOD/$D_2$O): 7.60 (d, 2H), 6.80 (d, 2H), 3.35 (t, 2H), 1.95 (m, 4H). NMR indicates that about 10% of the solid is the alendronate starting material. This was used directly for the preparation of modified pigments of the present invention without further purification.

Example 83

The 4-aminobenzene sulfonamide of alendronate sodium was prepared as follows. In a 500 mL beaker 34 g (104 mmol) of alendronate was dissolved in 150 mL of DI water with pH adjusted to 11 with concentrated NaOH. Nitrophenylsulfonyl chloride, 25 g (110 mmol), dissolved in 100 mL of THF, was added dropwise into the alendronate solution. The pH was kept at 10-11 with additional NaOH solution during the addition. After the addition was complete, the solution was stirred for another 2 hours at room temperature. THF was evaporated in vacuo, and the pH of the solution was adjusted to 4. After overnight cooling at 4° C., the solid was collected by filtration, washed with DI water, and dried.

The dried solid was redissolved in 200 mL of DI water and hydrogenated with 5 g of 5% Pd/C under 40 psi $H_2$. After the catalyst was removed by filtration, all of the water was evaporated under vacuum. A white solid was collected (42.5 g, 95%). $^1$HNMR (NaOD/$D_2$O): 7.52 (d, 2H), 6.96 (d, 2H), 2.60 (t, 2H), 1.65 (m, 4H).

Example 84

[1-Amino-2-(4-aminophenyl)ethane-1,1-diyl]bisphosphonic acid, monosodium salt was prepared using a procedure similar to that of Example 1. Thus, a 500 mL three neck flask was fitted with a condenser with a gas outlet on the top of the condenser, a thermometer and dry nitrogen inlet, and a 100 mL pressure equilibrating addition funnel. To this flask was first added 20 g of phosphorous acid (230 mmol) and 120 mL of methanesulfonic acid (solvent). To the stirred mixture was added portion-wise 30 g of aminophenylacetonitrile (227 mmol). The stirred mixture was heated to 65° C. for 1-2 hours to allow the solids to completely dissolve. The whole system was flushed with dry nitrogen, and the temperature was reduced to 40° C. after all of the solids had dissolved. To this heated solution was slowly added 60 mL of $PCl_3$ (3 equivalents) through the addition funnel. HCl gas was generated from the reaction, which flowed through the gas outlet, into a dry tube, and then into a concentrated NaOH solution in a beaker through a funnel. After the addition was complete, the reaction mixture was stirred and heated at 40° C. for two hours. After this time, the temperature was raised to 65-70° C., and the mixture was stirred overnight. The resulting clear, brown colored solution was cooled to room temperature and quenched by addition into 600 g of an ice/water mixture. The aqueous mixture was placed into a 1 L beaker and was heated to 90-95° C. for 4 hours (the top of the beaker could be covered with a glass plate). The mixture was then allowed to cool to room temperature, and the pH of the mixture was adjusted to 4-5 with 50% NaOH solution, added slowly as the temperature would rise as a result of the quenching. The mixture was cooled to 5° C. with an ice bath for 2 hours and then the resulting solids were collected by suction filtration, washed with 1 L cold DI water and dried at 60° C. overnight, yielding a white or off white solid product (yield was 12 g, 30%). $^1$HNMR data for this compound (D$_2$O/NaOH) was as follows: 7.2 (2H, d), 6.8 (2H, d), 3.15 (2H, t).

Example 85

[2-(4-aminophenyl)ethylene-1,1-diyl]bisphosphonic acid, monosodium salt was prepared as follows. A 5 L round bottom flask, equipped with an addition funnel, rubber septum, mechanical stirrer, nitrogen inlet, and thermometer, was evacuated and purged with nitrogen. To this was added 250 mL of toluene followed by 500 mL of THF. This was then cooled to 0° C., and TiCl$_4$ (110.4 g, 0.581 moles) was added dropwise over 30 minutes. 4-Nitrobenzaldehyde (44 g, 0.291 moles) in 250 mL of THF was added dropwise over 1 hour at 0° C. followed by tetraisopropyl methylenediphosphonate (100 g, 0.291 moles) in 100 mL of THF. The resulting mixture was stirred for 2 hours at room temperature. Then, N-methylmorpholine (118 g, 1.168 moles) in 100 mL THF was added over 1 hour. The reaction mixture was warmed to room temperature and allowed to stand for 12 hours. The mixture was then quenched slowly by adding 1N HCL solution (1000 mL). Ethyl acetate (500 mL) was added and stirred for 30 minutes. The resulting organic layer was separated, and the aqueous layer was extracted with 250 mL ethyl acetate. The combined organic layers were then washed twice with brine (500 mL), a saturated aqueous solution of NaHCO$_3$, and a 2% solution of EDTA disodium salt (2×250 mL) and was then dried over sodium sulfate and evaporated to yield a brown oil (114 g, 81% yield).

This brown oil (140 g, 0.294 moles) was added to a round bottom flask followed by 700 mL of concentrated HCl and 200 mL of isopropanol. The reaction mixture was heated to reflux with efficient stirring for 4 hours. This was then cooled to 60° C. and evaporated under reduced pressure, resulting in the formation of a brownish yellow solid (90 g).

This brownish yellow solid (110 g) was dispersed in 2110 mL of deionized water, and the pH was adjusted to 8.5 using a 10N sodium hydroxide solution (90 mL), forming a clear solution. The mixture was then hydrogenated with 4.4 g of a 5% Pd/C (50% wet, 2 weight %) at room temperature 75 psi hydrogen pressure for 12 hours. The product mixture was filtered through celite powder, and washed with a 5N NaOH solution (20 mL). The filtrate was cooled to 5° C.-10° C. and acidified to a pH of 3.5 by using a 5N HCl solution (100 mL). The precipitate formed was filtered, and the wet cake washed with 2×200 ml water. The wet product was then dried in a vacuum oven at 60° C. for 6hrs, yielding a yellow solid (65 g, 60.6%). $^1$HNMR data for this compound (400 MHz, D$_2$O/NaOH) was as follows: 6.79 (d, 2H, J=8.4 Hz), 7.49 (dd, 1H, J=28.8 Hz, 42 Hz), 7.8 (d, 2H, J=8 Hz). $^{13}$CNMR data for this compound (D$_2$O/NaOH) was as follows: 115.2, 116.1, 129.6, 132.3, 143.7, 146.0. Also, LC-Mass Spec data for this compound was as follows: 278 (M−23).

Example 86

[(4-Aminophenyl)methylene]bisphosphonic acid, monosodium salt was prepared as follows. In an oven-dried 500 mL three necked round bottom flask was charged with 22.8 g of benzyldiethylphosphate (100 mmol) in 150 mL of dried THF. The solution was flashed with nitrogen and cooled with dry ice/acetone (−78° C.). Into the solution was added through a septum 50 mL 2 M lithium diisopropyl amine (LDA) solution (Aldrich). The mixture had a dark brown color. Into the mixture was added dropwise 18 g of chlorodiethylphosphate (100 mmol). After 30 minutes, another 50 mL of 2 M LDA was added. The mixture was then allowed to warm up to room temperature by taking away the dry ice/acetone bath and stirred at room temperature for another 2 hours. Then, a small amount of methanol was added to destroy the base. All solvents were evaporated under vacuum, and the oil residue was partitioned with 300 mL of ethyl acetate and 200 mL of DI water. The ethyl acetate phase was dried and evaporated to give 35 g of crude product. This was used directly for the next step. $^1$H-NMR data for this compound (CDCl$_3$) was as follows: 7.60 (m, 5H), 4.00 (m, 8H), 3.76 (t, 1H), 1.20 (m, 12H).

In a 250 mL of beaker was mixed 10 mL of 70% nitric acid and 50 mL of 98% of concentrated sulfuric acid. The mixed acids were cooled with an ice bath to 5-10° C. The product from the previous step was added dropwise into the mixture (the temperature was not allowed to rise to over 25° C.). After the addition was finished, the mixture was stirred at room temperature for another 1 hour and poured into 300 g of ice/water. The aqueous mixture was extracted with 2×300 mL of ethyl acetate, and the acetate phase was washed with saturated NaHCO$_3$ (400 mL). After drying with Na$_2$SO$_4$, the organic solution was evaporated to dryness, leaving 22 g of a brown viscous oil. The viscous oil was loaded onto a 300 g silica gel-filled column and was flash chromatographed with 75% ethyl acetate/25% hexane. After the first 500 mL, 100% of ethyl acetate was used to elute the desired product. Yield after evaporation of the solvent: 21 g. $^1$H-NMR data for this compound (CDCl$_3$) was as follows: 8.2 (d, 2H), 7.6 (d, 2H), 4.00 (m, 9H), 1.20 (m, 12H).

The oil from previous step was mixed with 200 mL of a 6 M HCl solution and heated at reflux for 15 hours. All of the solvent was evaporated in vacuo, and the residue was mixed with 2×50 mL of isopropyl alcohol (IPA) and evaporated again, yielding a brown oil (16 g).

The 16 g of oil was dissolved in 150 mL of DI water with pH adjusted to 8.5 using a 50% NaOH solution. Into the resulting solution was added 15 g of ammonium sulfide. The mixture was stirred at room temperature overnight. On the second day, another 10 g of ammonium sulfide was added, and the mixture was heated to 60° C. for 5 hours. After cooling down to room temperature, the solids were filtered and discarded. The filtrate was pH adjusted to 4.0 with concentrated HCl. After standing overnight at 4° C., approximately 7 g of yellow solid precipitated out (strong smell of sulfur). The solid was redissolved in dilute NaOH (pH 10), and undissolved solid was filtered and discarded. After adjusting the pH back to 4.0, about 5 g of final purified product was obtained (overall yield 17% from the first step). $^1$H-NMR data for this compound (D$_2$O/NaOD) was a follows: 7.20 (d, 2H), 6.70(d, 2H), 3.10 (t, 1H).

Examples 87-91

The following examples describe the preparation of modified pigments according to an embodiment of the present invention, comprising a pigment having attached at least two phosphonic acid groups or salts thereof. For each example, the procedure described for Example 7a was followed, with the exception that the materials from Example 82-86 were used instead of the material from Example 1. Amounts of material used are shown in Table 37 below.

Examples 92-96

The following examples describe the preparation and print performance of inkjet ink compositions according to an embodiment of the present invention. Inkjet ink compositions were prepared using the procedure described in Example 14, with the exception that the modified pigment dispersions of Examples 87-91 were used. Print test conditions were also similar to those described in Example 14, and images were printed using a Canon i550 printer on the following 5 types of plain paper: Hammermill Inkjet (HMI), Hammermill Copy Plus (HCP), Hewlett Packard Advance paper (HPAP), Hewlett Packard printing paper (HPPP) and Xerox 4200 (X4200). The optical density (OD, or visual density) of a solid area fill at maximum print density was measured using ImageXpert™. Four measurements of OD are performed on 3 replicate prints of each type of paper. Results, which include averages of these measurements, are shown in Table 37 below.

TABLE 37

| Ex # | Pigment | Treatment Level | HMI | HCP | HPAP | HPPP | X4200 | Average |
|---|---|---|---|---|---|---|---|---|
| 92 | Ex 87 | 1.0 mmoles/g | 1.23 | 1.30 | 1.56 | 1.54 | 1.32 | 1.39 |
| 93a | Ex 88 | 0.5 mmoles/g | 1.36 | 1.41 | 1.58 | 1.58 | 1.47 | 1.48 |
| 93b | Ex 88 | 1.0 mmoles/g | 1.34 | 1.40 | 1.64 | 1.64 | 1.43 | 1.49 |
| 94 | Ex 89 | 1.0 mmoles/g | 1.27 | 1.34 | 1.63 | 1.66 | 1.39 | 1.46 |
| 95a | Ex 90 | 0.5 mmoles/g | 1.28 | 1.25 | 1.62 | 1.22 | 1.36 | 1.35 |
| 95b | Ex 90 | 1.0 mmoles/g | 1.28 | 1.28 | 1.66 | 1.16 | 1.39 | 1.35 |
| 96 | Ex 91 | 0.4 mmoles/g | 1.40 | 1.41 | 1.53 | 1.37 | 1.45 | 1.43 |
|  | Ex 7a |  | 1.2 | 1.32 | 1.48 | 1.28 | 1.37 | 1.35 |

As the results show, inkjet ink compositions of the present invention produce printed images having a high average OD across the 5 paper set.

Example 97

The following example describes a method of preparing the modified pigments of the present invention and the properties of inkjet ink compositions comprising them.

Thus, 399.84 g of Cab-O-Jet® 300 colored pigment dispersion (commercially available from Cabot Corporation) was added to a fritted column containing 32 mL of $NH_4^+$ ion-exchange resin (measured via displacement of DI water). The sample was allowed to filter through the resin at a rate of approximately 2 drops per second. The resulting ion-exchanged modified carbon black dispersion, comprising a modified carbon black having —$CO_2NH_4$ groups, was collected for use in the next step.

100.58 g of the ion-exchanged modified carbon black dispersion was placed in a beaker with magnetic stirring. In a separate vessel, 5.504 g of alendronate sodium was dissolved by dilution with 30 g of DI water and addition of 1 g of concentrated $NH_4OH$. The alendronate sodium solution was then added dropwise to the beaker of ion-exchanged modified carbon black dispersion and mixed for 45 minutes. The resulting mixture was then poured into a glass tray and heated in an oven for approximately 16 hours at 150° C. After removal from the oven, the dried modified pigment was placed in a stainless steel beaker, to which 200 g of DI water was added, and was mixed using a Silverson mixer at 6000 RPM for 1 hour. The pH was adjusted from 3.5 up to 8 with a 10% NaOH solution, and the sample was then mixed for an additional 20 minutes. The resulting dispersion, which comprised a modified pigment of the present invention comprising a pigment having attached two phosphonic acid groups or salts thereof, was purified by diafiltration with 6 volumes of DI water at 250 mL/volume and was then centrifuged for 20 minutes at 1000 RPM followed by suction filtration using a 0.5 μm filter.

The resulting dispersion of modified pigment was used to prepare an inkjet ink composition of the present invention, using the procedure described in Examples 92-96. Print test conditions were also similar to those described in those examples, and images were printed using a Canon i550 printer on the following 3 types of plain paper: Hammermill Inkjet (HMI), Hammermill Copy Plus (HCP), and Xerox 4200 (X4200). The optical density (OD, or visual density) of a solid area fill at maximum print density was measured using ImageXpert™. Four measurements of OD are performed on 3 replicate prints of each type of paper. Results, which include averages of these measurements, are shown in Table 38 below.

TABLE 38

| Pigment | HMI | HCP | X4200 | Average |
|---|---|---|---|---|
| Example 97 | 1.13 | 1.22 | 1.20 | 1.18 |
| Cab-O-Jet ® 300 | 1.08 | 1.16 | 1.12 | 1.12 |
| Cabo-O-Jet ® 300, Ion exchanged | 1.09 | 1.17 | 1.12 | 1.13 |

As the results show, inkjet ink compositions of the present invention, comprising a modified carbon black which comprises a carbon black having attached an organic group having two phosphonic acid groups, produce printed images having a higher average OD across the 3 paper set compared to inkjet ink compositions comprising modified carbon blacks having a different attached group. In addition, improvements in performance have also been observed for an inkjet ink composition comprising a modified pigment of the present invention, prepared in a similar method with the exception that a modified carbon black comprising carbon black having attached at least one phenylphthalate group (—$C_6H_3(CO_2H)_2$ groups wherein the carboxylic acid groups are ortho to each other) or salts thereof is used instead of Cab-O-Jet® 300.

Example 98

A modified carbon black of the present invention was prepared using the procedure described in Example 72 using Method B, with the exception that Black Pearls® 1100 carbon black, commercially available from Cabot Corporation, was used instead of the described carbon black. Inkjet ink compositions comprising this modified carbon black were prepared using both the formulation shown in Table 31 above (for Example 98a) as well as that shown in Table 39 below (for Example 98b). Similar inkjet ink compositions were prepared using Cab-O-Jet® 300 colored pigment dispersion (commercially available from Cabot Corporation) using the same two formulations.

TABLE 39

| Component | Concentration |
|---|---|
| Pigment: | 5% |
| Triethyleneglycol monobutyl ether: | 5% |
| Surfynol 465: | 1% |
| Glycerin: | 10% |
| DI Water: | 79% |

For inkjet ink compositions prepared using the formulation in Table 31, images were printed using a Canon iP4000 printer while, for those prepared using the formulation in Table 39, an Epson C88 printer was used. Optical density (OD) of a solid area fill at maximum print density was measured using ImageXpert™. Four measurements of OD are performed on 3 replicate prints of each of 6 types of paper—HP Bright White, HP Advanced Paper, HP Plain Paper, Hammermill Copy Plus, Hammermill InkJet, and Xerox 4200. OD averaged across this paper set is shown in Table 40. Also included in this table are gloss values, determined from images printed on Canon PP-101 glossy paper (for those printed with a Canon iP4000 printer) or on Epson Premium Glossy paper (for those printed with an Epson C88 printer). The gloss was measured with a BYK-Gardner micro haze plus gloss meter.

TABLE 40

| Pigment | Average OD | 20° Gloss | 60° Gloss | 85° Gloss |
|---|---|---|---|---|
| Example 98a | 1.36 | 97.2 | 133 | 98.6 |
| COJ300 | 1.28 | 19.4 | 52 | 82.2 |
| Example 98b | 1.28 | 90.8 | 138 | 101 |
| COJ300 | 1.09 | 16.5 | 53.4 | 92.2 |

As the results show, the inkjet ink compositions of the present invention, comprising a modified pigment which comprises a pigment having attached at least one organic group that comprises at least two phosphonic acid groups, has higher OD on plain paper and gloss on photopaper compared to an inkjet ink composition comprising a modified pigment having a different type of attached group. This represents a versatile pigment.

Example 99

A modified pigment of the present invention was prepared following the procedure described in Example 7a, with the exception that Black Pearls® 1100 carbon black was used. Two different treatment levels were prepared, and these are shown in Table 42 below. Inkjet ink compositions comprising these modified pigments were prepared using the formulation shown in Table 41 below. A similar inkjet ink composition was prepared using a modified carbon black prepared using Black Pearls® 1100 carbon black and 4-aminobenzoic acid at the treatment level shown in Table 42. All of these inks were prepared to be at a pH of between 8.4 and 8.6.

TABLE 41

| Component | Concentration |
|---|---|
| Pigment: | 4% |
| Triethyleneglycol monobutyl ether: | 5% |
| Surfynol 465: | 1% |
| Glycerin: | 10% |
| DI Water: | 80% |

Each inkjet ink compositions was printed using an Epson C88 printer. Images were printed on the following 3 types of plain paper: Great White Ink Jet (GWIJ), Hammermill Copy Plus (HCP), and Hewlett Packard printing paper (HPPP). Optical density (OD) of a solid area fill at maximum print density was measured using ImageXpert™. Four measurements of OD are performed on 3 replicate prints of each of the 3 types of paper OD averaged across this paper set is shown in Table 42. Also included in this table is gloss data, determined from images printed on Epson Premium Glossy paper (for those printed with an Epson C88 printer) using the procedure described in Example 98.

TABLE 42

| Pigment | Treatment Level | Na$^+$ (ppm) | Average OD | 20° Gloss |
|---|---|---|---|---|
| Ex 99a | 0.9 mmol/g | 23573 | 1.23 | 67.6 |
| Ex 99b | 1.8 mmol/g | 28146 | 1.21 | 64.0 |
| Comp Ex 32 | 1.6 mmol/g | 13549 | 1.00 | 89.1 |
| C88 OEM | — | — | 1.25 | 20.2 |

Comparative Example 13 is a modified carbon black comprising the same carbon black as the modified pigment of Example 99a and Example 99b, with attached benzoic acid groups. Also included in Table 42 is the performance of the black ink from the C88 printer (C88 OEM) used for the printing study.

As the results show, inkjet ink compositions of the present invention have OD comparable to the OEM ink with improved gloss. Furthermore, compared to an inkjet ink composition comprising the same pigment (Black Pearls® 1100 carbon black) having attached a different group ($-C_6H_4CO_2H$ groups or salts thereof), the inkjet ink compositions of the present invention have improved optical density and similar gloss. Therefore, the inkjet ink compositions of the present invention have a combination of high OD and high gloss, which is surprising since, as is known in the art, obtaining high OD usually comes with a trade-off of lower gloss (and vice-versa).

Example 100

The following examples describe the preparation of modified pigments according to an embodiment of the present invention, comprising a pigment having attached at least two phosphonic acid groups or salts thereof.

A ProcessAll 4HV Mixer (4 liter) was charged with 400 g of dry Black Pearls® 700 carbon black, 680 mL of DI water, and 32 g of the material prepared in Example 1 (0.1 mmol). The resultant mixture was then heated to 60° C. while intensely mixing at 300 RPM for 10 minutes. To this was added a 20% aqueous sodium nitrite solution (36.2 g, 1.05 equivalents) over 15 minutes. Heating and mixing was continued for a total of 3 hours. The contents of the mixer were removed by diluting with an additional 750 mL of DI water, and the resulting dispersion was then purified by diafiltration using DI water. At the end of the diafiltration (permeate conductivity <200 micro siemens) the concentration of pigment was adjusted to 15% and then centrifuged in a Carr Continuous Centrifuge (PilotFuge). The sodium content of the dispersion was then measured with an Orion Ion Selective Electrode and was determined to be around 9,000-11,000 ppm. The mean volume particle size (mV) of the modified pigment in the dispersion was measured using a Microtrac® Particle Size Analyzer and found to be 120-130 nm.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A modified colorant comprising a colorant having attached at least one organic group, wherein the organic group has a calcium index value greater than a calcium index value of 1,2,3-benzene tricarboxylic acid, wherein the colorant is a pigment.

2. The modified colorant of claim 1, wherein the organic group comprises at least two phosphonic acid groups, partial esters thereof, or salts thereof.

3. The modified colorant of claim 2, wherein the organic group comprises at least one geminal bisphosphonic acid group, partial esters thereof, or salts thereof.

4. The modified colorant of claim 3, wherein the organic group comprises at least one group having the formula —CQ($PO_3H_2$)$_2$ or salts thereof, wherein Q is H, R, OR, SR, or $NR_2$ wherein R, which can be the same or different, is H, a C1-C18 alkyl group, a C1-C18 acyl group, an aralkyl group, an alkaryl group, or an aryl group.

5. The modified colorant of claim 4, wherein the organic group comprises at least one group having the formula —($CH_2$)$_n$—CQ($PO_3H_2$)$_2$ or salts thereof, wherein n is 1 to 9.

6. The modified colorant of claim 5, wherein n is 1 to 3.

7. The modified colorant of claim 4, wherein the organic group comprises a group having the formula —X—($CH_2$)$_n$—CQ($PO_3H_2$)$_2$ or salt thereof, wherein X, which is attached to the pigment, is an arylene, heteroarylene, alkylene, alkarylene, or aralkylene group, and wherein n is 0 to 9.

8. The modified colorant of claim 7, wherein X is an arylene group.

9. The modified colorant of claim 4, wherein the organic group comprises a group having the formula —X-Sp-($CH_2$)$_n$—CQ($PO_3H_2$)$_2$ or salt thereof, wherein X, which is attached to the pigment, is an arylene, heteroarylene, alkylene, alkarylene, or aralkylene group and Sp is a spacer group, and wherein n is 0 to 9.

10. The modified colorant of claim 9, wherein Sp is —$CO_2$—, —$O_2C$—, —O—, —NR"—, —NR"CO—, —CONR"—, —$SO_2$NR"—, —$SO_2CH_2CH_2$NR"—, —$SO_2CH_2CH_2$O—, or —$SO_2CH_2CH_2$S—, wherein R" is H or a C1-C6 alkyl group.

11. The modified colorant of claim 9, wherein X is an arylene group.

12. The modified colorant of claim 2, wherein the organic group comprises at least one group having the formula —N—[($CH_2$)$_m$($PO_3H_2$)]$_2$ or salts thereof, wherein m, which can be the same or different, is 1 to 3.

13. The modified colorant of claim 12, wherein the organic group comprises at least one group having the formula —($CH_2$)$_n$—N—[($CH_2$)$_m$($PO_3H_2$)]$_2$ or salts thereof, wherein n is 1 to 9.

14. The modified colorant of claim 12, wherein the organic group comprises a group having the formula —X—($CH_2$)$_n$—N—[($CH_2$($PO_3H_2$)]$_2$ or salts thereof, wherein X, which is attached to the pigment, is an arylene, heteroarylene, alkylene, alkarylene, or aralkylene group, and wherein n is 0 to 9.

15. The modified colorant of claim 12, wherein the organic group comprises a group having the formula —X-Sp-($CH_2$)$_n$—N—[($CH_2$)$_m$($PO_3H_2$)]$_2$ or salts thereof, wherein X, which is attached to the pigment, is an arylene, heteroarylene, alkylene, alkarylene, or aralkylene group and Sp is a spacer group, and wherein n is 0 to 9.

16. The modified colorant of claim 15, wherein Sp is —$CO_2$—, —$O_2C$—, —O—, —NR"—, —NR"CO—, —CONR"—, —$SO_2$NR"—, —$SO_2CH_2CH_2$NR"—, —$SO_2CH_2CH_2$O—, or —$SO_2CH_2CH_2$S—, wherein R" is H or a C1-C6 alkyl group.

17. The modified colorant of claim 2, wherein the organic group comprises at least one group having the formula —CR=C($PO_3H_2$)$_2$ or salts thereof, wherein R is H, a C1-C6 alkyl group, or an aryl group.

18. An inkjet ink composition comprising a) a liquid vehicle and b) a modified colorant comprising a colorant having attached at least one organic group, wherein the organic group has a calcium index value greater than a calcium index value of 1,2,3-benzene tricarboxylic acid, wherein the colorant is a pigment.

19. The inkjet ink composition of claim 18, wherein the organic group comprises at least two phosphonic acid groups or salts thereof.

20. The inkjet ink composition of claim 18, wherein the vehicle is an aqueous vehicle.

* * * * *